US009689991B2

(12) United States Patent
Dupont et al.

(10) Patent No.: US 9,689,991 B2
(45) Date of Patent: Jun. 27, 2017

(54) RADIATION PROBE SYSTEM AND METHOD

(71) Applicant: Canberra France SAS, Saint Quentin en Yvelines (FR)

(72) Inventors: Archibald Dupont, Athée sur Cher (FR); Adrien Gallozzi Ulmann, Saint Quentin en Yvelines (FR); Frédéric Meyer, Plaisir (FR); Nabil Menaa, Nanterre (FR); Xavier Ducoux, Saint Quentin en Yvelines (FR)

(73) Assignee: MIRION TECHNOLOGIES (CANBERRA) SAS, Le Bretonneux (FR)

( * ) Notice: Subject to any disclaimer, the term of this patent is extended or adjusted under 35 U.S.C. 154(b) by 324 days.

(21) Appl. No.: 14/635,638

(22) Filed: Mar. 2, 2015

(65) Prior Publication Data
US 2016/0011320 A1 Jan. 14, 2016

Related U.S. Application Data

(60) Provisional application No. 62/012,069, filed on Jun. 13, 2014.

(30) Foreign Application Priority Data

Jan. 2, 2015 (FR) ..................................... 15 50003

(51) Int. Cl.
*G01T 1/16* (2006.01)
*G01T 1/169* (2006.01)
(52) U.S. Cl.
CPC ................ *G01T 1/16* (2013.01); *G01T 1/169* (2013.01)

(58) Field of Classification Search
CPC ....................................................... G01T 1/16
See application file for complete search history.

(56) References Cited

U.S. PATENT DOCUMENTS

| 3,246,149 A * | 4/1966 | Kazenas ................ G01N 27/84 |
| | | 250/303 |
| 3,968,371 A * | 7/1976 | Greendale ................. G01T 7/02 |
| | | 250/255 |
| 6,992,580 B2 * | 1/2006 | Kotzin ............... G08B 21/0453 |
| | | 340/539.11 |

* cited by examiner

*Primary Examiner* — David Porta
*Assistant Examiner* — Djura Malevic
(74) *Attorney, Agent, or Firm* — David W. Carstens; Kevin M. Klughart; Carstens & Cohooh, LLP

(57) ABSTRACT

A radiation probe system and method incorporating adaptive gamma radiation background subtraction for enhanced radiation detection capability is disclosed. The system and method are generally applicable to radiation "frisking" applications in which the contamination area may have high gamma radiation background levels that normally would result in loss of contamination radiation detection accuracy. Readings from a background radiation detector (BRD) are subtracted from a contamination radiation detector (CRD) to determine a count rate solely associated with contamination. A background subtraction factor (BSF) is used to scale the BRD subtraction and is automatically adjusted based on environmental conditions. A smoothing algorithm is used to increase/decrease the BRD and/or CRD acquisition times to account for signal variations in BRD/CRD measurement readings. The system and method provide for lower limit of detection (LLD) radiation levels that are below that of conventional radiation detectors.

80 Claims, 64 Drawing Sheets

5000

5900

RADIATION PROBE SYSTEM AND METHOD

CROSS REFERENCE TO RELATED APPLICATIONS

U.S. Provisional Patent Applications

This application claims benefit under 35 U.S.C. §119 and incorporates by reference United States Provisional patent application for RADIATION PROBE SYSTEM AND METHOD by inventors Archibald DUPONT, Adrien GALLOZZI ULMANN, Frédéric MEYER, Nabil MENAA, and Xavier DUCOUX, filed electronically with the USPTO on Jun. 13, 2014, with Ser. No. 62/012,069, EFS ID 19305016, confirmation number 8336.

French Patent Applications

This application claims benefit under 35 U.S.C. §120 and incorporates by reference French Patent Application for RADIATION PROBE SYSTEM AND METHOD (SYSTEME ET DISPOSITIF DE MESURE DE RAYONNEMENT) by applicant Canberra France SAS and inventors Archibald (nmn) DUPONT, Adrien GALLOZZI (nmn) ULMANN, Frédéric (nmn) MEYER, Nabil (nmn) MENAA, and Xavier (nmn) DUCOUX, filed electronically with the French patent office on Jan. 2, 2015, with Ser. No. 15/50,003.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for detecting radiation, and without limitation, systems and methods configured to detect radiation in portable or mobile environments using handheld probes. Without limiting the scope of the present invention, the general field of invention scope may fall into one or more U.S. patent classifications including: 378/89; and 378/160.

PRIOR ART AND BACKGROUND OF THE INVENTION

Prior Art System Context

Deficiencies in the Prior Art

The prior art as detailed above suffers from the following deficiencies:
  Prior art radiation probe systems and methods do not perform any background subtraction for radiation measurements.
  Prior art radiation probe systems and methods require that radiation contamination must be spotted visually by the operator if the count-rate significantly increases.
  Prior art radiation probe systems and methods increase the likelihood that contamination may be missed or misidentified due to high background radiation.
  Prior art radiation probe systems and methods are not capable of adapting to changing background radiation conditions in their measurement process.

While some of the prior art may teach some solutions to several of these problems, the core issue of improving radiation detection efficiency and reliability in portable radiation probes has not been solved by the prior art.

OBJECTIVES OF THE INVENTION

Accordingly, the objectives of the present invention are (among others) to circumvent the deficiencies in the prior art and affect the following objectives in the context of a radiation probe system and method:
  (1) Provide for a radiation probe system and method that performs background subtraction for radiation measurements.
  (2) Provide for a radiation probe system and method that does not require radiation contamination to be spotted visually by the operator.
  (3) Provide for a radiation probe system and method that decreases the likelihood that contamination may be missed or misidentified due to high background radiation.
  (4) Provide for a radiation probe system and method that utilizes adaptive background subtraction to minimize the risk of measurement errors.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention encompasses a portable radiation contamination probe system that provides for correction of background radiation. The system generally comprises the following components:
  (a) background radiation detector (BRD);
  (b) contamination radiation detector (CRD);
  (c) proximity sensor (PRS);
  (d) operator audible alarm (OAA);
  (e) operator visual indicator (OVI);
  (f) computing control device (CCD); and
  (g) radiation probe enclosure (RPE);

The RPE is configured to mechanically couple the BRD, the CRD, the PRS, and the CCD in the RPE with the BRD positioned behind and/or proximal to the CRD such that gamma radiation external to the RPE first passes through the CRD before detection by the BRD. The PRS is configured to determine the proximity of a radiation source to the RPE with the BRD configured to detect gamma radiation and the CRD is configured to detect alpha, beta, and gamma radiation from the radiation source.

The CCD is configured to read background radiation counts (BRC) from the BRD while the CCD is configured to read contamination radiation counts (CRC) from the CRD. The CCD is configured to calculate a radiation background count (RBC) by processing the BRC to estimate static background gamma radiation by calculating a background subtraction factor (BSF) based on the RBC and a net measured radiation (NMR) value by subtracting from the CRC the product of the RBC and the BSF.

The CCD is configured to periodically perform a coherence test of the NMR to determine the statistical correctness of the BSF and calculate a radiation detection threshold (RDT) based on the RBC. The CCD is configured to activate the OAA and the OVI based on the values of the NMR, the RDT, and a predetermined alarm threshold value (ATV).

BRIEF DESCRIPTION OF THE DRAWINGS

For a fuller understanding of the advantages provided by the invention, reference should be made to the following detailed description together with the accompanying drawings wherein:

FIG. 34 illustrates an example of alarm and LED triggering with LLD<AT;

DESCRIPTION OF THE PRESENTLY PREFERRED EXEMPLARY EMBODIMENTS

Figure 1:
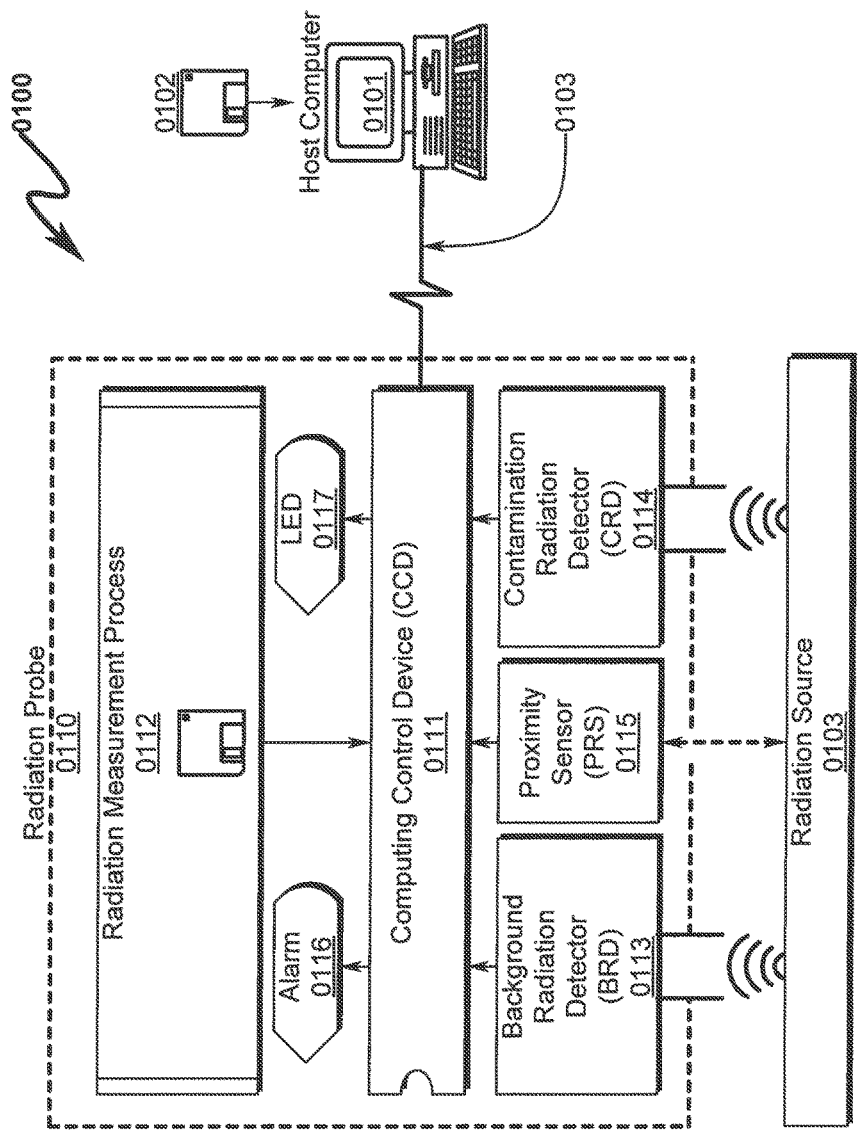
FIG. 1 illustrates a system block diagram depicting a preferred exemplary invention system embodiment.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION PROBE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

System Overview (01001)

An exemplary embodiment of the present invention is depicted in FIG. 1 (0100) wherein a host computer system (0101) operating under control of machine instructions read from a computer readable medium (0102) communicates with the radiation probe (0110) via a wired or wireless communication link (0103). The radiation probe (0110) includes a computing control device (CCD) (0111) (typically a microprocessor, microcontroller, or other customized digital computing device). The CCD (0111) operates under the control of software read from a computer readable medium (0112) that includes a radiation measurement process configured to control the CCD (0111) to gather radiation measurements from a background radiation detector (BRD) (0113) and a contamination radiation detector (CRD) (0114). The CCD (0111) is also capable of determining the presence of the radiation source (0103) via the use of a proximity sensor (0115). The BRD (0113) measurement is then adaptively subtracted from the CRD (0114) radiation measurement data to determine the net measured radiation (NMR) count for the radiation source (0103) being measured. This NMR value represents the radiation count rate solely associated with contamination being measured.

A background subtraction factor (BSF) is used to scale the BRD subtraction from the CRD data and is automatically adjusted based on environmental conditions. A smoothing algorithm is used to increase/decrease the BRD and/or CRD acquisition times to account for signal variations in BRD/CRD measurement readings. This combination of background radiation subtraction and adaptive signal acquisition times may result in a substantially improved lower limit of detection (LLD) radiation levels that are substantially lower than conventional radiation detectors. An audible alarm (0116) and a visible LED indicator (0117) (or other display indicia) are collectively used to determine the presence of measured contamination after background subtraction as well as determine the reliability of the measurement process.

Figure 41:
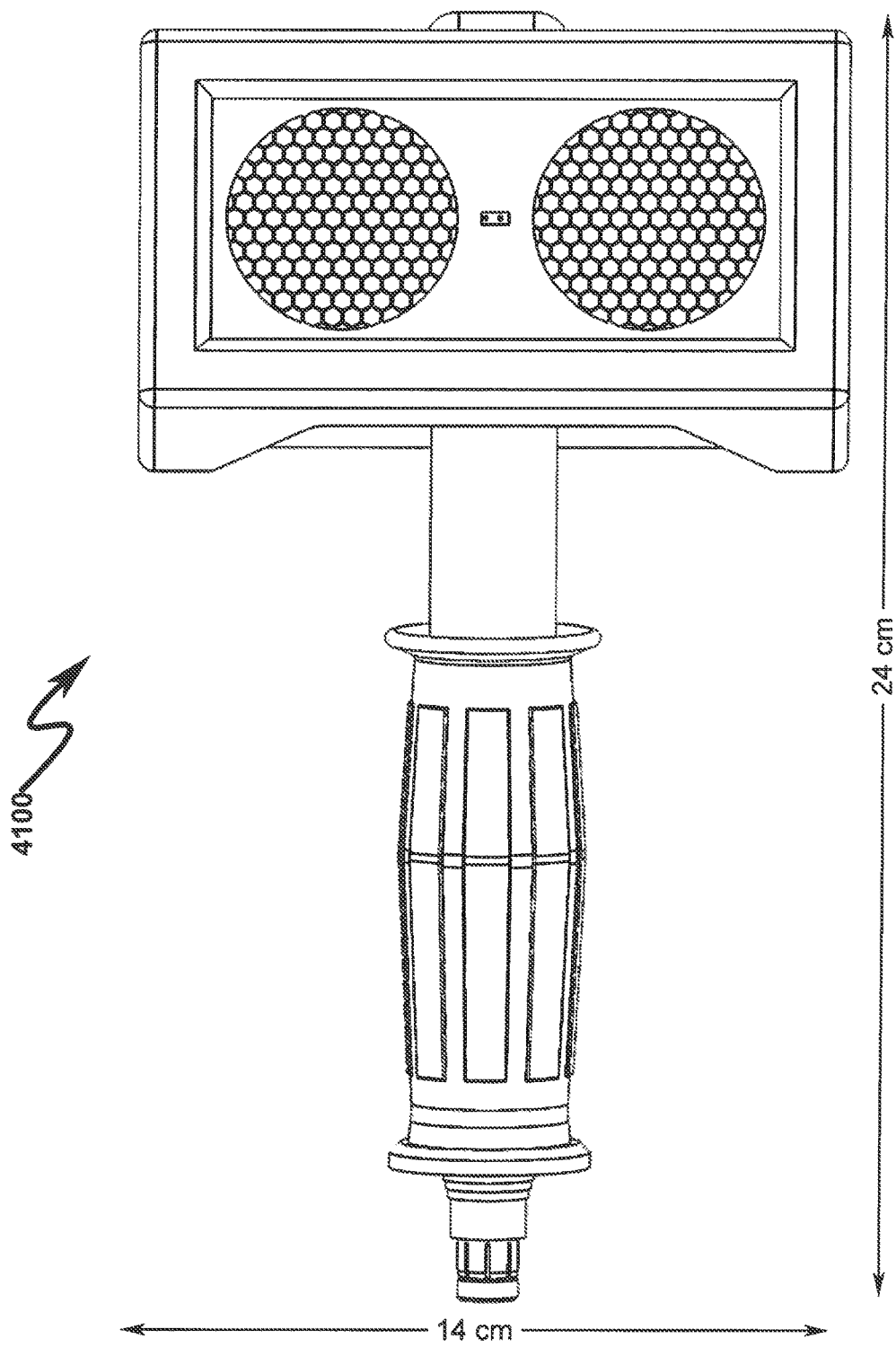
FIG. 41 illustrates a front view of a preferred exemplary invention system embodiment.
Figure 42:
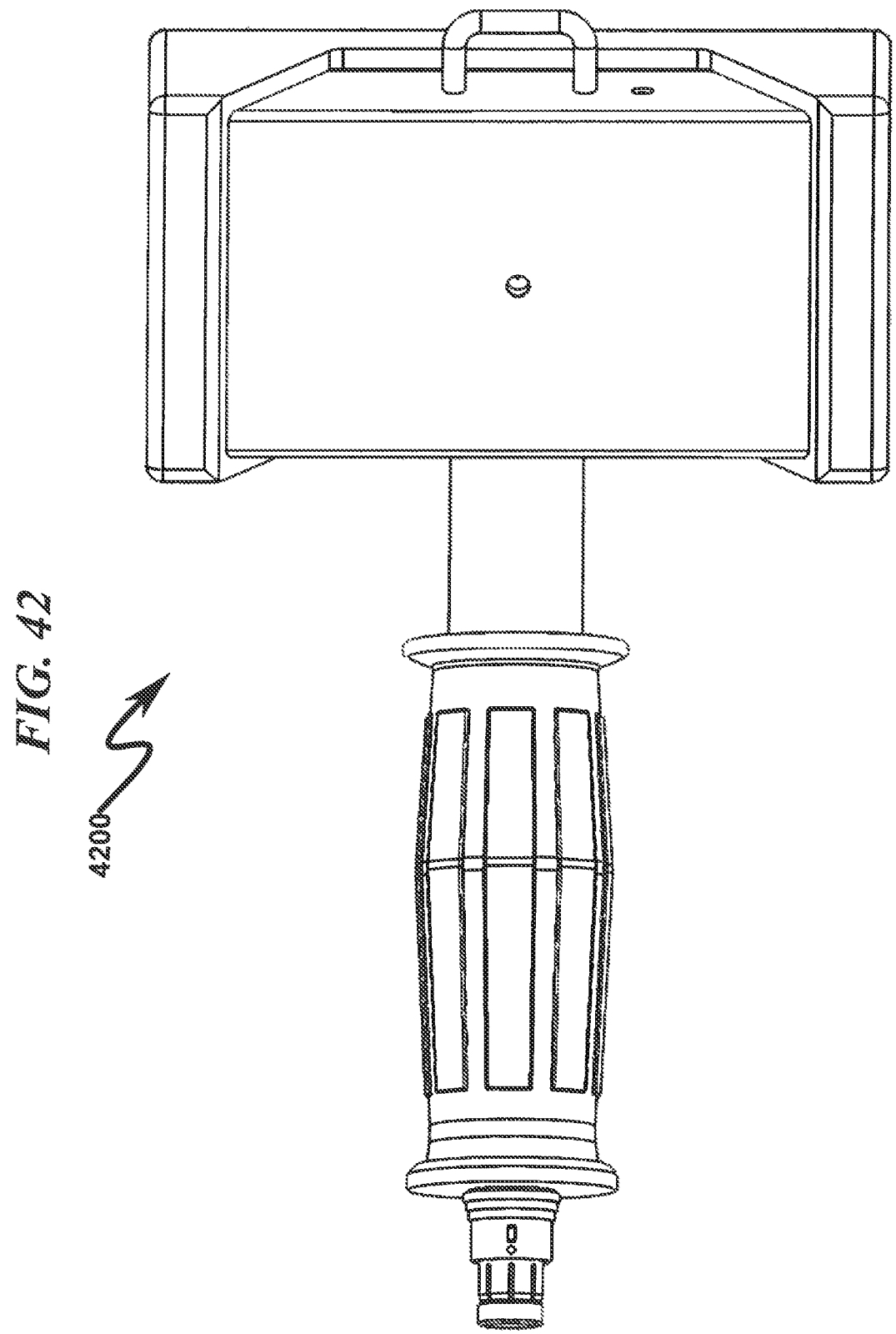
FIG. 42 illustrates a rear view of a preferred exemplary invention system embodiment.
Figure 43:
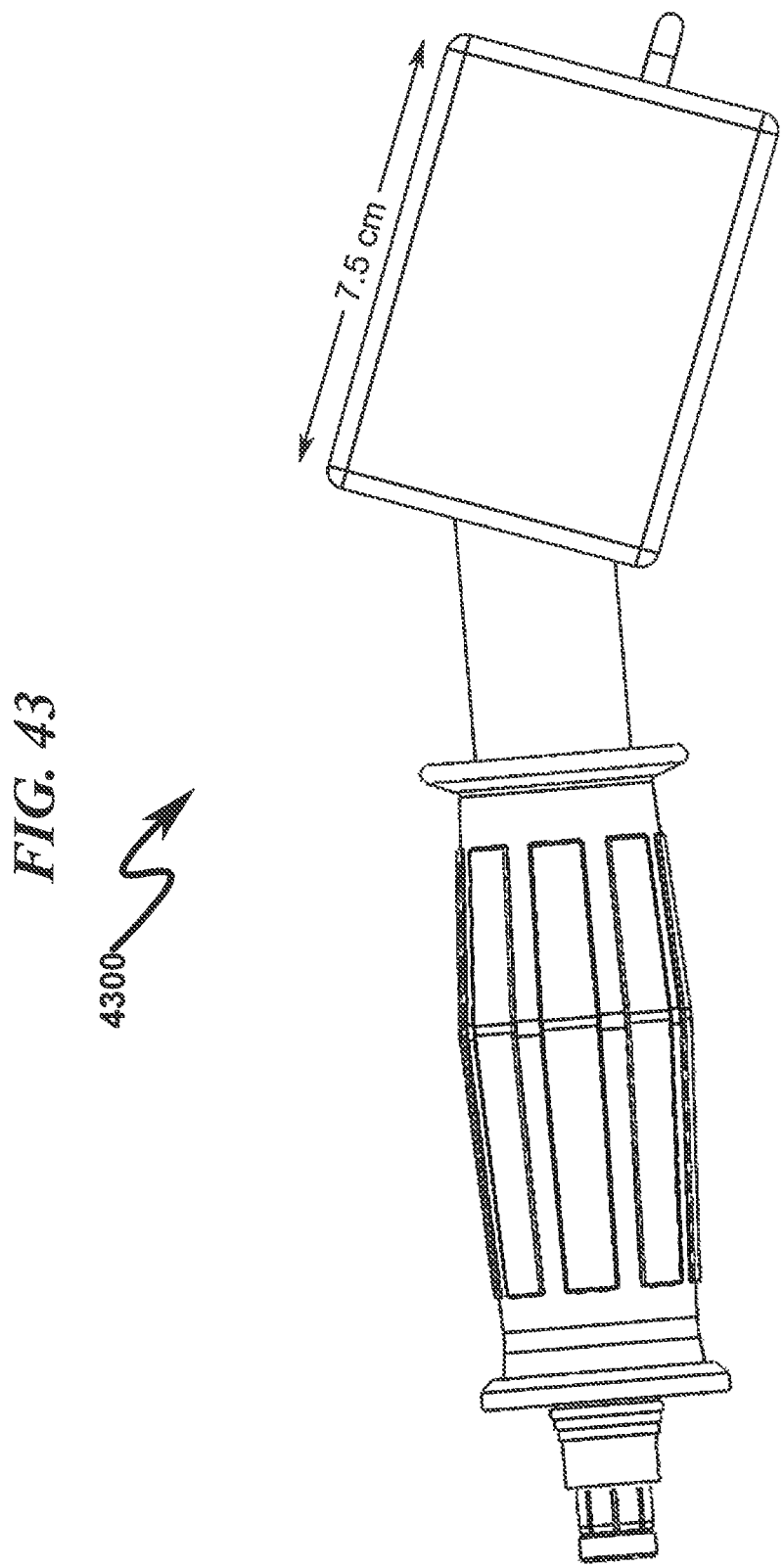
FIG. 43 illustrates a right side view of a preferred exemplary invention system embodiment.
Figure 44:
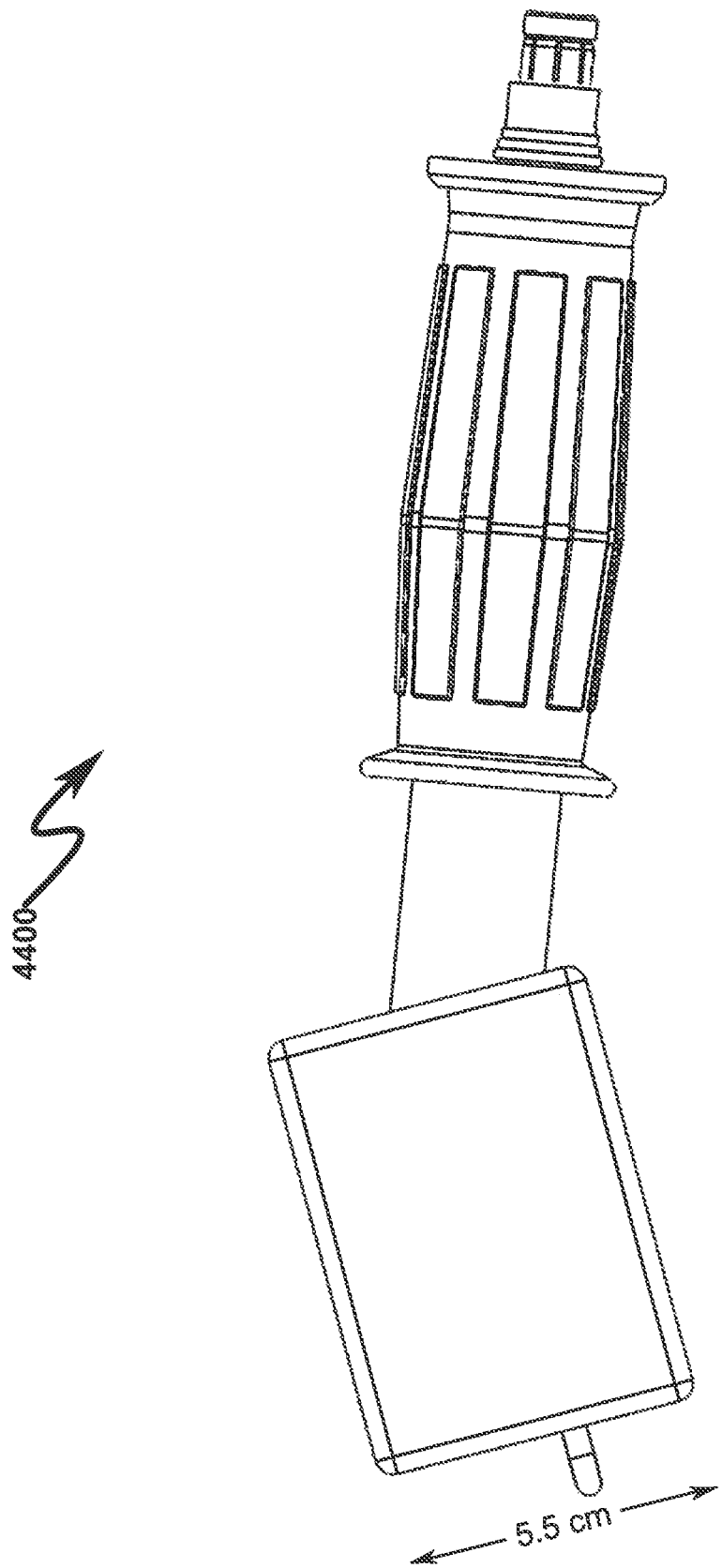
FIG. 44 illustrates a left side view of a preferred exemplary invention system embodiment.
Figure 45:
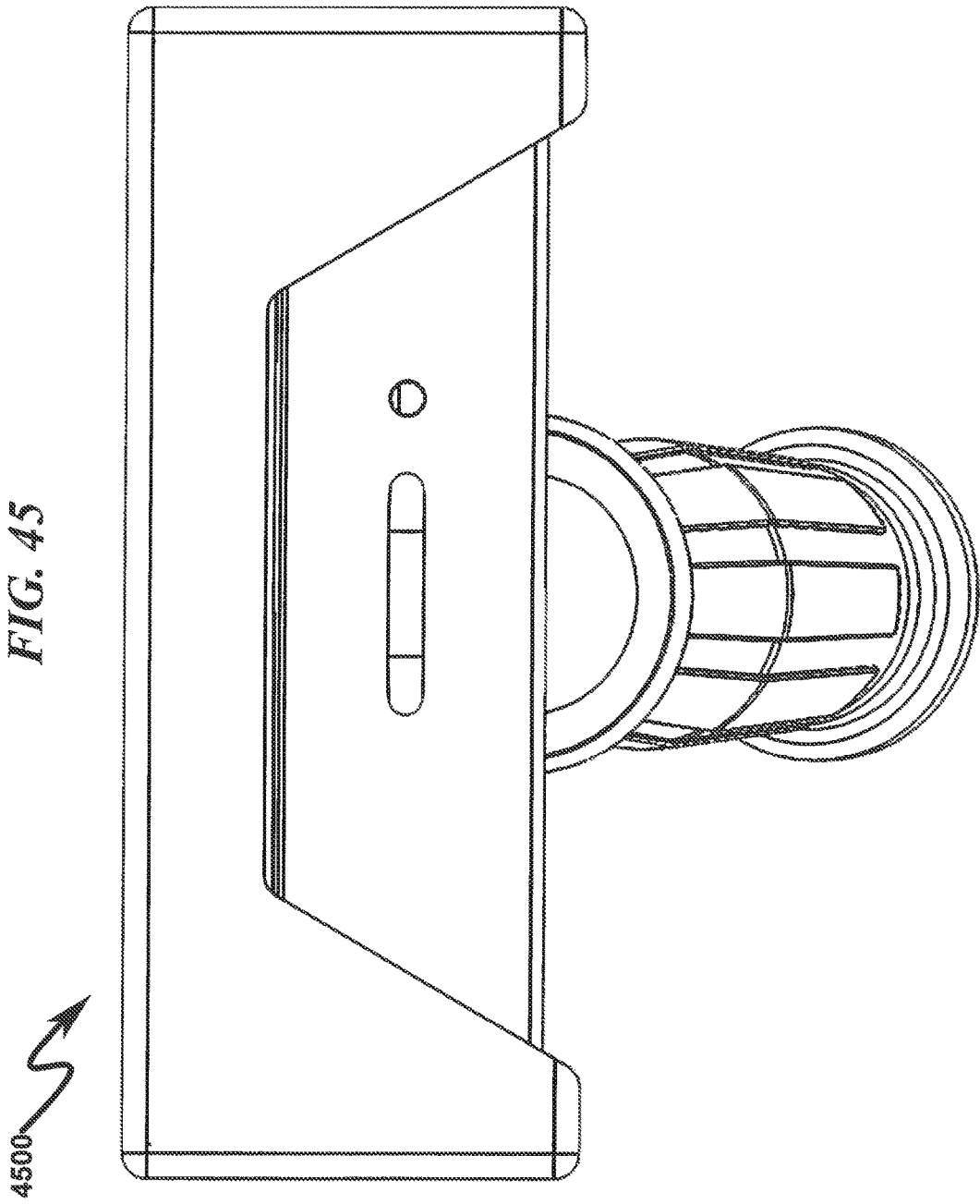
FIG. 45 illustrates a top view of a preferred exemplary invention system embodiment.
Figure 46:
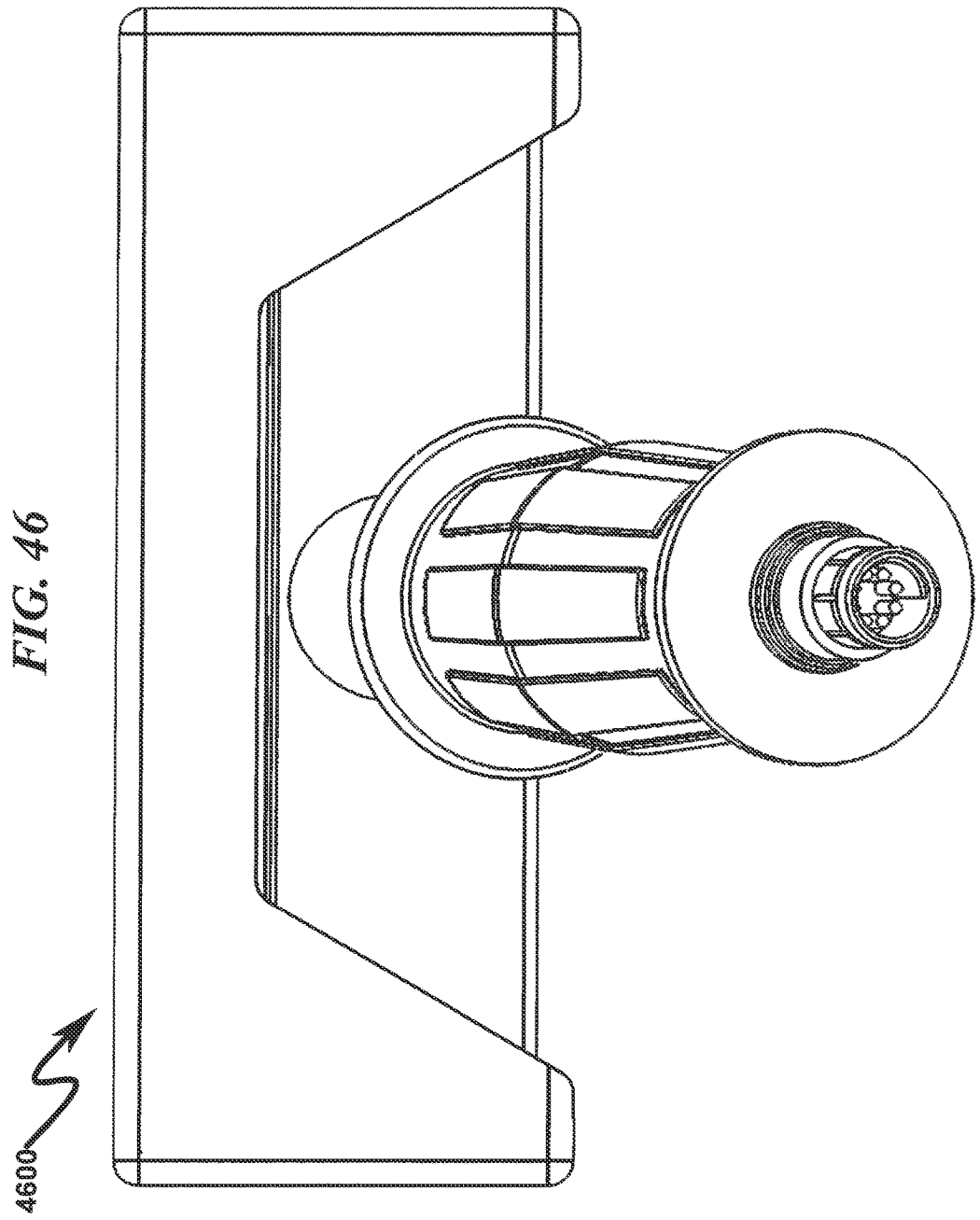
FIG. 46 illustrates a bottom view of a preferred exemplary invention system embodiment.
Figure 47:
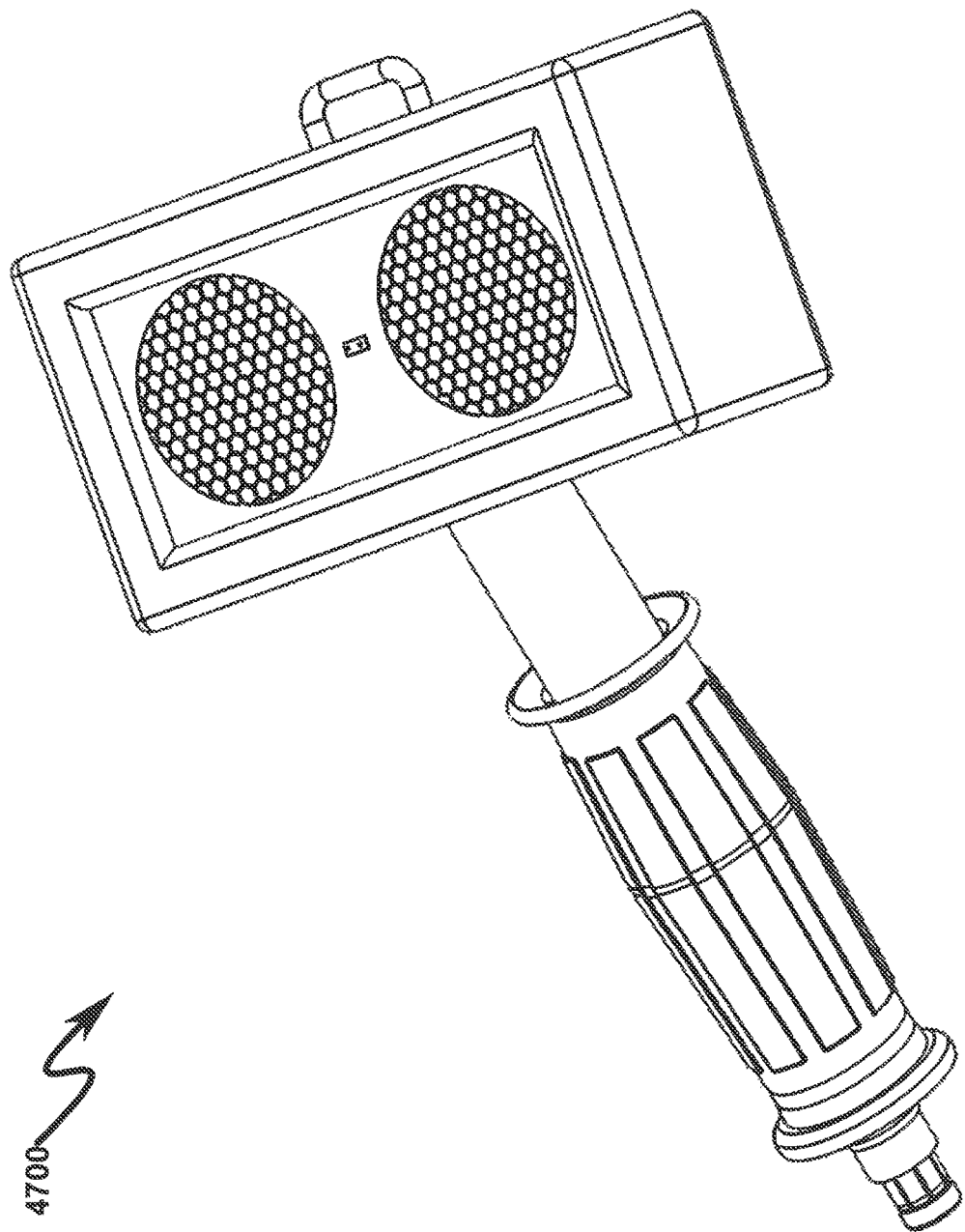
FIG. 47 illustrates a front perspective view of a preferred exemplary invention system embodiment.
Figure 64:
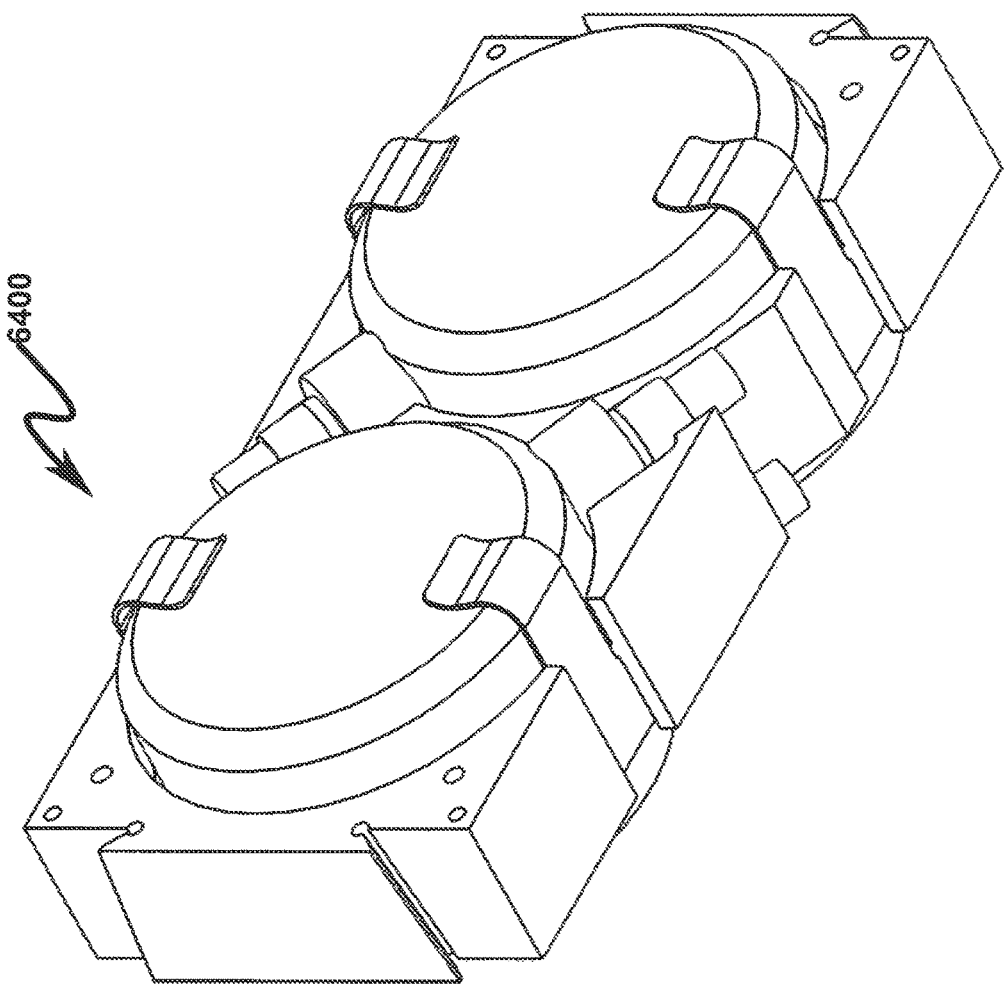
FIG. 64 illustrates a bottom right rear perspective detail view of a radiation detector assembly useful in some preferred invention embodiments.

While the physical implementation of the radiation probe (0110) may vary based on application context, a preferred embodiment in the form of a portable radiation probe is depicted in FIG. 41 (4100)-FIG. 64 (6400). These diagrams illustrate the BRD (0113) and CRD (0114) detectors assembled in a portable hand-held radiation detector suitable for "frisking" operations related to personnel and material radiation sensing operations.

Method Overview (0200)

Figure 2:
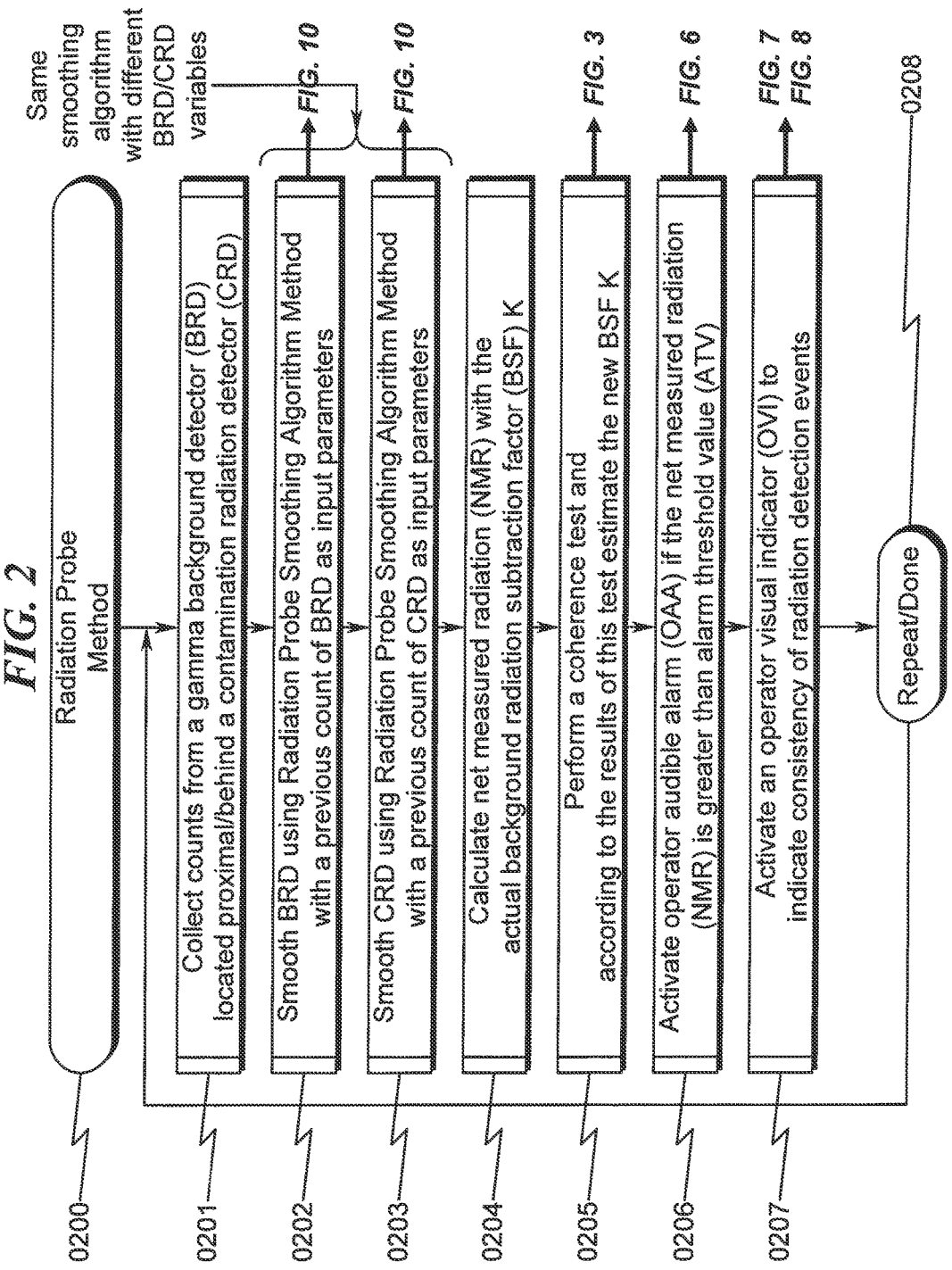
FIG. 2 illustrates a flowchart depicting a preferred exemplary invention method embodiment.

Associated with the exemplary system overview described in FIG. 1 (0100) is a radiation probe method as depicted in FIG. 2 (0200) that comprises the following steps:
(1) With a CCD, collecting counts from a gamma background detector (BRD) located proximal and/or behind a contamination radiation detector (CRD) (0201);
(2) With the CCD, smoothing BRD data using a Radiation Probe Smoothing Algorithm Method with a previous count of BRD as input parameters (0202);
(3) With the CCD, smoothing CRD data using a Radiation Probe Smoothing Algorithm Method with a previous count of CRD as input parameters (0203);
(4) With the CCD, calculate net measured radiation (NMR) with the actual background radiation subtraction factor (BSF) K (0204);
(5) With the CCD, perform a coherence test and according to the results of the coherence test estimate the new BSF K (0205);
(6) With the CCD, activate an operator audible alarm (OAA) if the net measured radiation (NMR) is greater than an alarm threshold value (ATV) (0206);
(7) With the CCD, activate an operator visual indicator (OVI) to indicate consistency of radiation detection events (0207); and
(8) Proceeding to step (1) to repeat BRD and CRD radiation measurements and subsequent NMR determination (0208).

One skilled in the art will recognize that these method steps may be augmented or rearranged without limiting the teachings of the present invention. This general method summary may be augmented by the various elements described herein to produce a wide variety of invention embodiments consistent with this overall design description.

Coherence Method Overview (0300)

Figure 3:
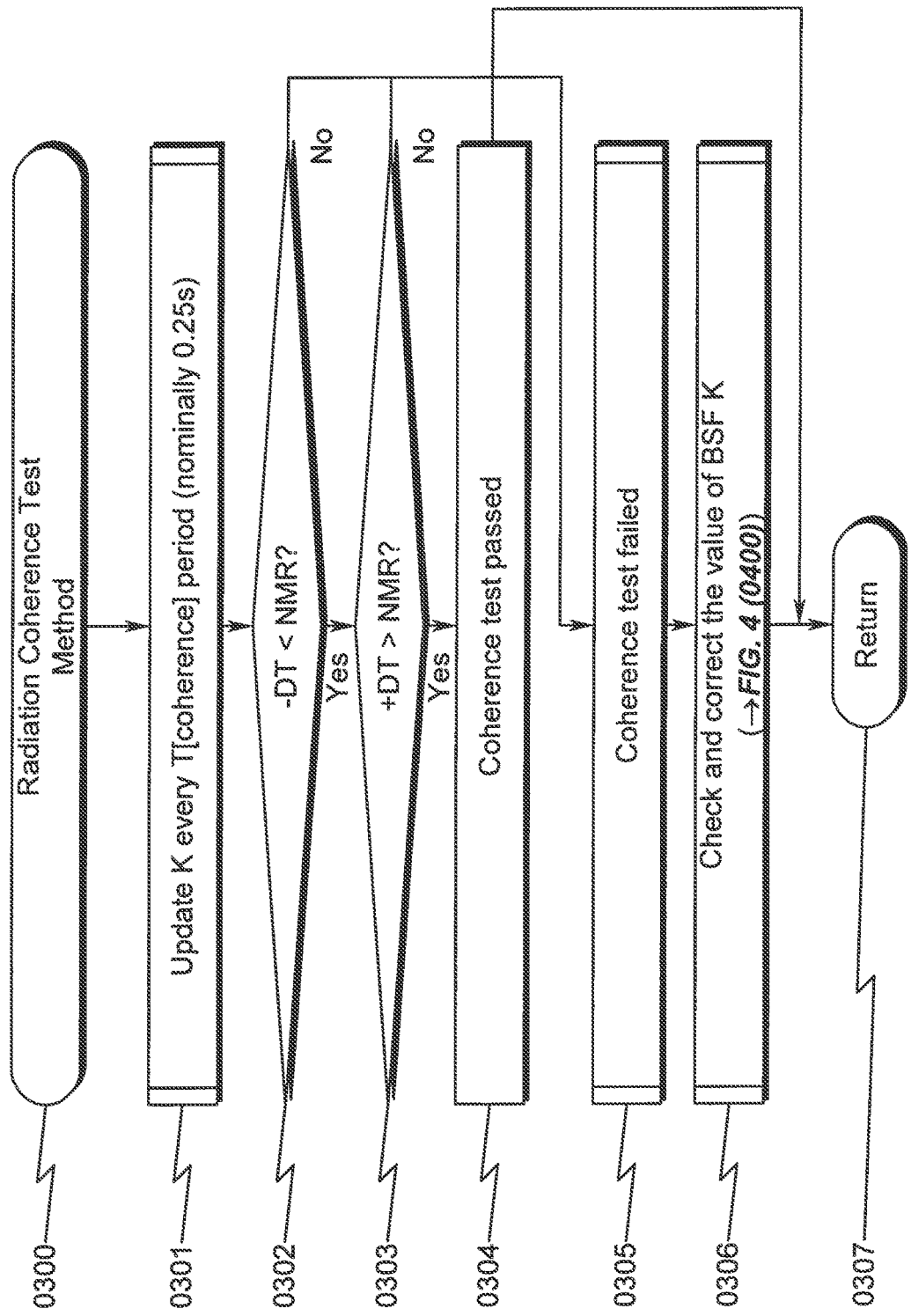
FIG. 3 illustrates a flowchart depicting a preferred exemplary radiation coherence test method embodiment.
Figure 5:
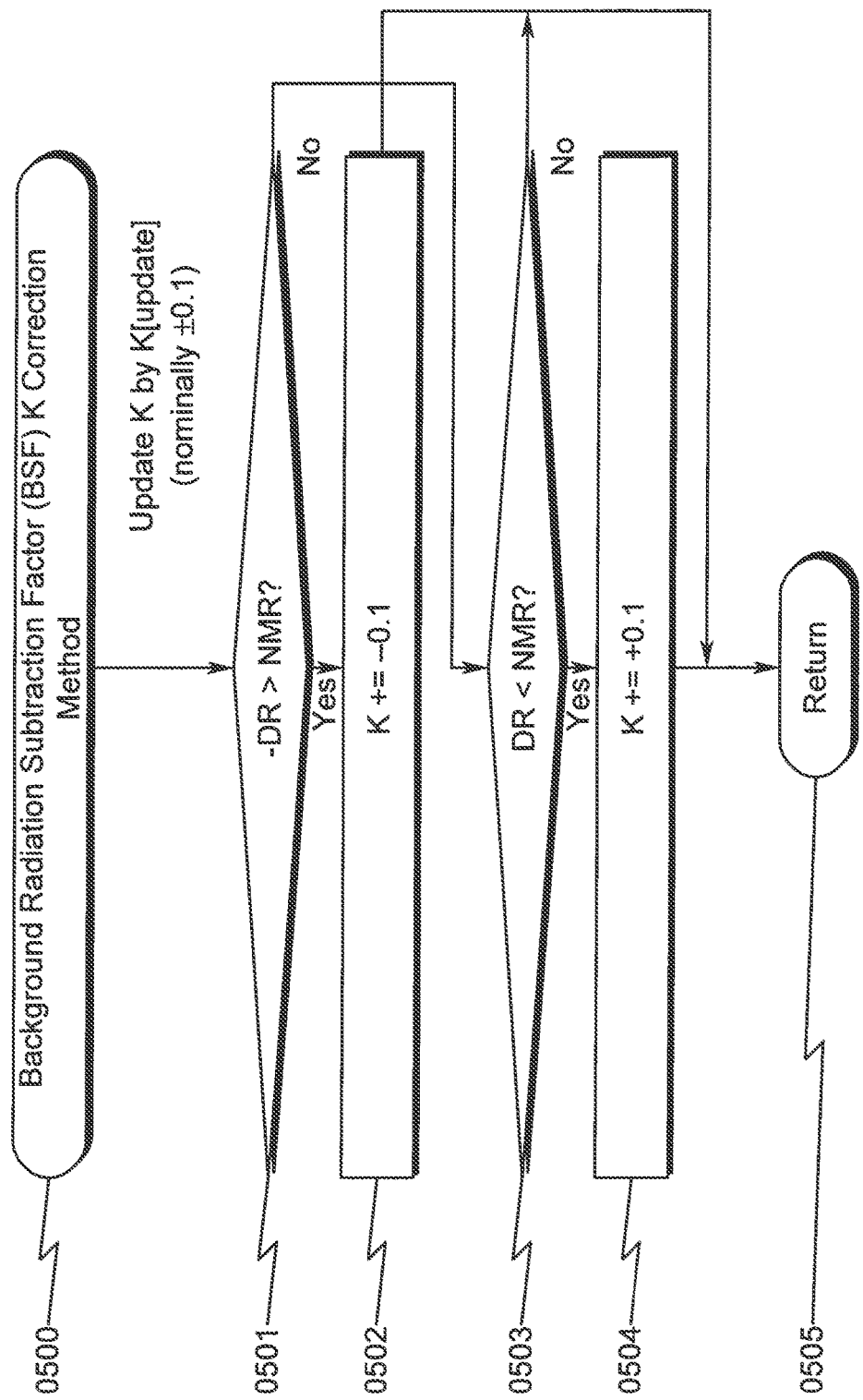
FIG. 5 illustrates a flowchart depicting a preferred exemplary radiation scaling factor correction method embodiment.

Associated with the exemplary system overview described in FIG. 1 (0100) and the radiation probe method as depicted in FIG. 2 (0200) is a coherence test calculation method as depicted in FIG. 3 (0300)-FIG. 5 (0500) that comprises the following steps:
(1) Update K every T[coherence] period (nominally 0.25 s) (0301);
(2) Determining if −DT<NMR, and if not, proceeding to step (5) (0302);
(3) Determining if +DT>NMR, and if not, proceeding to step (5) (0303);
(4) Indicating the coherence test passed, and proceeding to step (7) (0304);
(5) Indicating the coherence test failed (0305);
(6) Checking and correcting the value of BSF K (0306); and
(7) Terminating the coherence test procedure (0307).

One skilled in the art will recognize that these method steps may be augmented or rearranged without limiting the teachings of the present invention. This general method summary may be augmented by the various elements described herein to produce a wide variety of invention embodiments consistent with this overall design description.

Coherence Check Method Overview (0400)

Figure 4:
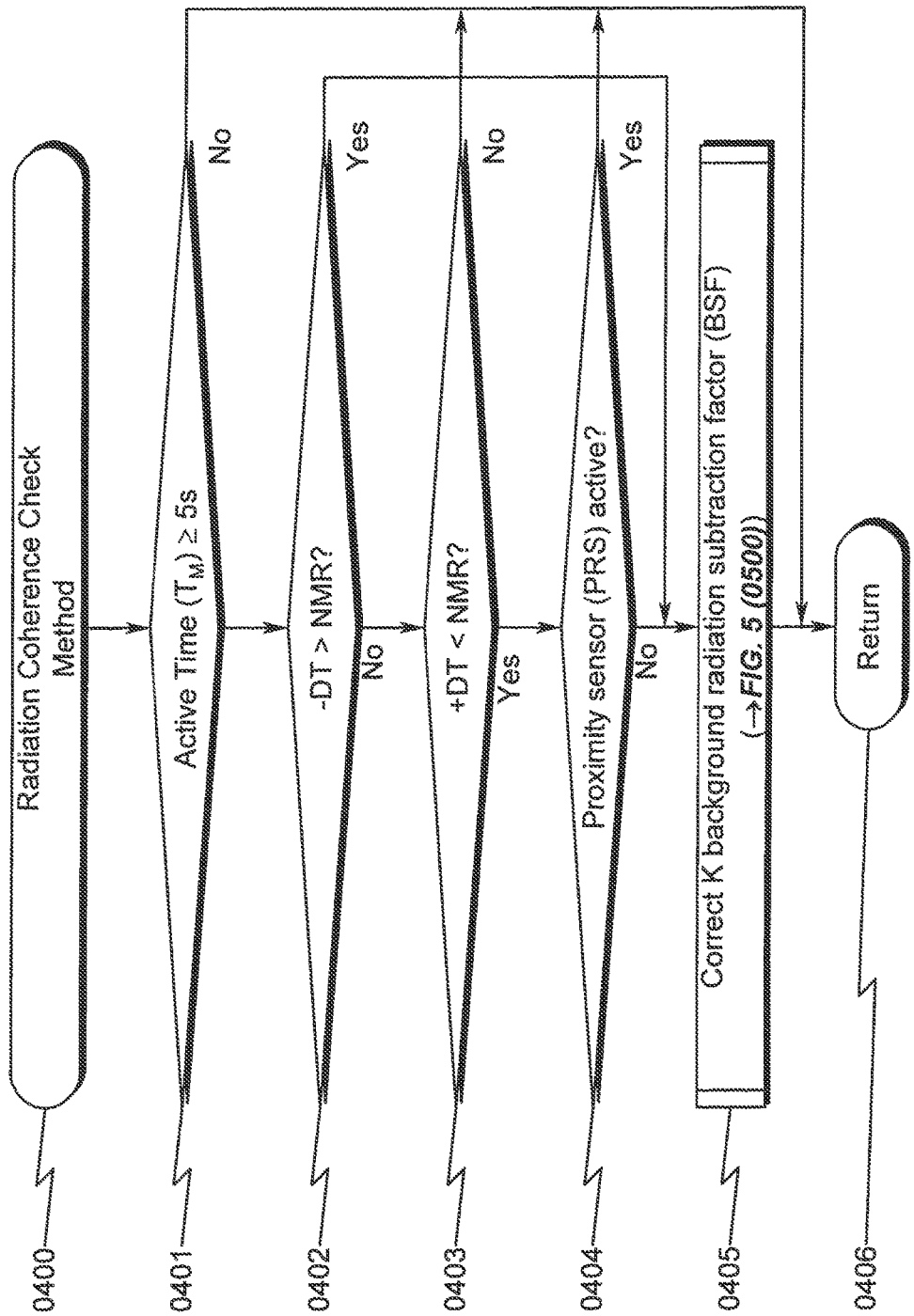
FIG. 4 illustrates a flowchart depicting a preferred exemplary radiation coherence check method embodiment.

Associated with the exemplary system overview described in FIG. 1 (0100) and the radiation probe method as depicted in FIG. 2 (0200) is a coherence check method as depicted in FIG. 4 (0400)-FIG. 5 (0500) that comprises the following steps:
(1) Determining if Active Time (TM)≥5 s, and if not, proceeding to step (6) (0401);
(2) Determining if −DT>NMR, and if so, proceeding to step (5) (0402);
(3) Determining if +DT<NMR, and if not, proceeding to step (6) (0403);
(4) Determining if the proximity sensor (PRS) is active, and if so, proceeding to step (6) (0404);
(5) Correcting the scaling background subtraction factor (BSF) K (0405); and
(6) Terminating the coherence check procedure (0406).

One skilled in the art will recognize that these method steps may be augmented or rearranged without limiting the teachings of the present invention. This general method summary may be augmented by the various elements described herein to produce a wide variety of invention embodiments consistent with this overall design description.

BSF K Correction Update Method Overview (0500)

Associated with the exemplary system overview described in FIG. 1 (0100) and the radiation probe method as depicted in FIG. 2 (0200) is a K scaling update method as depicted in FIG. 5 (0500) to update K by a K[update] value (nominally ±0.1) that comprises the following steps:
(1) Determining if −DR>NMR, and if not, proceeding to step (3) (0501);
(2) Increment K by −0.1 and proceed to step (5) (0502);
(3) Determining if DR<NMR, and if not, proceeding to step (5) (0503);
(4) Increment K by +0.1 (0504); and
(5) Terminating the procedure (0505).

One skilled in the art will recognize that these method steps may be augmented or rearranged without limiting the teachings of the present invention. This general method summary may be augmented by the various elements described herein to produce a wide variety of invention embodiments consistent with this overall design description.

System Application

The present invention is designed to be used for detection ("frisking") and measurement of a contaminated area in a gamma radiation background up to hundreds of µSv/h, while prior art radiation probes are typically ineffective if the dose rate exceeds several dozens of µSv/h. A typical configuration of the present invention may have a Lower Limit of Detection (LLD) that is a factor of two or three lower than that possible using prior art radiation probes. This measurement performance of the present invention is reached due to the use of innovative features in matters of hardware and software that implement on-line adaptive background radiation subtraction. These innovative features may include any or all of the following:
Two contamination measurement counters are associated to their twin counters located behind and therefore protected from short-range gamma radiation. The gamma signal registered in the second counter is therefore subtracted from the signal registered in the contamination measurement counter. This gamma background subtraction results in assessing the count rate due to the contamination only.

A background subtraction factor is considered to perform the subtraction. This factor strongly depends on the conditions of the measurement and it is hardly predictable in advance. An algorithm is implemented in the radiation probe computer control device to perform accurate on-line corrections of the background subtraction factor.

A smoothing algorithm is used in order to assess the proper acquisition time for both contamination and gamma background measurement. The measurement acquisition time is therefore either increased or decreased as the signal is subject to strong variations or remains relatively stable.

An audible alarm sound is triggered if the net measurement radiation (NMR) count rate exceeds a predefined Alarm Threshold (AT) set by an operator.

The radiation probe is configured with a light emitting diode (LED) that indicates whether the current reading is reliable. As such, the red or green color of the LED located on the probe gives the operator an indication as to whether the information given by the probe (alarm triggered or not, meaning either presence or no presence of contamination) is reliable or not.

The radiation probe may be plugged into a display terminal on which the operator can read the value of the contamination (expressed in Bq/cm$^2$).

Some preferred invention embodiments may operate in two modes:
  Detection Mode—suited for reactive contamination detection "in the field"; and
  Measurement Mode—suited for advanced users in situations where an accurate assessment of the contamination must be made.

System Architecture

While the present invention may be embodied in a wide variety of configurations, the following features may be applied singly or in combination with a wide variety of preferred embodiments:
  The use of one (or more) background counters located behind the measurement counter so as to make them sensitive to γ radiation only, while the measurement counters are sensitive to γ, β and α radiations, which allow implementation of a γ background subtraction process.
  The use of a proximity sensor to let the background subtraction algorithm know whether or not the probe is measuring contamination. The proximity sensor is able to determine whether there is something present in front of the radiation probe, with a typical range of up to approximately 8 cm. This sensor works with the background subtraction in the following fashion:
    When no object is present, it is known for sure that the probe is not measuring contamination but only background radiation. Then, for example, a high value of count rate is not to be expected. If so, it is assumed that the background subtraction factor is not suited to the situation and correction is performed (according to the description given herein).
    If an object is detected, the probe is likely to be measuring contamination (this is the desired measurement state). In this case the background correction algorithm is switched off (except in some particular cases as in when the net count rate is significantly negative, which is unlikely to be correct regardless of the situation).
  Perform a coherence test to determine the statistical correctness of background subtraction. This test allows the assessment of the accuracy of the background subtraction, based on the fact that the net signal issued from a background measurement shall be bounded within calculated or estimated by an experimentation range.
  Estimate the correction of the subtraction factor and perform the correction gradually in time to allow fast computing rather than classical statistical methods that need more computing power.
  Integrate a visual enunciator (LED) to give the status of the measuring device with red if the detection limit is greater than the alarm threshold and green for the opposite case. This allows the operator to determine a consistency of the detection or non-detection of contamination through the light color of the LED.

Exemplary Radiation Probe Hardware Complement

The present invention hardware complement may typically be equipped with four Geiger Müller halogen-quenched detectors having a 1.8 mg/cm$^2$ thick mica window. These detectors are protected by a metallic grid having a transparency typically equal to 80.2%. The detection area is typically equal to approximately 30 cm$^2$. Typical probe enclosures selected for preferred invention embodiments are easily decontaminated and incorporate replaceable grids.

The probe may also incorporate a proximity sensor (typically having a range of approximately 8 cm). If no object is detected for radiation monitoring by the proximity sensor, the probe switches to stand-by mode to conserve power. In many preferred embodiments a LED lighted in green or red color is located on the top of the probe to provide a visual indication of measurement functions and contamination alarms.

Main characteristics of an exemplary hardware complement for a preferred invention embodiment are given below:
  Weight: 1100 g
  Electrical characteristics:
    Power supply by survey meter: +5V
    Power supply by PC: +5V
    Current consumption: 8 mA
  Environmental characteristics:
    Working temperature range: from −10° C. to +50° C.
    Storage temperature range: from −25° C. to +50° C.
    Relative humidity: from 40% to 95% at 35° C.
  Energy range:
    Alpha with energy >to 2.6 MeV
    Beta with energy >to 30 keV
    Gamma with energy >to 5 keV
  Count rate features:
    Saturation at 10,000 c/s
    1 Bq/cm$^2$ of $^{60}$Co leads to a count rate equal to about 3.75 c/s (valid for a source in contact with the probe and with a minimum surface of 30 cm$^2$)

One skilled in the art will recognize that these specifications are illustrative and not limiting of the invention scope.

Activity Density Calculation

The surface activity density C (Bq/cm$^2$) measured by the present invention radiation probe and displayed on the HCS is calculated with the following formula:

$$C = f \cdot \left(\frac{N_M}{T_M} - K \cdot \frac{N_G}{T_G}\right) = f \cdot (S_M - K \cdot S_G) = f \cdot M \quad (1)$$

where
- f is the conversion factor between the count rate (in counts/second (c/s)) and the surface activity density (Bq/cm$^2$), determined through the calibration process;
- $T_M$ is the active time (in seconds) considered for the measurement counters, determined by the smoothing algorithm (see SMOOTHING ALGORITHM below);
- $N_M$ is the amount of counts in the measurement counters registered during a time equal to $T_M$ (both counters are summed);
- $S_M$ is the count rate (in counts/second (c/s)) in the measurement counters;
- $T_G$ is the active time (in seconds (s)) considered for the background counters, determined by the smoothing algorithm (see SMOOTHING ALGORITHM below);
- $N_G$ is amount of counts in the background counters registered during a time equal to $T_G$ (both counters are summed);
- $S_G$ is the count rate (in counts/second (c/s)) in the measurement counters;
- K is the background subtraction factor (BSF), determined by the background deduction algorithm (see BACKGROUND SUBTRACTION FACTOR ALGORITHM below); and
- M is the net measured radiation (NMR) count rate (in counts/second (c/s)).

The value of each of these magnitudes (apart from the conversion factor f) is updated at the sample frequency of the probe which may range from approximately 0.1 second to 2.0 seconds and optimally 0.25 seconds in some preferred invention embodiments.

The measured value of the surface activity density C is compared to a chosen Alarm Threshold (AT) in order to trigger the alarm if the contamination is too high. The significance of the alarm is pointed out through the color of a LED on the radiation probe. Generally, a red LED means that the alarm may have been triggered due to background variations. In this circumstance the user would typically then increase the AT.

In order to match operator requirements in terms of accuracy and reactivity with the strong constraints required of the specific environment where the present invention radiation probe is designed to be used (in a nuclear area for the first control after sensitive operations), two algorithms have been implemented in the probe to compute efficiently the data registered during the measurement process. The first algorithm deals with the smoothing process (see SMOOTHING ALGORITHM below); the second algorithm deals with the background subtraction (see BACKGROUND SUBTRACTION FACTOR (BSF) ALGORITHM below).

The logic that drives the lighting of the LED in red or green is also detailed (see AUDIBLE ALARMS and VISIBLE INDICIA).

The BACKGROUND SUBTRACTION FACTOR ALGORITHM and AUDIBLE ALARMS and VISIBLE INDICIA sections below require knowledge of LLD and Detection Threshold (DT). Definition and calculation of LLD and DT for the present invention radiation probe are in accordance with ISO 11929 standard and are detailed in the DETECTION THRESHOLD (DT) AND DETECTION LIMIT (LLD) CALCULATIONS section below.

Smoothing Algorithm

A smoothing algorithm may be applied to the background radiation detector to permit a more accurate baseline measurement to be obtained for the subtraction process. Since the contamination signal may become very reactive, smoothing of data received from the background radiation detector permits detection of contamination within approximately one second using this smoothed baseline approach. Details of this algorithm are provided in the flowcharts depicted in FIG. 10 (1000)-FIG. 32 (3200).

Background Subtraction Factor (BSF) Algorithm

The Background Subtraction Algorithm aims to assess the suitable value of the background subtraction factor K(1) (typically initialized to 1.25 at probe startup), taking into account a variety of specific constraints:
- The γ background is subject to high variations, in space and time.
- Values are updated every 0.1-2.0 seconds and computing resources are limited. The algorithm must therefore be based on an instantaneous check as processing a significant amount of data is prohibited.
- Background subtraction shall not result in contamination deduction.

The algorithm logic is based on three main principles, each one of them providing a solution to solve the problem imposed by the three constraints detailed above:
- The value of K is updated approximately every 0.1-2.0 seconds through a coherence test performed for the net measured radiation (NMR) value, which is supposed to be close to 0 when there is no contamination. If the net measured radiation (NMR) value is between −DT and +DT, the coherence test is passed. If not, the coherence test is considered as failed and the value of K is corrected.
- When a correction is required as a consequence of the failure of the coherence test, the value of K is corrected (or not) step by step with an increment value of ±0.1 (as generally depicted in the flowchart of FIG. 5 (0500)):
  If −DR>NMR then K is incremented by −0.1
  If DR<NMR then K is incremented by +0.1
  Note that a more accurate correction could have been performed by storing every value of $S_M$ and $S_G$; the value of K could then be chosen so as to keep 97.5% of the resulting M values within the range of [−DT:+DT]. However, even if a large amount data related to the smoothing algorithm is available in the memory of the radiation probe, such a process would take far too much computer power to be performed in conjunction with other processes in the probe within the 0.1-2.0 second analysis period.
- A key issue to be solved is distinguishing between a γ background and a contamination in which case a value above DT could be relevant and no correction of K would therefore be required. To prevent such errors, various error filtering logical tests have been implemented:

If the coherence test fails, the correction is performed only if the active time $T_M$ is equal or greater than 5 s. This ensures a relative stability of K.

If an undercompensation is detected (net measured radiation (NMR) value over +DT), the correction is allowed only if the presence sensor does not detect anything. The presence sensor check combined with the $T_M$ check guarantees that a detection of a peak of contamination would not lead to a K correction.

If overcompensation is detected (net measured radiation (NMR) value under −DT), the correction is always allowed since there is no physical reason in which such an event might be correct.

Optimization of this algorithm may also result in some further adjustment regarding the criteria given above:

K value is submitted to a correction of ±0.1 if the net measured radiation (NMR) value is beyond the range [−0.9*DT:+0.9*DT].

K value is submitted to a correction of ±0.01 if the net measured radiation (NMR) value is within the range [−0.9*DT:−0.6*DT] or [+0.6*DT:+0.9*DT].

Audible Alarms and Visual Indicia

The present invention anticipates that many preferred invention embodiments may incorporate radiation alarms incorporating the use of a light emitting diode (LED) on the probe that may be lighted in a variety of colors including red and/or green. In preferred embodiments utilizing a red/green coloration scheme, the meaning of each color is given below.

Green LED

Alarm Triggered: Alarm is significant.

Alarm Off: The detection of a contaminated area of the order of magnitude of the alarm threshold or above is guaranteed (provided that the surface of the contaminated area is above or equal to 30 cm$^2$ or some other arbitrary region limit).

Red LED

Alarm Triggered: Alarm is not significant and may have been triggered due to gamma background variations. The alarm threshold is most likely set too low.

Alarm Off: The detection of a contaminated area of the order of magnitude of the alarm threshold is not guaranteed.

Logical Alarm Testing

So as to ensure the validity of those alarm definitions as indicated above, the following logical tests may be implemented in many preferred invention embodiments:

If AT>LLD ⇒ Green LED (alarm on or off)
If 1.2*DT<AT<LLD, two cases are distinguished:
 M<AT ⇒ Red LED (alarm is off)
 M>AT ⇒ Green LED (alarm is on)
If AT<1.2*DT, two cases are distinguished:
 M<1.2*DT ⇒ Red LED (alarm is on or off)
 M>1.2*DT ⇒ Green LED (alarm is on)

Note that the DT multiplicative scaling factor (DSF) of 1.2 is used in many preferred invention embodiments for the following reasons:

It makes the probe less sensitive to insignificant alarms with a 20% safety margin compared to the theoretical value of the maximum gamma background variation.

Once the alarm is triggered, a hysteresis process allows the alarm to be switched off only if the net measured radiation (NMR) value M comes back to less than 0.8*AT. In that way, the 20% margin ensures that once the probe has gone away from the contaminated area, gamma background variations would not continue to activate the alarm.

One skilled in the art will recognize that this exemplary DT multiplicative scaling factor (DSF) of 1.2 (and corresponding DT hysteresis value (DHV) of 0.8) can be any values greater than unity (or less than unity in the case of the DHV hysteresis low limit) and still conform to the spirit and teaching of the claimed invention. Note that either of these parameters (DSF, DHV) may be described in terms of an absolute scaling factor (1.2, 0.8) or in terms of a percentage (20%, 20%).

Exemplary Radiation Probe Audible Alarm Method (0600)

Figure 6:
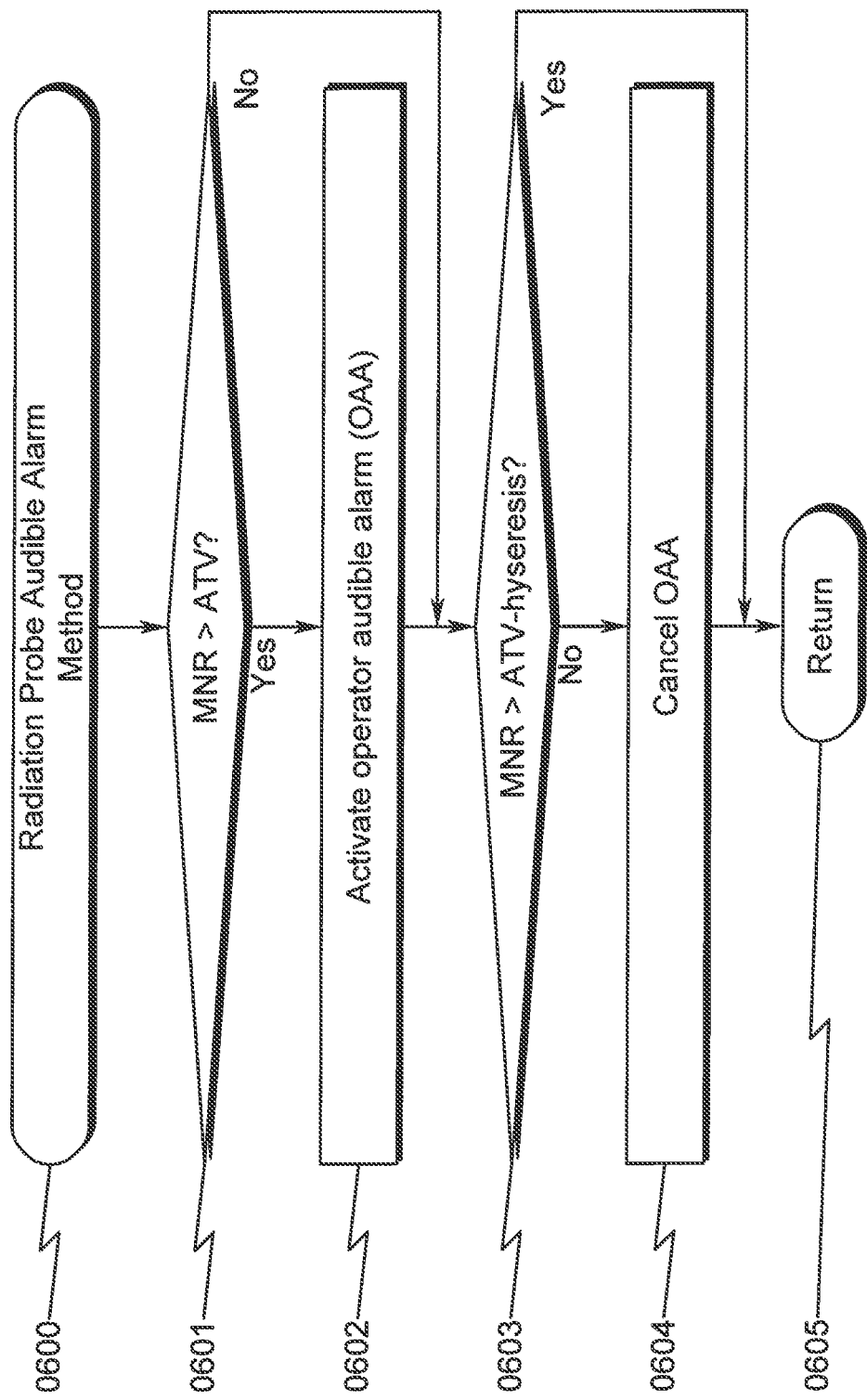
FIG. 6 illustrates a flowchart depicting a preferred radiation probe audible alarm method embodiment.

The alarm methodology described above may be described graphically as depicted in the method flowchart of FIG. 6 (0600) and generally comprises the following steps:

(1) Determining if MNR>ATV, and if not, proceeding to step (3) (0601);
(2) Activating an operator audible alarm (OAA) (0602);
(3) Determining if MNR>ATV-hysteresis, and if so, proceeding to step (5) (0603);
(4) Cancelling the operator audible alarm (OAA) (0604); and
(5) Terminating the audible alarm procedure (0605).

One skilled in the art will recognize that these method steps may be augmented or rearranged without limiting the teachings of the present invention. This general method summary may be augmented by the various elements described herein to produce a wide variety of invention embodiments consistent with this overall design description.

Exemplary Visual Indicator Method (0700140800)

Figure 7:
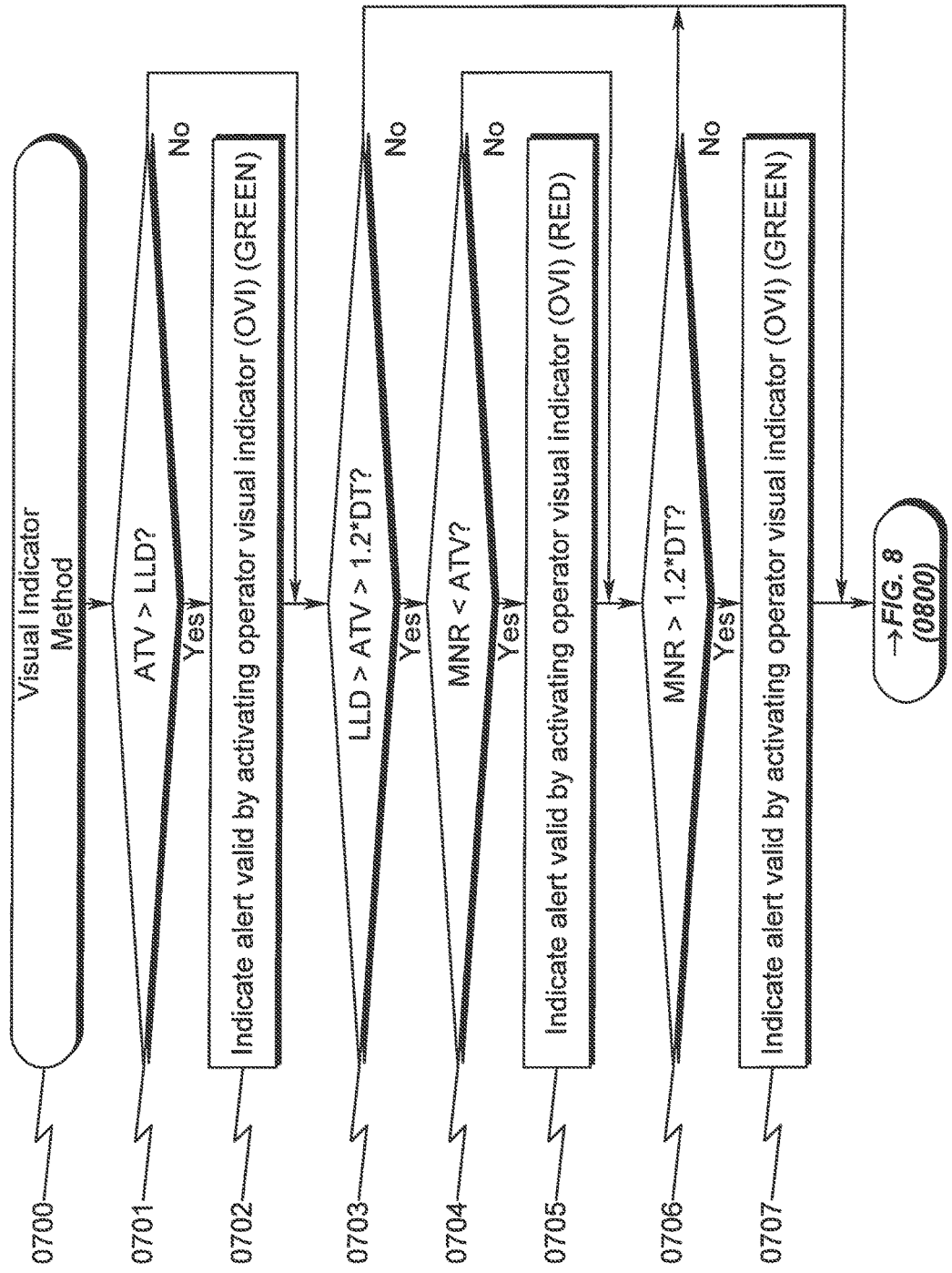
FIG. 7 illustrates a flowchart depicting a preferred radiation probe visual indicator method embodiment (page 1/2)
Figure 8:
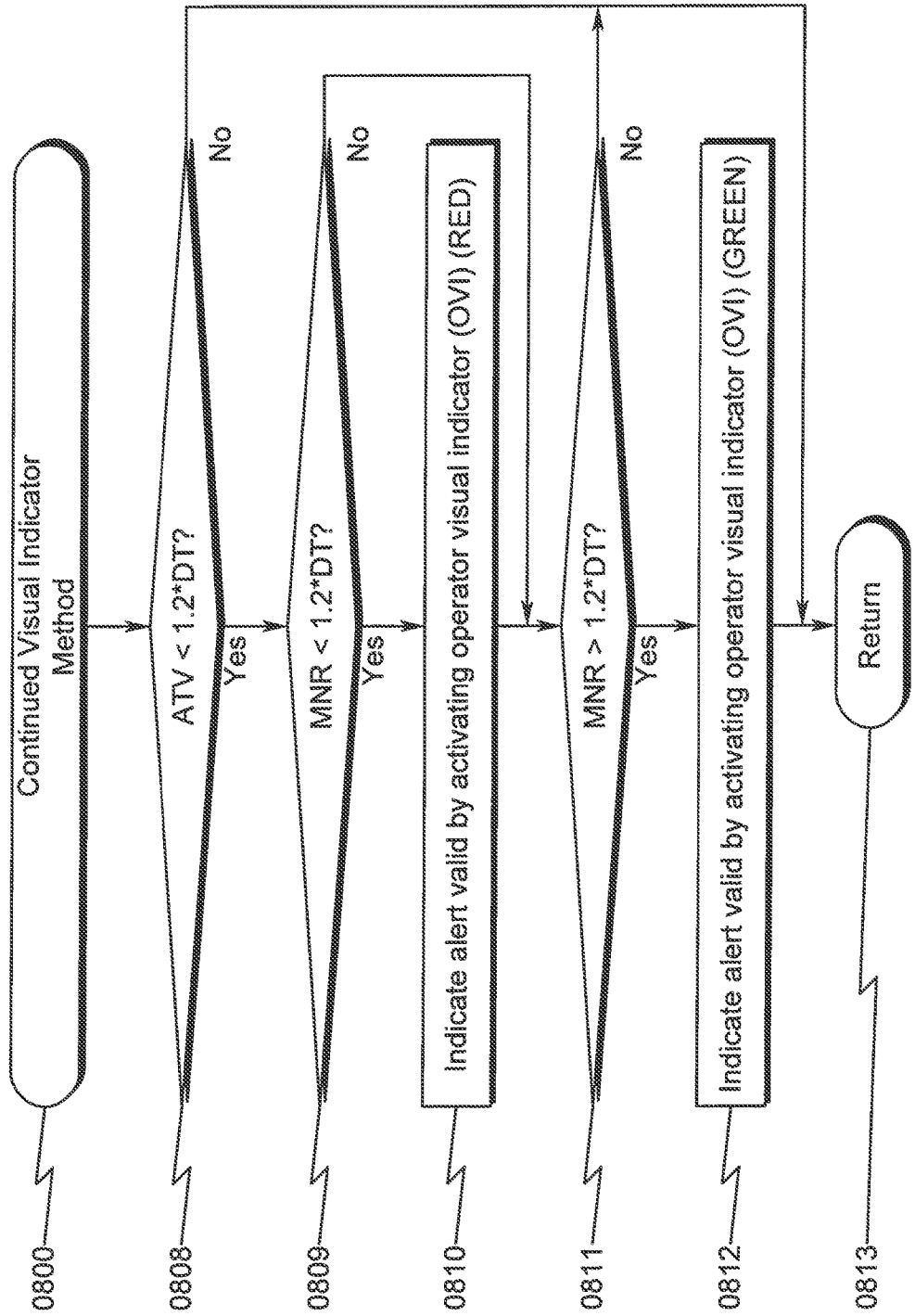
FIG. 8 illustrates a flowchart depicting a preferred radiation probe visual indicator method embodiment (page 2/2)

The radiation probe visual indicator methodology described above may be described graphically as depicted in the method flowcharts of FIG. 7 (0700)-FIG. 8 (0800) and generally comprises the following steps:

(1) Determining if ATV>LLD, and if not, proceeding to step (3) (0701);
(2) Indicate a valid alert by activating a first operator visual indicator (OVI) (GREEN) (0702);
(3) Determining if LLD>ATV>1.2*DT, and if not, proceeding to step (8) (0703);
(4) Determining if MNR<ATV, and if not, proceeding to step (6) (0704);
(5) Indicate a valid alert by activating a second operator visual indicator (OVI) (RED) (0705);
(6) Determining if MNR>1.2*DT, and if not, proceeding to step (8) (0706);
(7) Indicate a valid alert by activating a first operator visual indicator (OVI) (GREEN) (0707);
(8) Determining if ATV<1.2*DT, and if not, proceeding to step (13) (0808);
(9) Determining if MNR<1.2*DT, and if not, proceeding to step (11) (0809);
(10) Indicate a valid alert by activating a second operator visual indicator (OVI) (RED) (0810);
(11) Determining if MNR>1.2*DT, and if not, proceeding to step (13) (0811);
(12) Indicate a valid alert by activating a first operator visual indicator (OVI) (GREEN) (0812);
(13) Terminating the visual indicator procedure (0813).

One skilled in the art will recognize that these method steps may be augmented or rearranged without limiting the teachings of the present invention. This general method summary may be augmented by the various elements described herein to produce a wide variety of invention embodiments consistent with this overall design description.

Within the context of the present invention, the DSF value of 1.2 provided in the above example is only one possible DSF value greater than unity that may be used to perform the threshold analysis for visual indicators. Generically, the DSF value may take a variety of values greater than unity (1) in various invention embodiments.

Exemplary Alarm/Indicator Flowcharts (0900)

Figure 9:
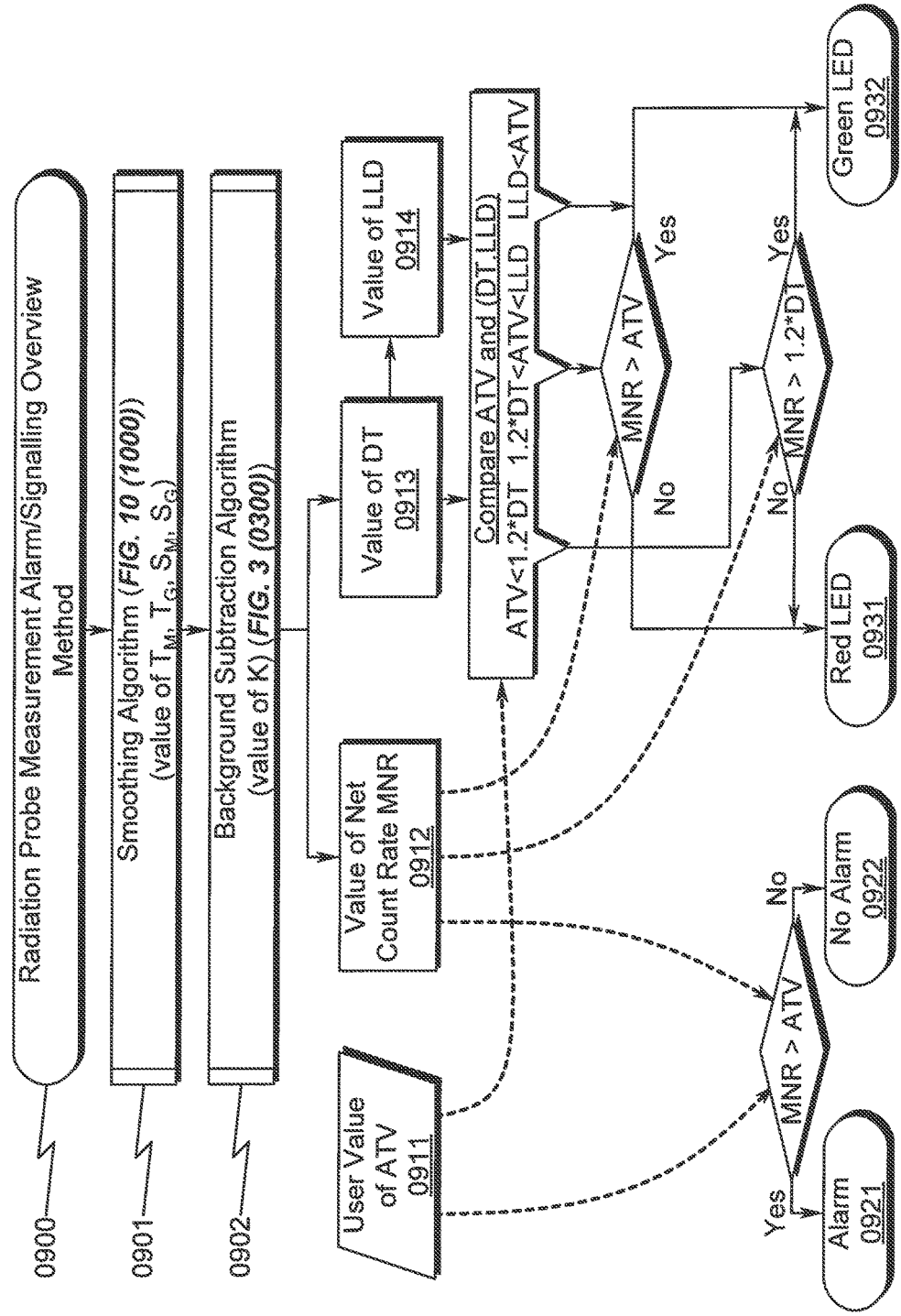
FIG. 9 illustrates a flowchart depicting an overview of alarm and LED indicator functionality in a preferred invention embodiment.

The alarm/indicator methodology described above may be described generally as depicted in the flowchart of FIG. 9 (0900). This flowchart provide sufficient information for one of ordinary skill in the programming arts to implement the alarm/indicator functionality described above.

As generally depicted in FIG. 9 (0900), the conditions of the ALARM (0921, 0922) and RED/GREEN LED (0931, 0932) are determined based on the user alarm threshold value (ATV) (0911), net count rate MNR (0912), value of detection threshold (DT) (0913), and value of lower limit of detection (LLD) (0914) as indicated. This permit alarms to be generated but qualified by the RED/GREEN LED (0931, 0932) as being valid for the measured radiation sample.

Figure 33:
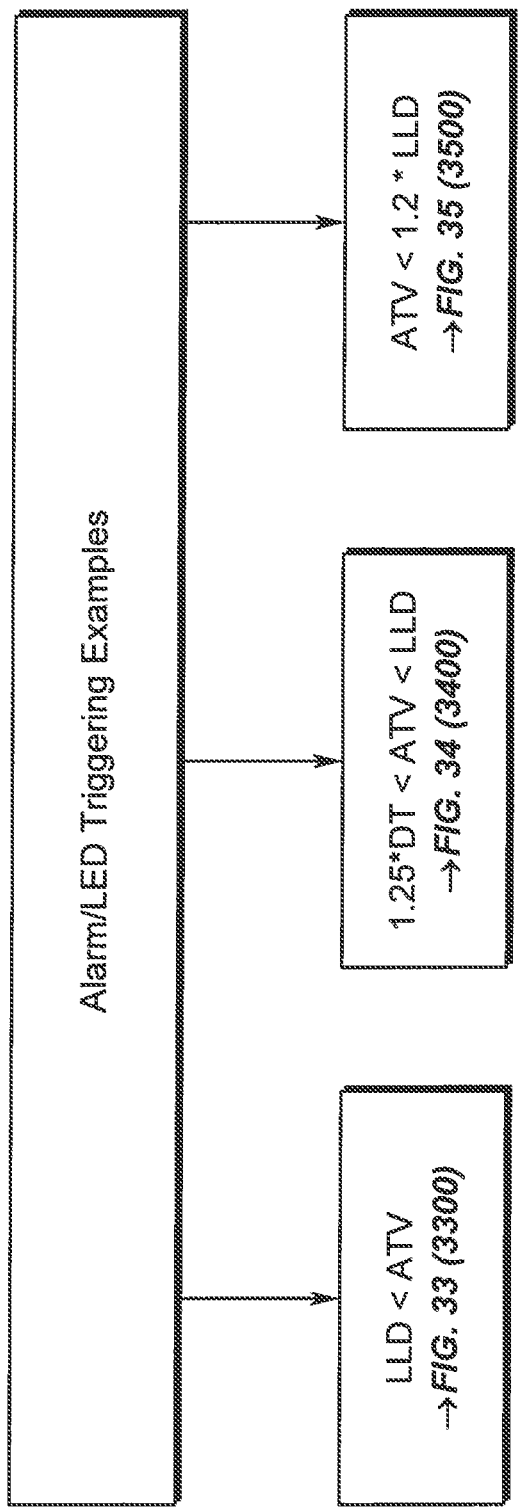
FIG. 33 illustrates a flowchart depicting an overview of alarm and LED triggering modes of operation.
Figure 34:
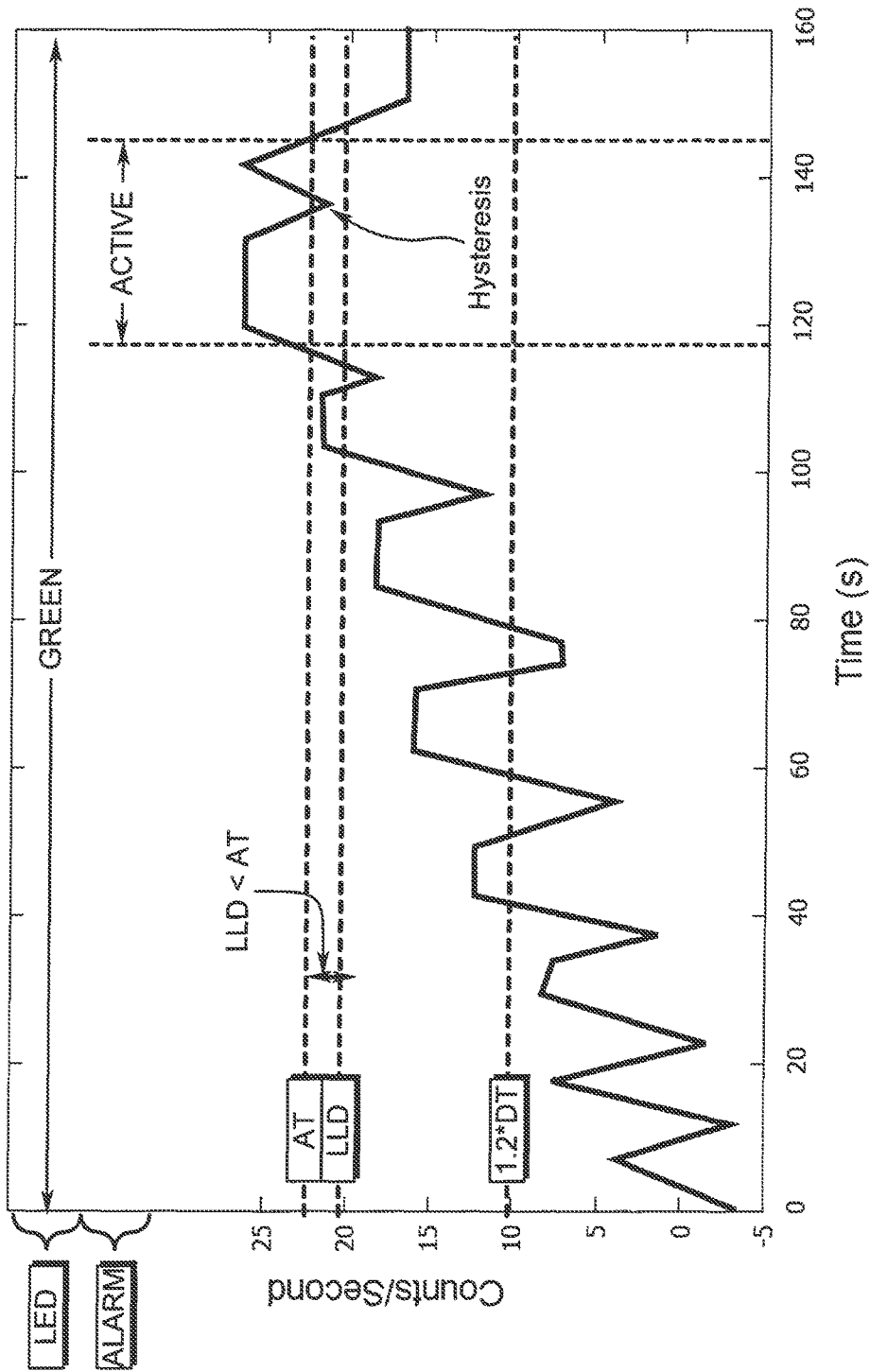
Figure 35:
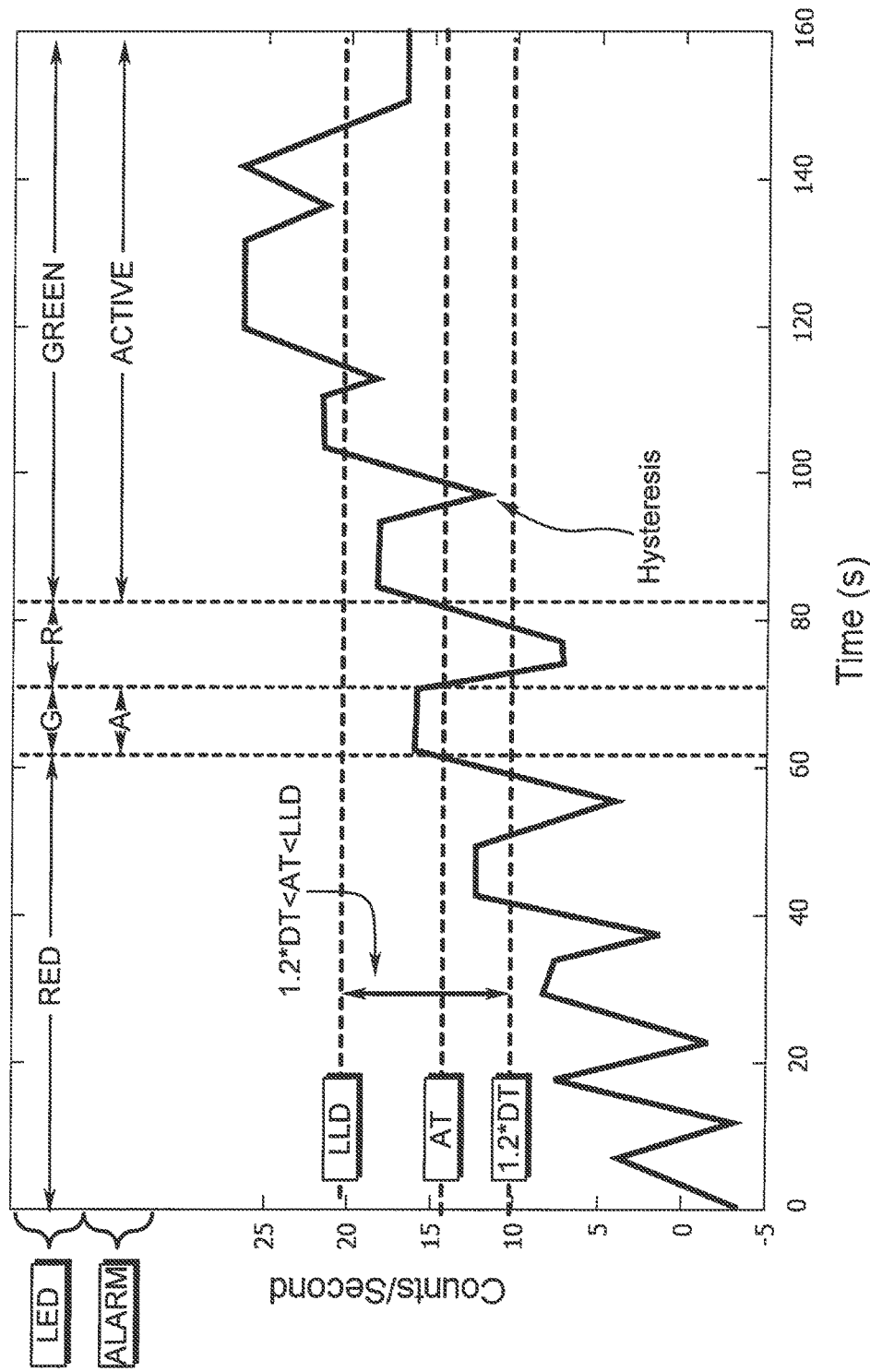
FIG. 35 illustrates an example of alarm and LED triggering with 1.2*DT<AT<LLD.
Figure 36:
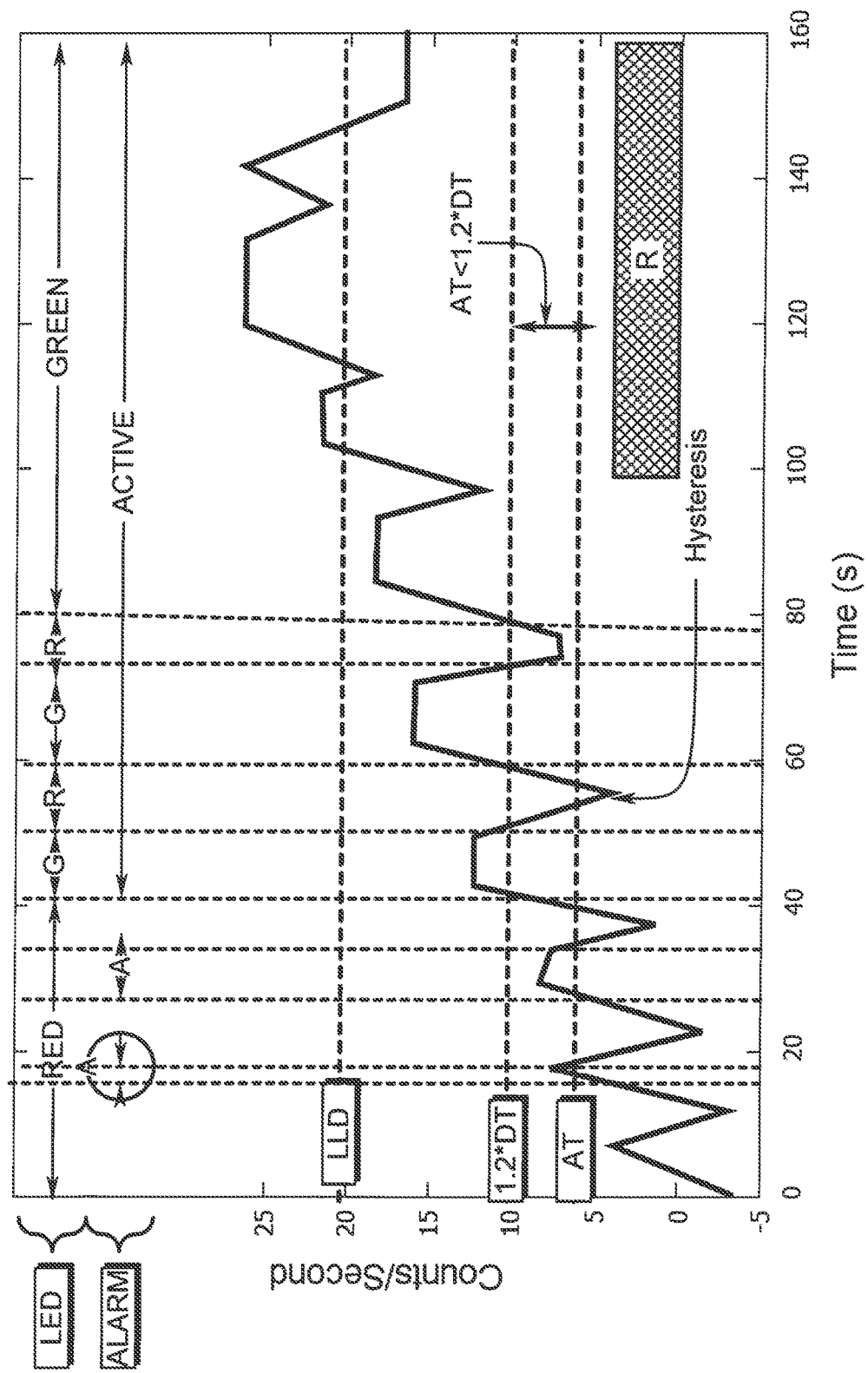
FIG. 36 illustrates an example of alarm and LED triggering with AT<1.2*DT.

Examples of this algorithm in use are depicted in the alarm scenarios of FIG. 33 (3300)-FIG. 36 (3600).

Exemplary Smoothing Algorithm (1000)-(3200)

Figure 10:
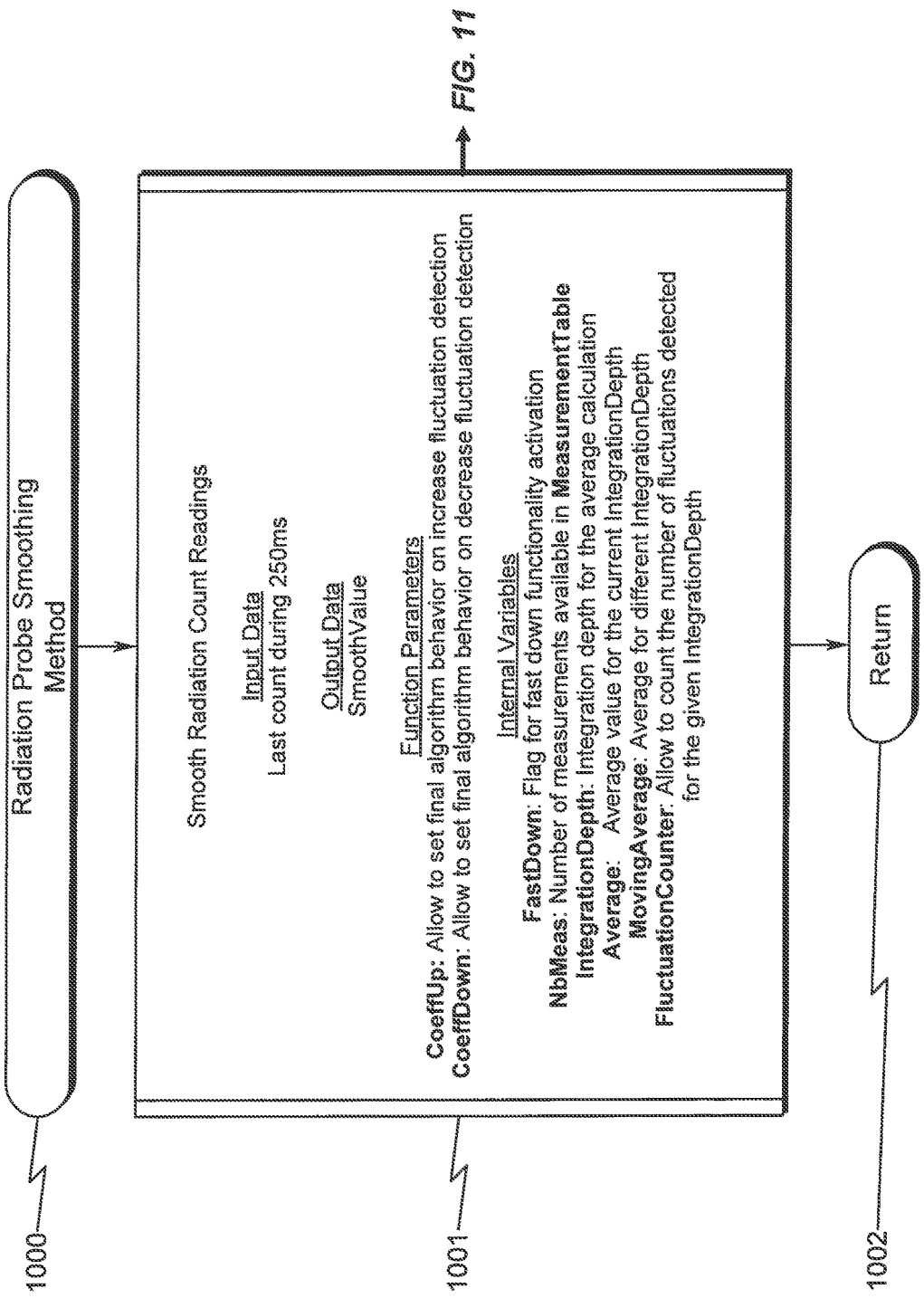
FIG. 10 illustrates a flowchart depicting a preferred measurement smoothing method useful in some invention embodiments (page 1/23)
Figure 11:
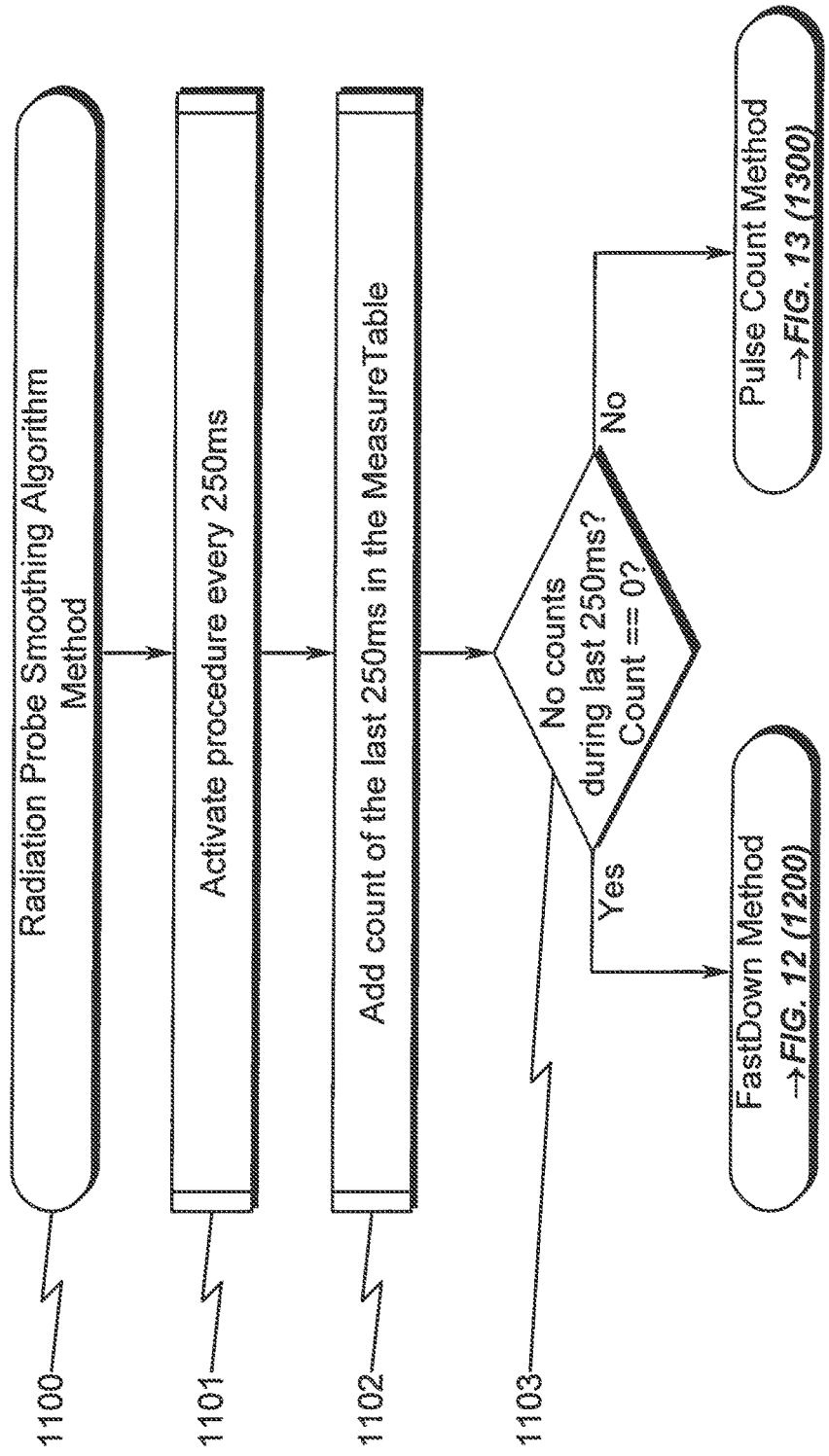
FIG. 11 illustrates a flowchart depicting a preferred measurement smoothing method useful in some invention embodiments (page 2/23)
Figure 12:
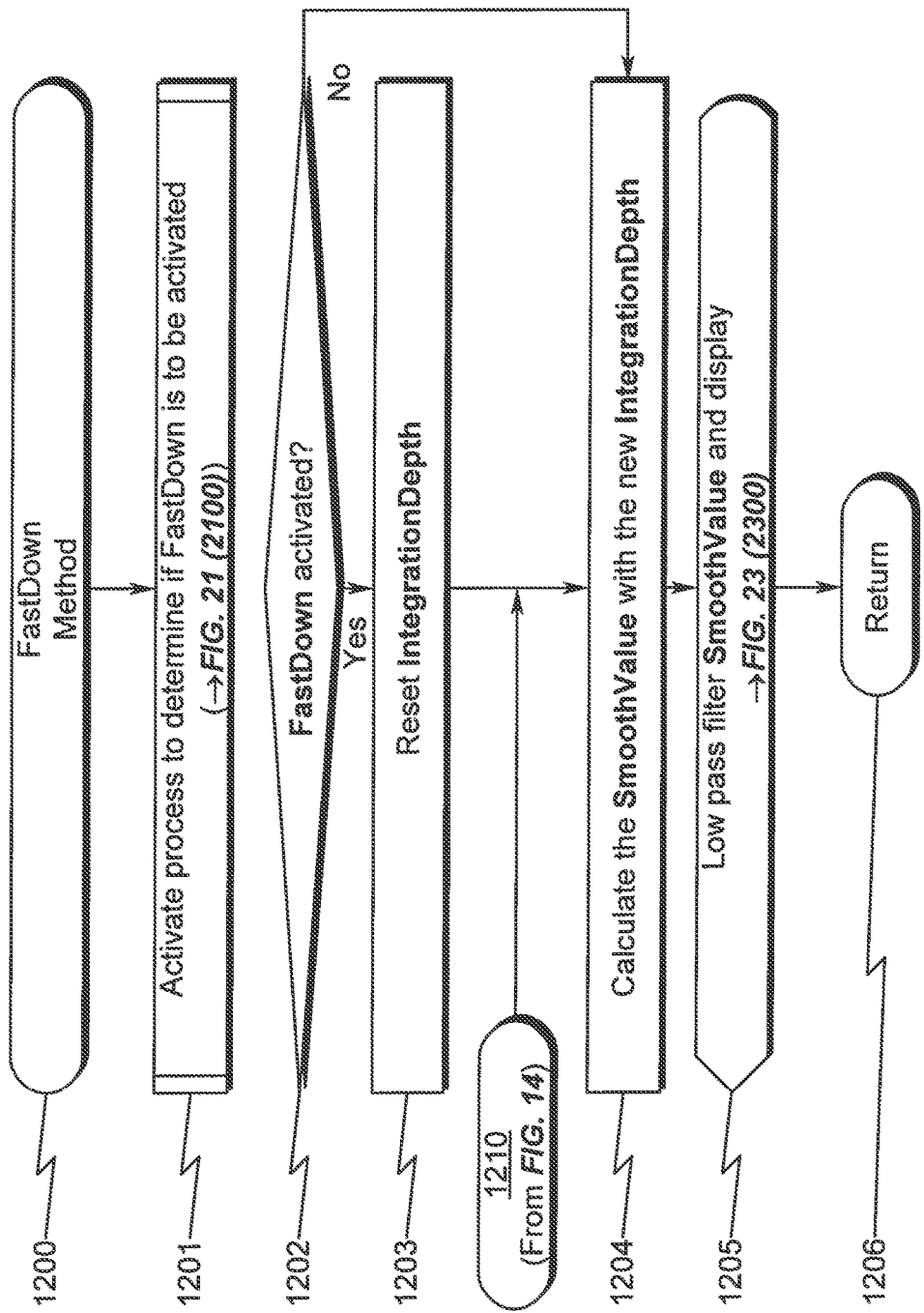
FIG. 12 illustrates a flowchart depicting a preferred measurement smoothing method useful in some invention embodiments (page 3/23)
Figure 13:
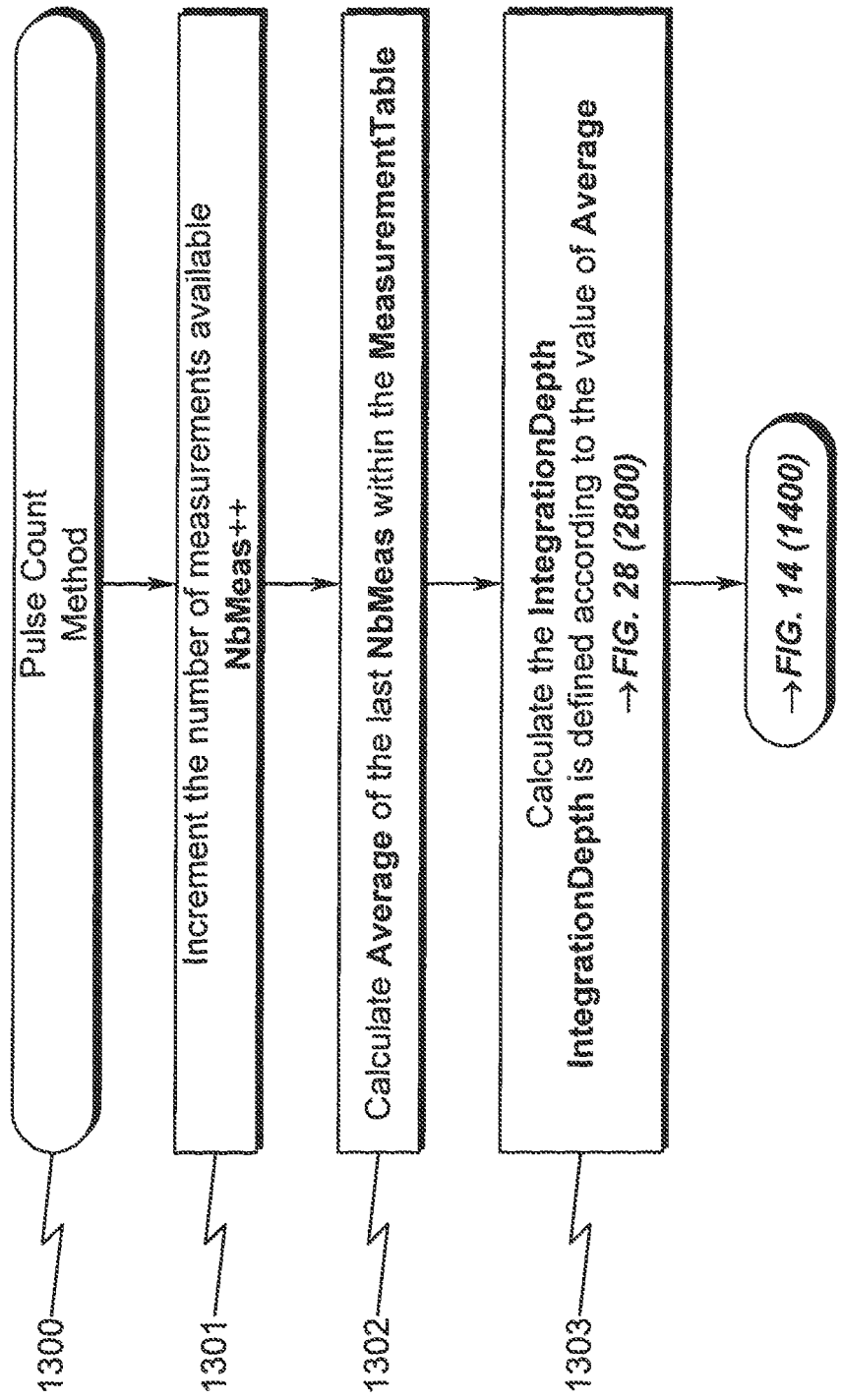
FIG. 13 illustrates a flowchart depicting a preferred measurement smoothing method useful in some invention embodiments (page 4/23)
Figure 14:
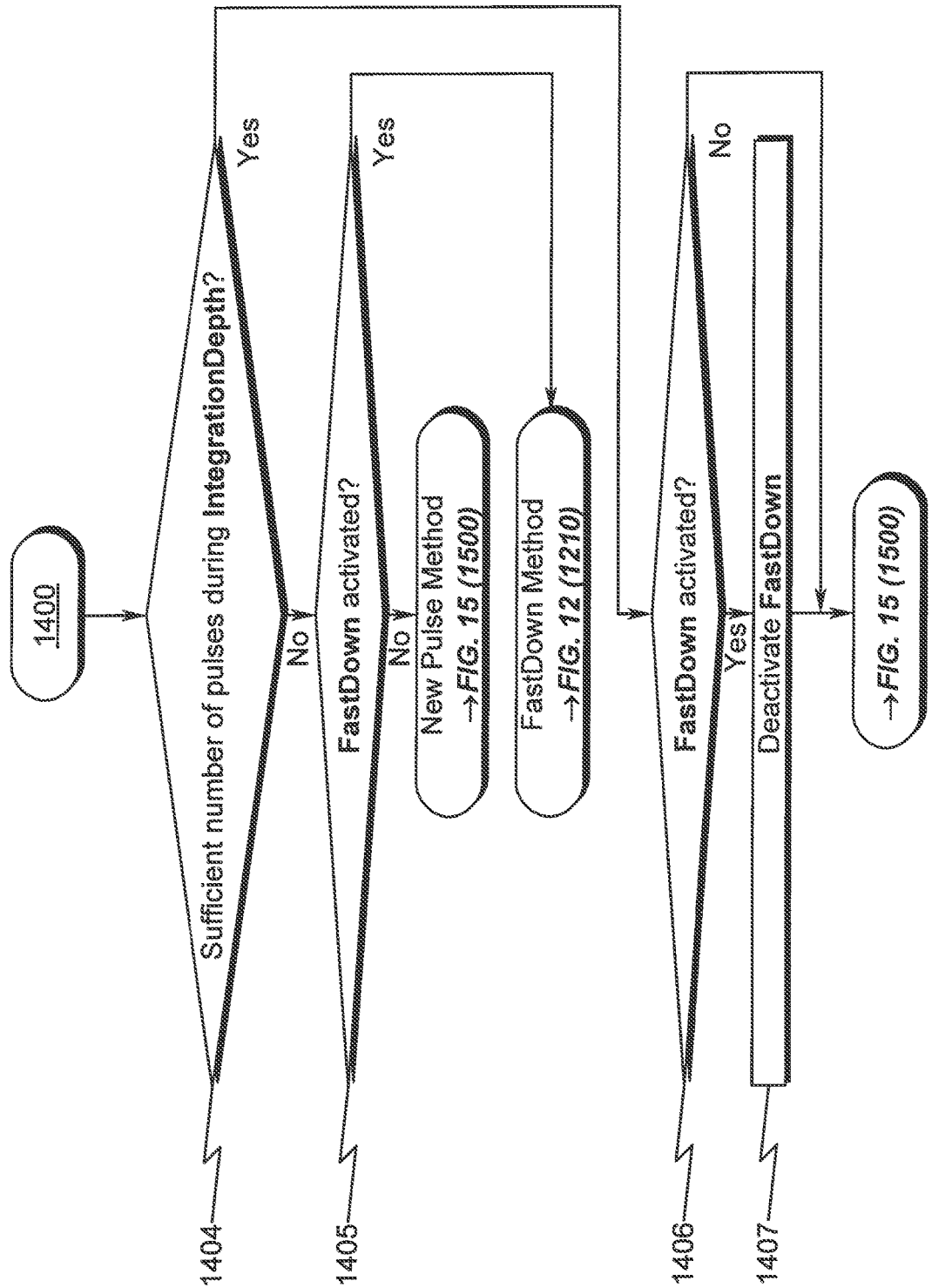
FIG. 14 illustrates a flowchart depicting a preferred measurement smoothing method useful in some invention embodiments (page 5/23)
Figure 15:
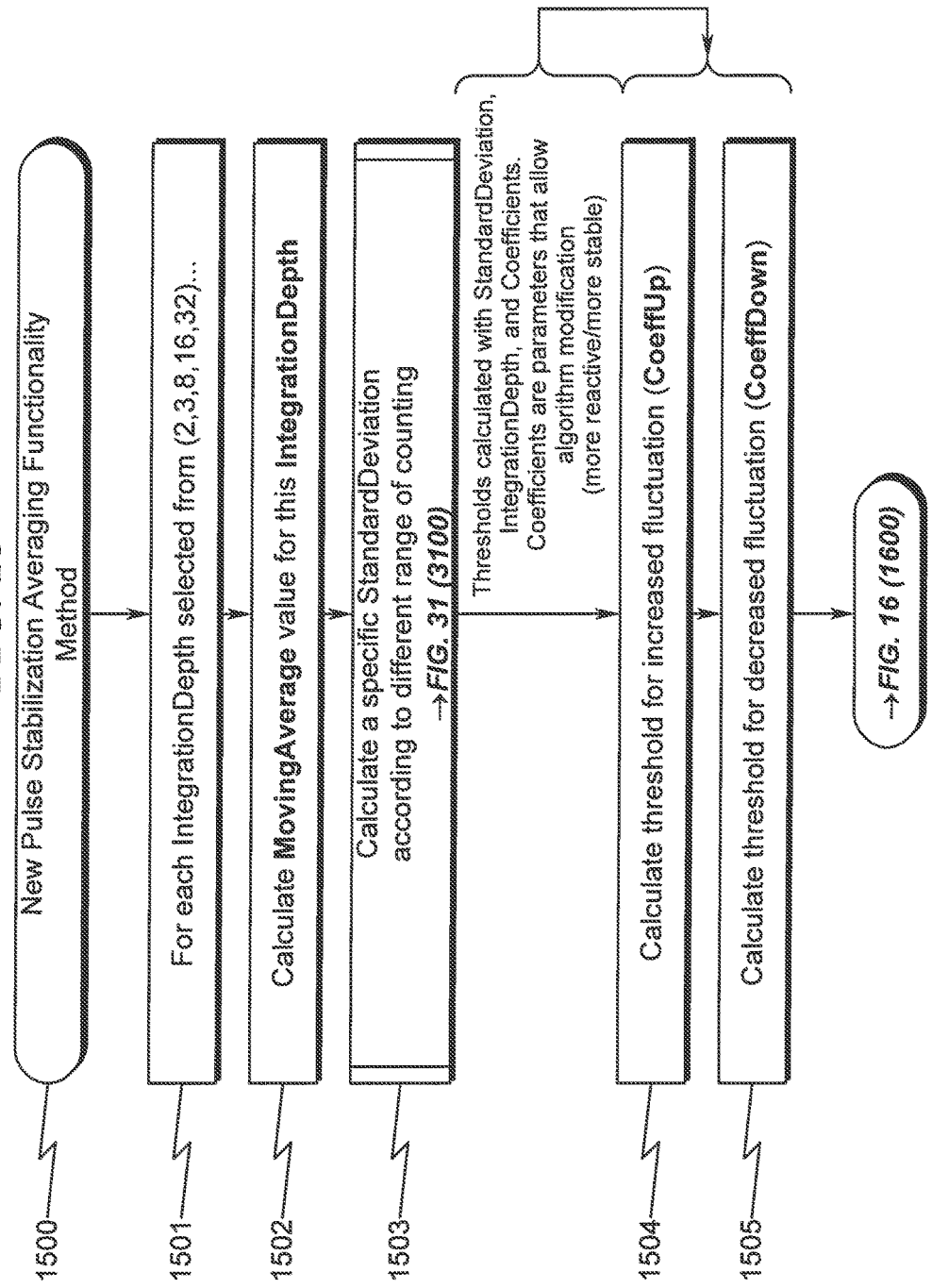
FIG. 15 illustrates a flowchart depicting a preferred measurement smoothing method useful in some invention embodiments (page 6/23)
Figure 16:
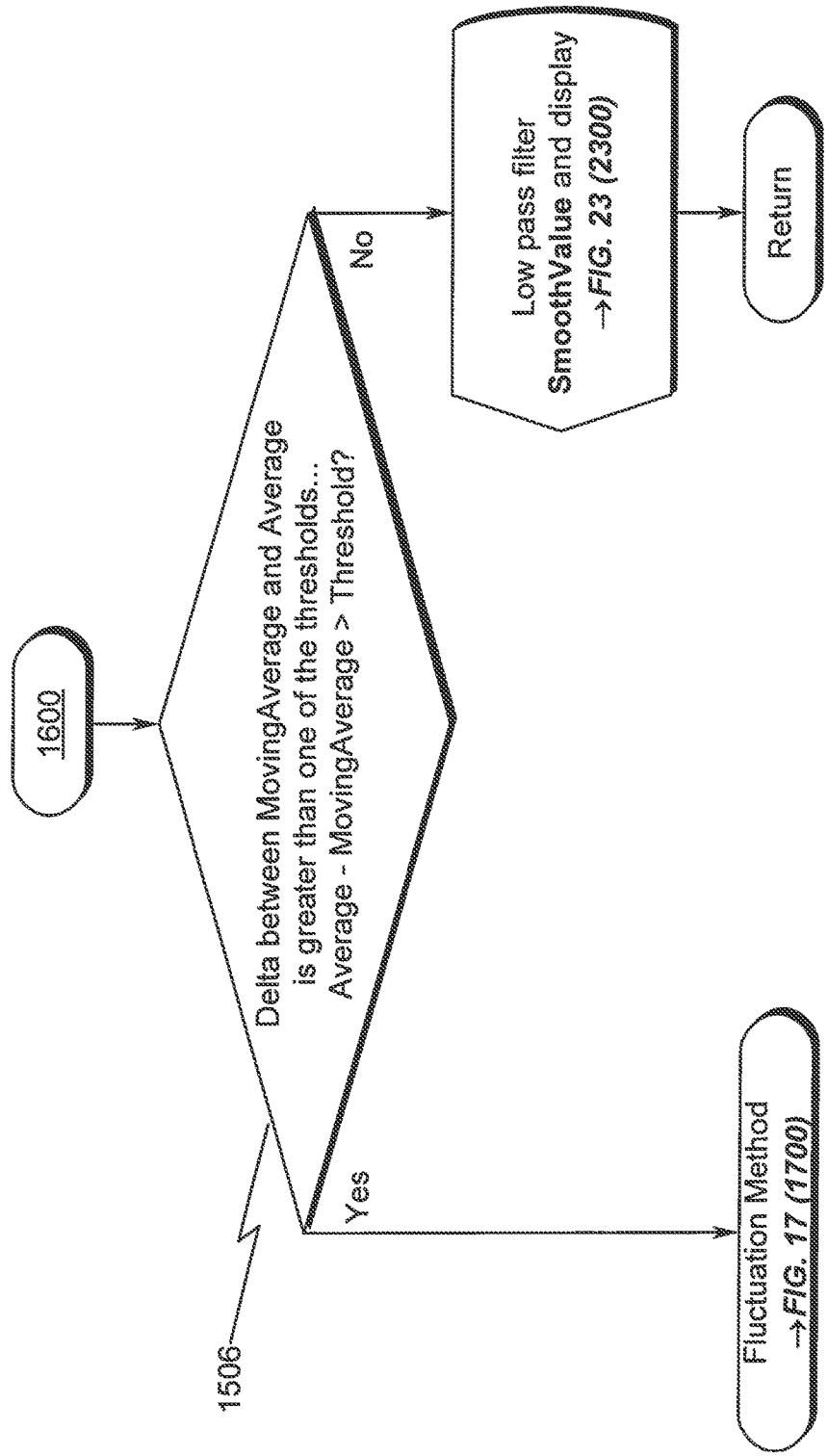
FIG. 16 illustrates a flowchart depicting a preferred measurement smoothing method useful in some invention embodiments (page 7/23)
Figure 17:
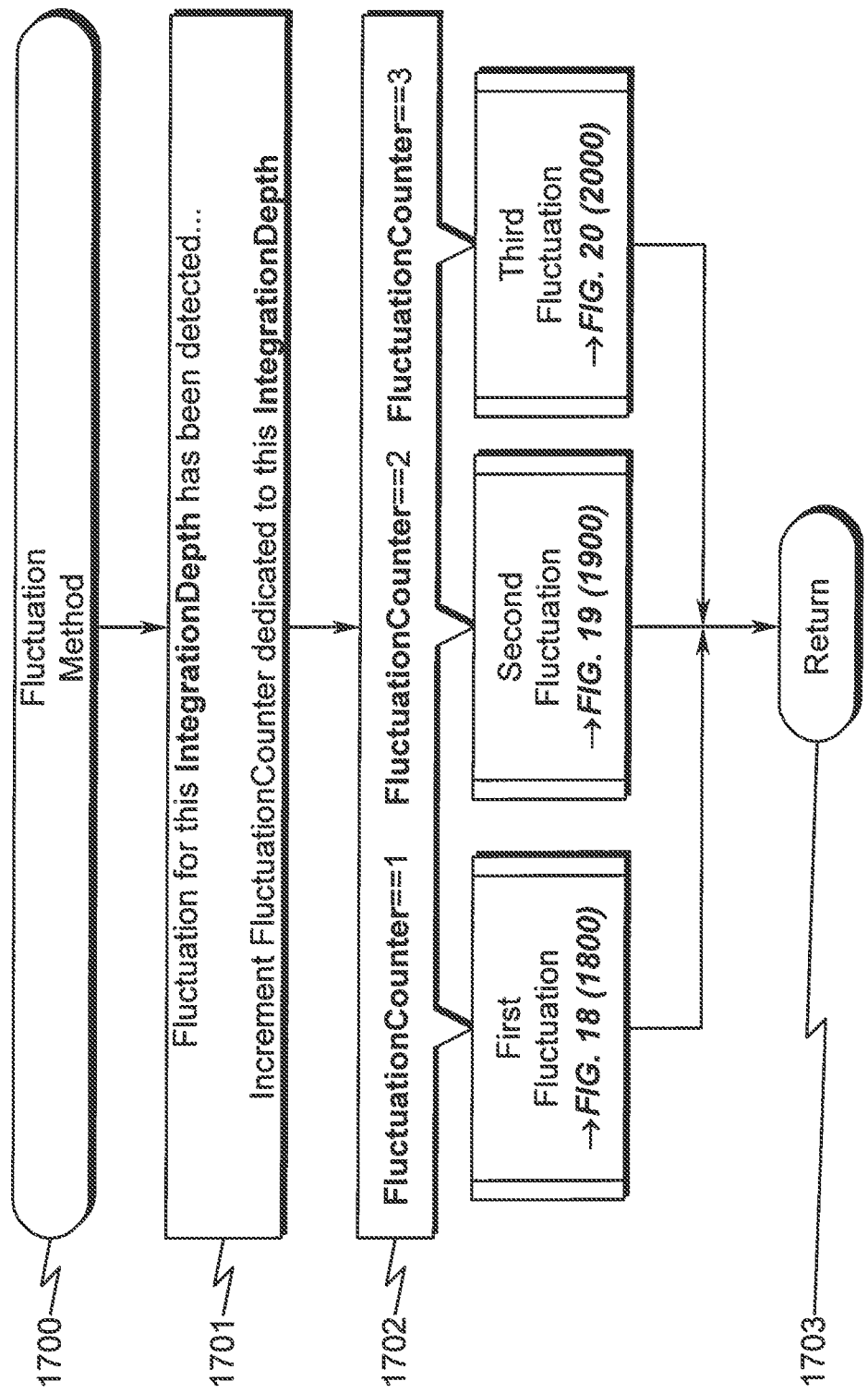
FIG. 17 illustrates a flowchart depicting a preferred measurement smoothing method useful in some invention embodiments (page 8/23)
Figure 18:
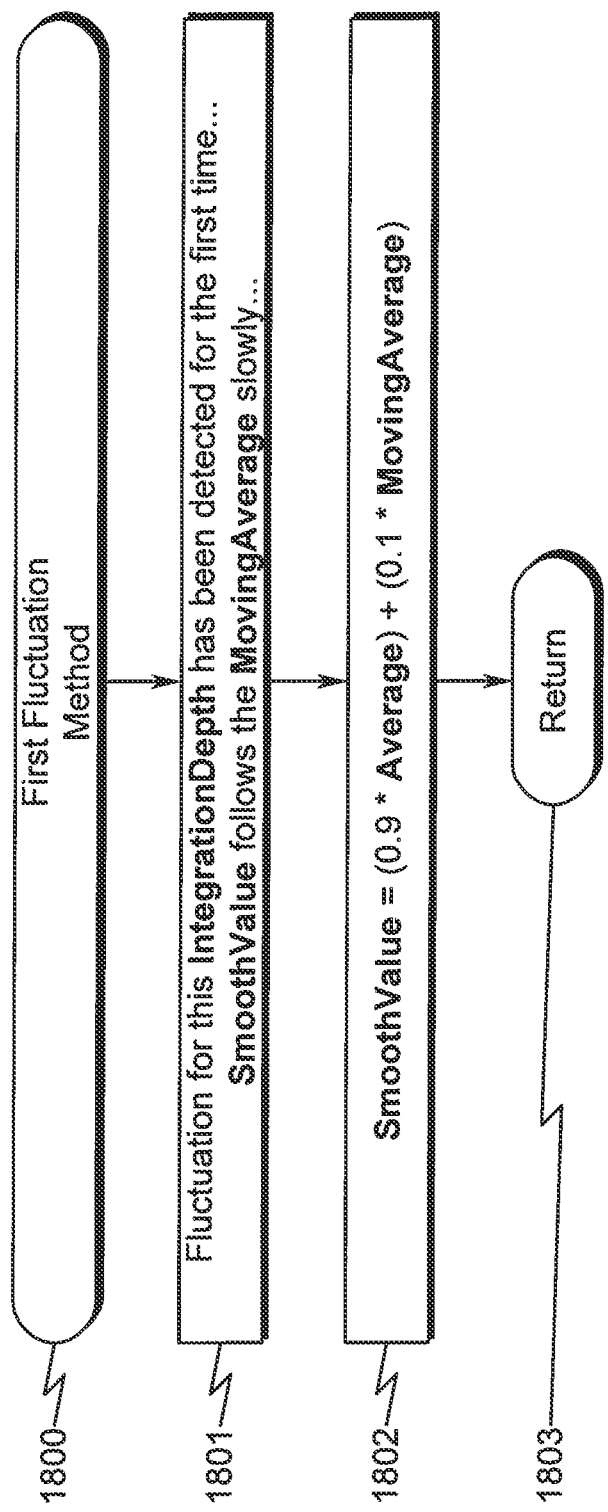
FIG. 18 illustrates a flowchart depicting a preferred measurement smoothing method useful in some invention embodiments (page 9/23)
Figure 19:
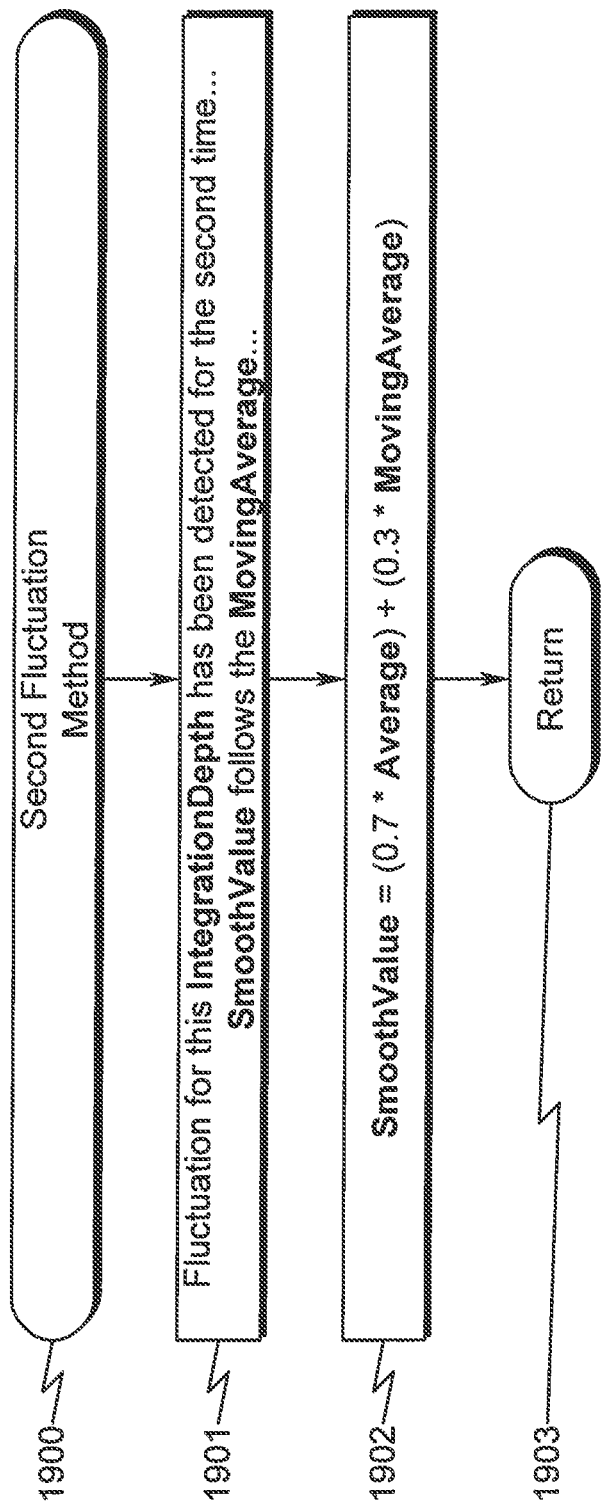
FIG. 19 illustrates a flowchart depicting a preferred measurement smoothing method useful in some invention embodiments (page 10/23)
Figure 20:
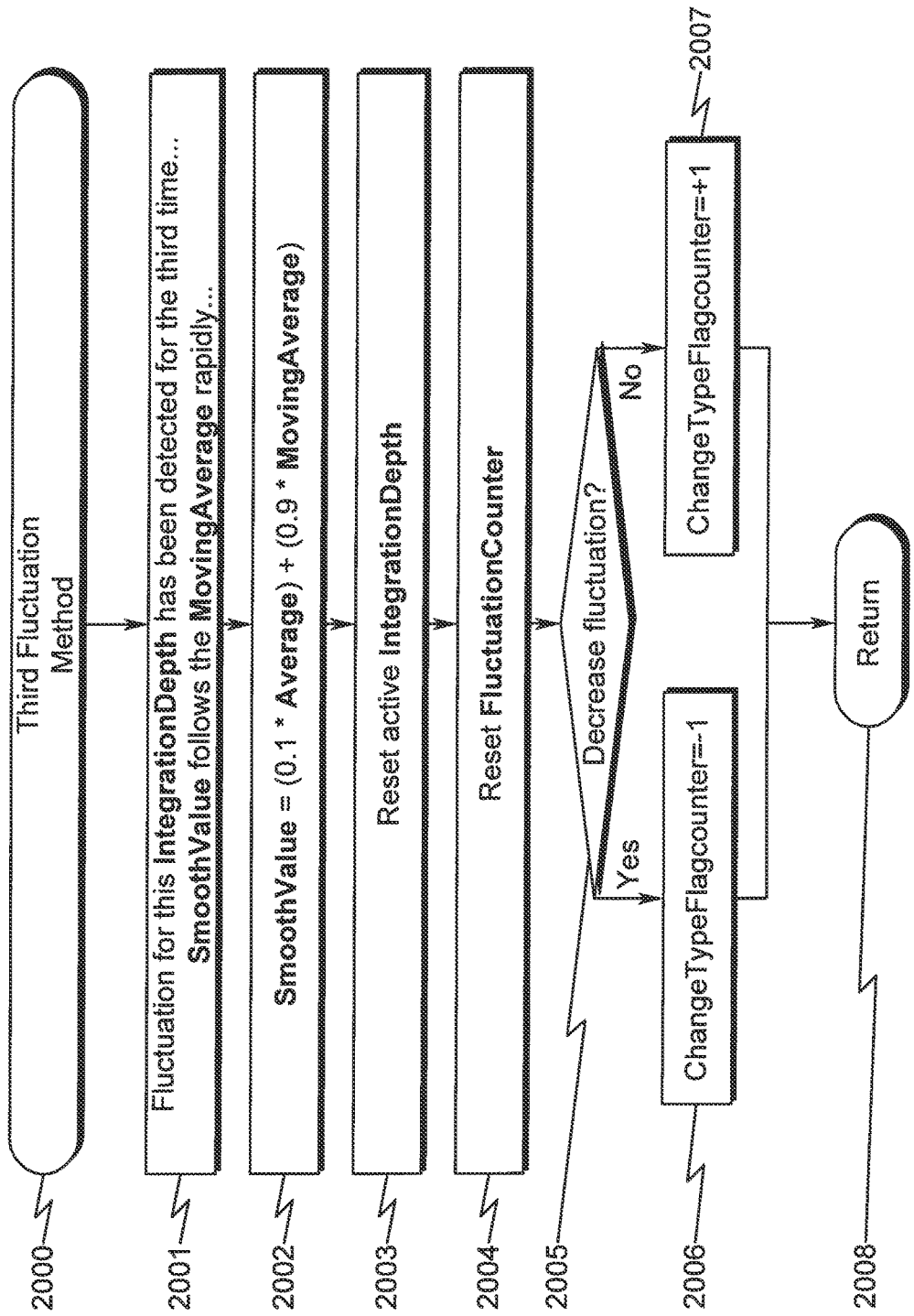
FIG. 20 illustrates a flowchart depicting a preferred measurement smoothing method useful in some invention embodiments (page 11/23)
Figure 21:
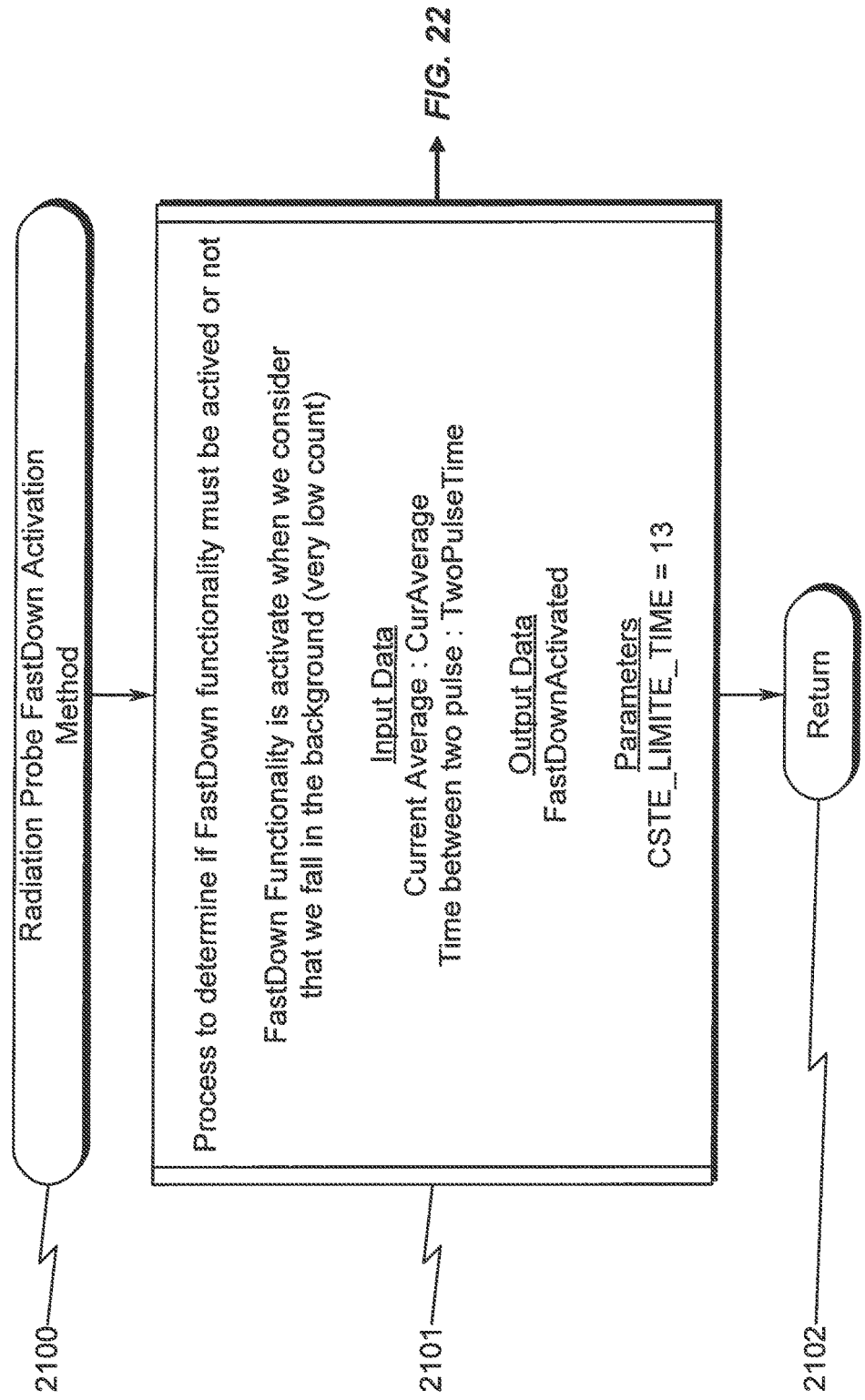
FIG. 21 illustrates a flowchart depicting a preferred measurement smoothing method useful in some invention embodiments (page 12/23)
Figure 22:
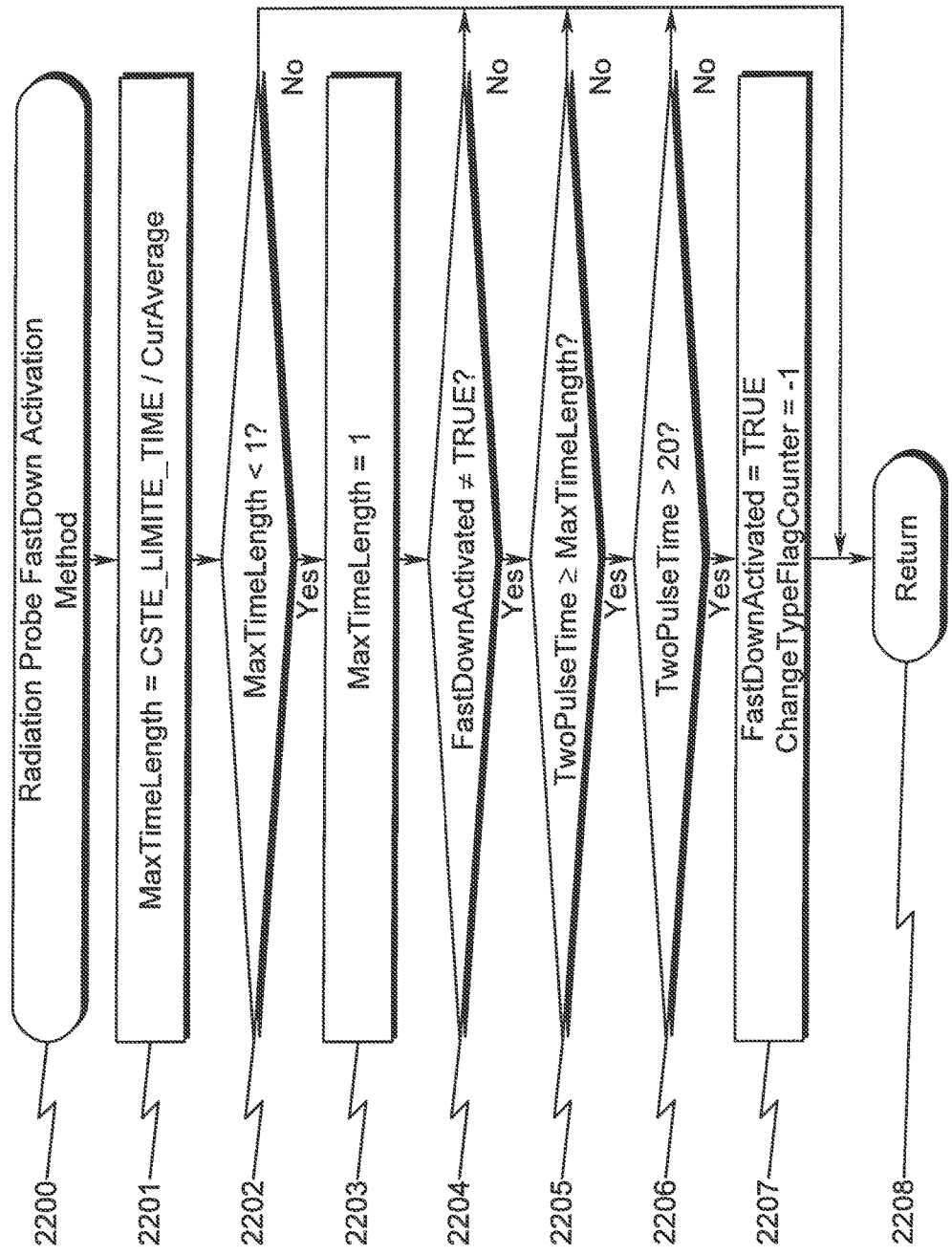
FIG. 22 illustrates a flowchart depicting a preferred measurement smoothing method useful in some invention embodiments (page 13/23)
Figure 23:
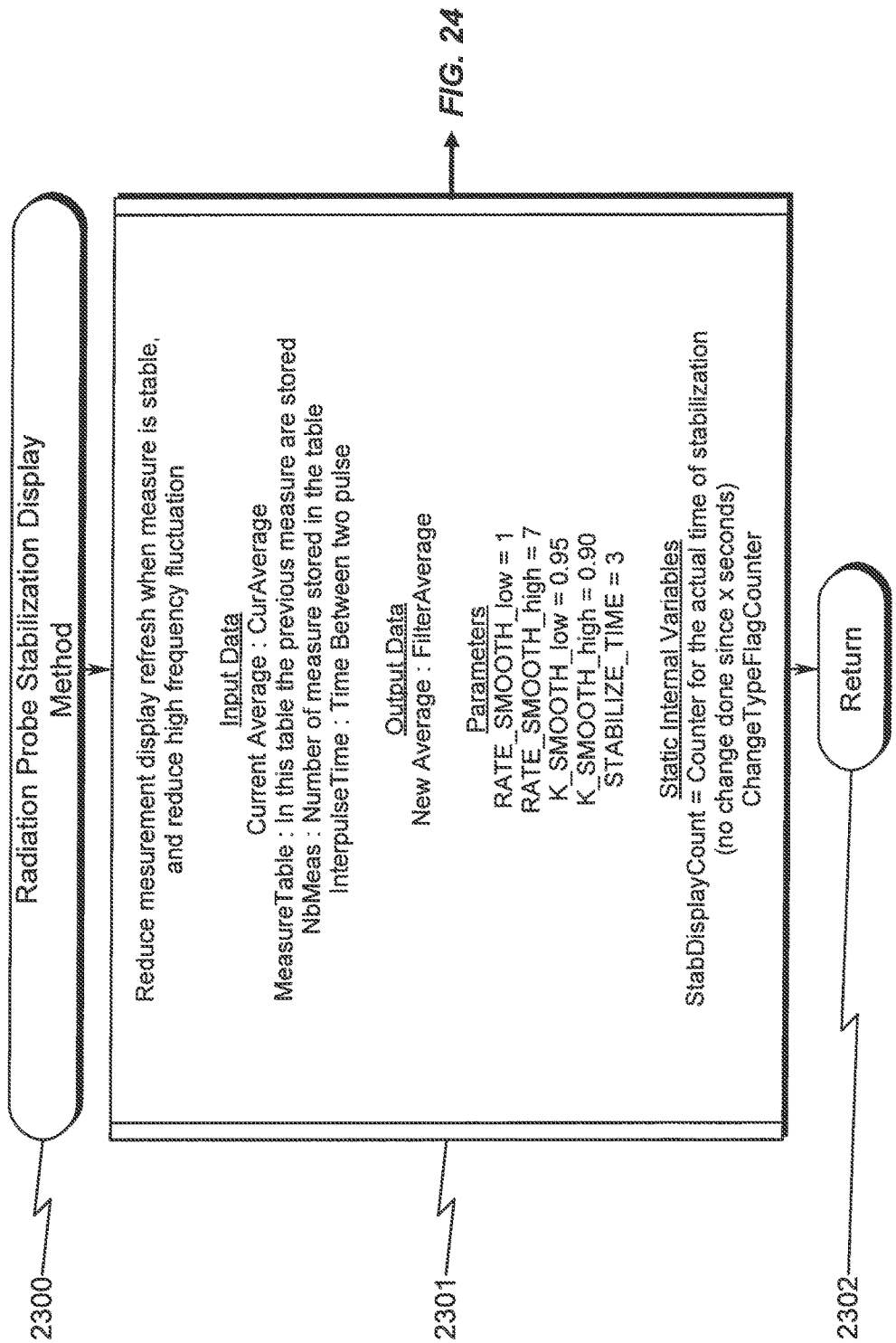
FIG. 23 illustrates a flowchart depicting a preferred measurement smoothing method useful in some invention embodiments (page 14/23)
Figure 24:
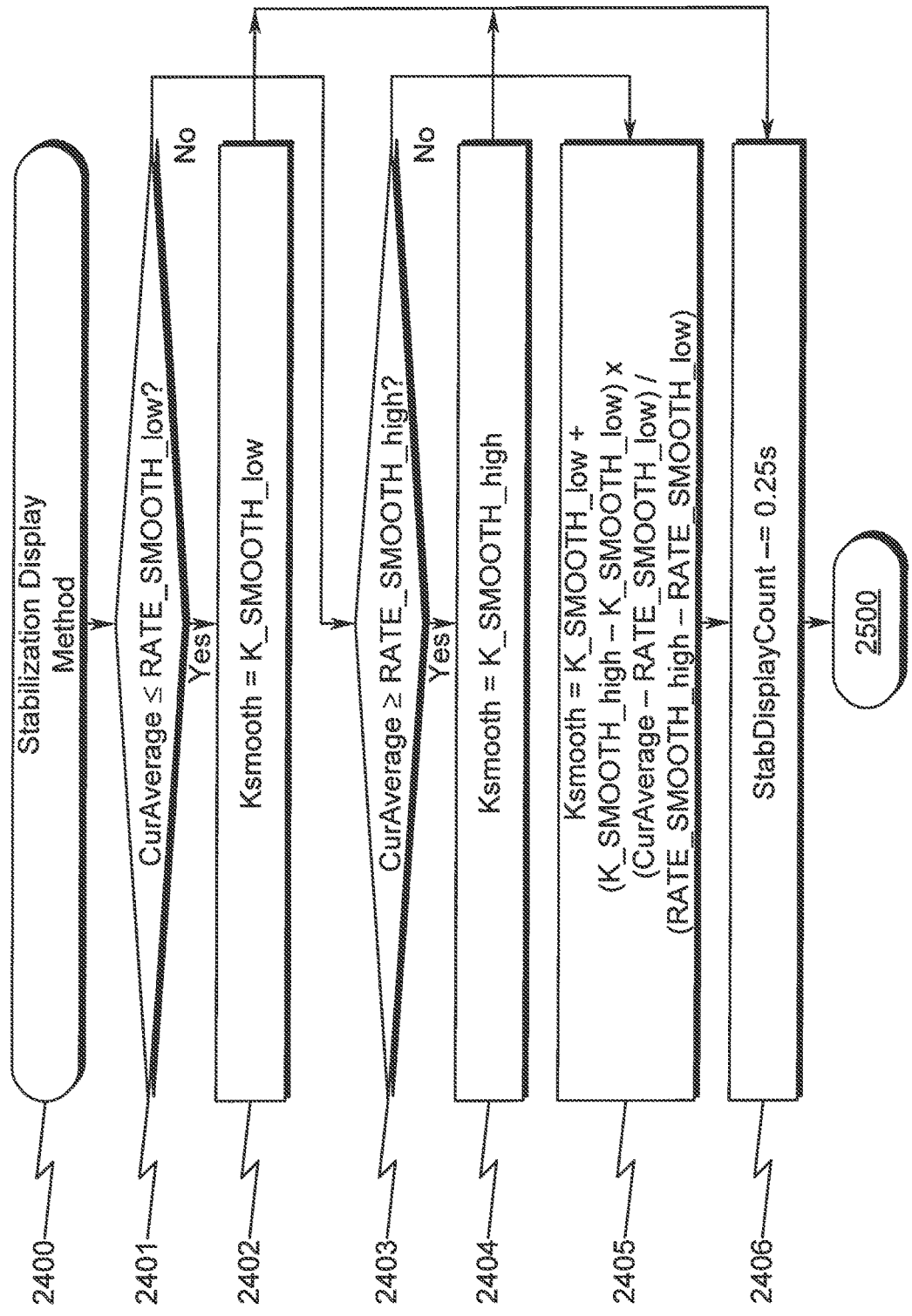
FIG. 24 illustrates a flowchart depicting a preferred measurement smoothing method useful in some invention embodiments (page 15/23)
Figure 25:
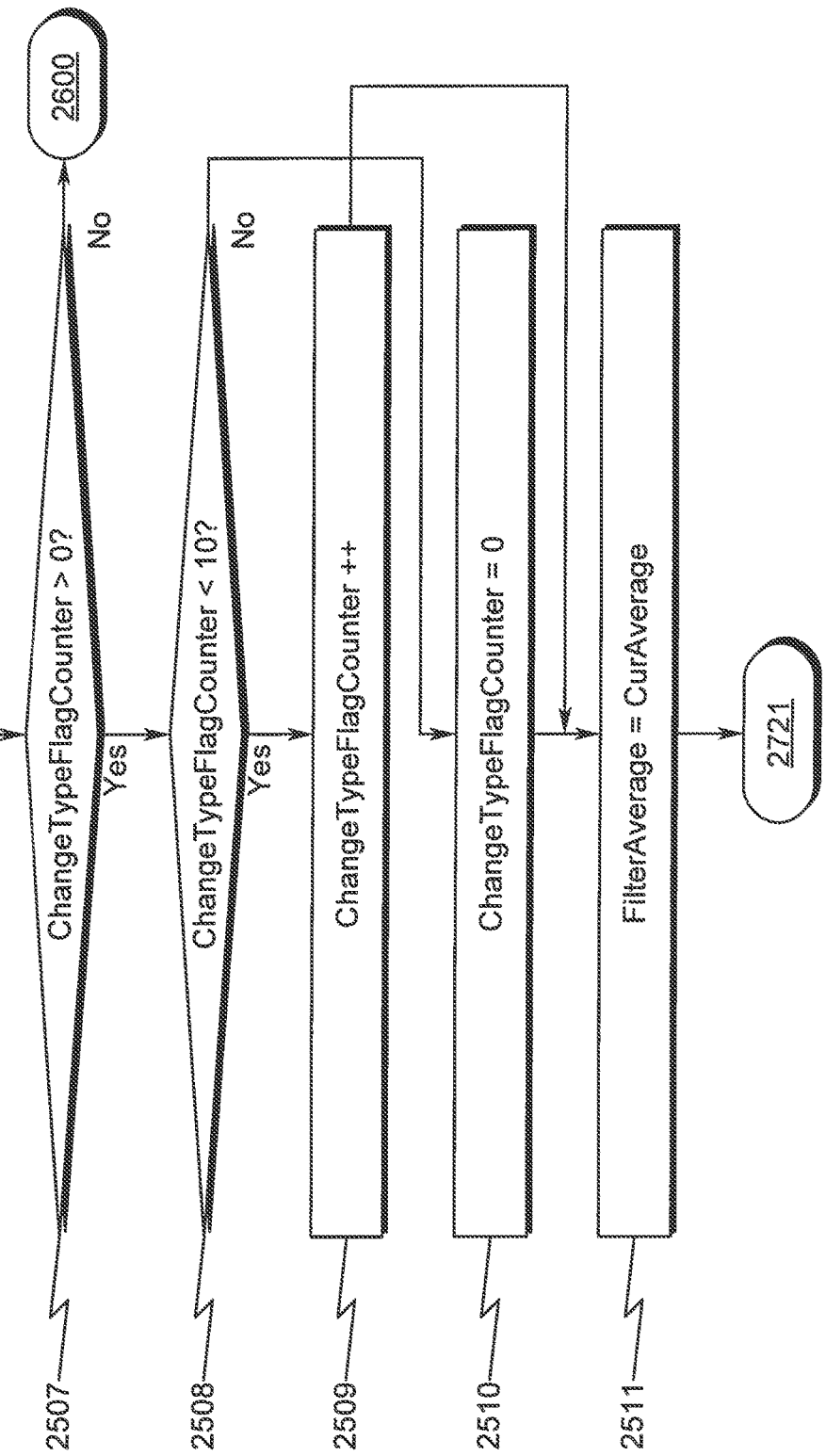
FIG. 25 illustrates a flowchart depicting a preferred measurement smoothing method useful in some invention embodiments (page 16/23)
Figure 26:
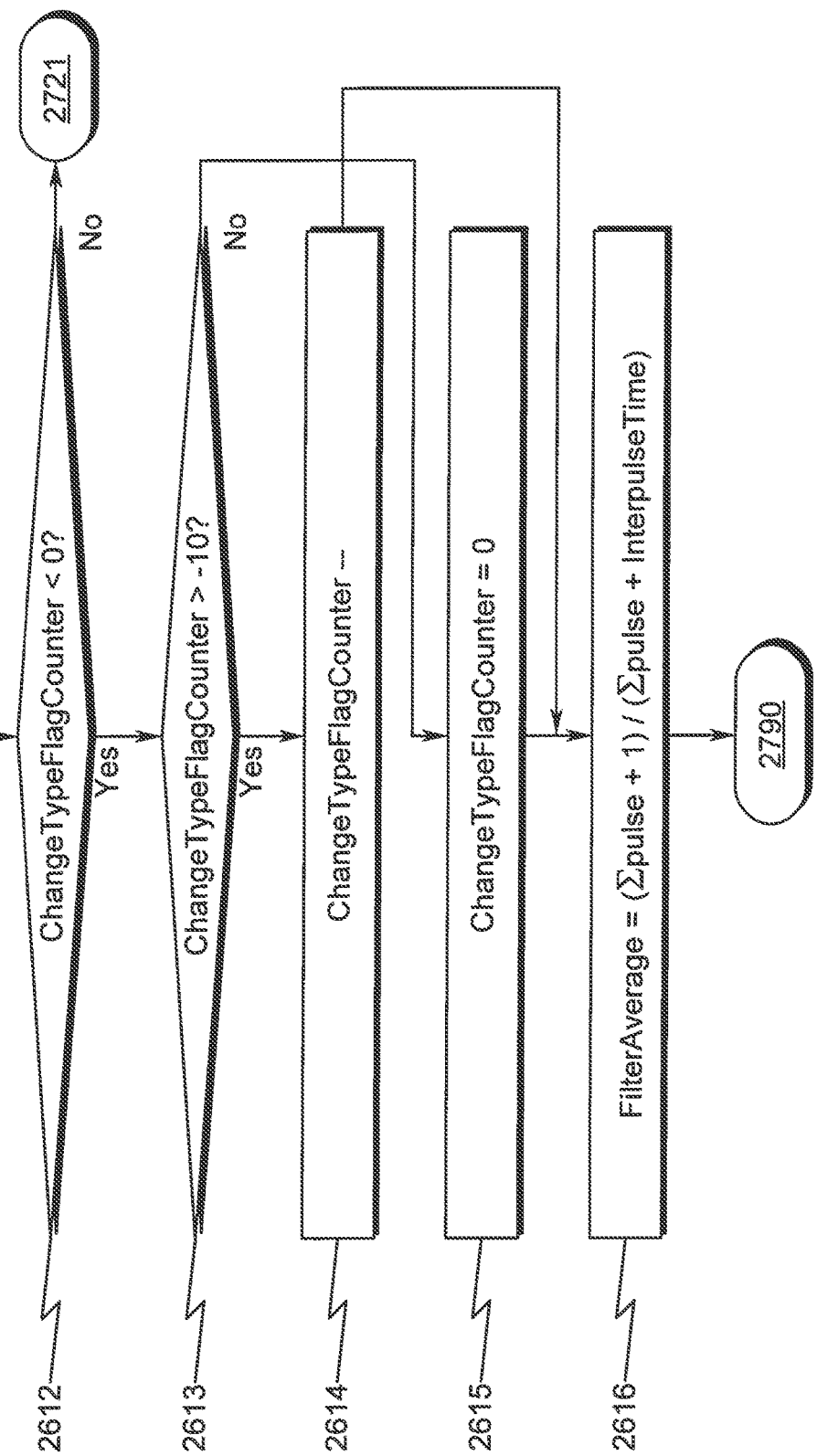
FIG. 26 illustrates a flowchart depicting a preferred measurement smoothing method useful in some invention embodiments (page 17/23)
Figure 27:
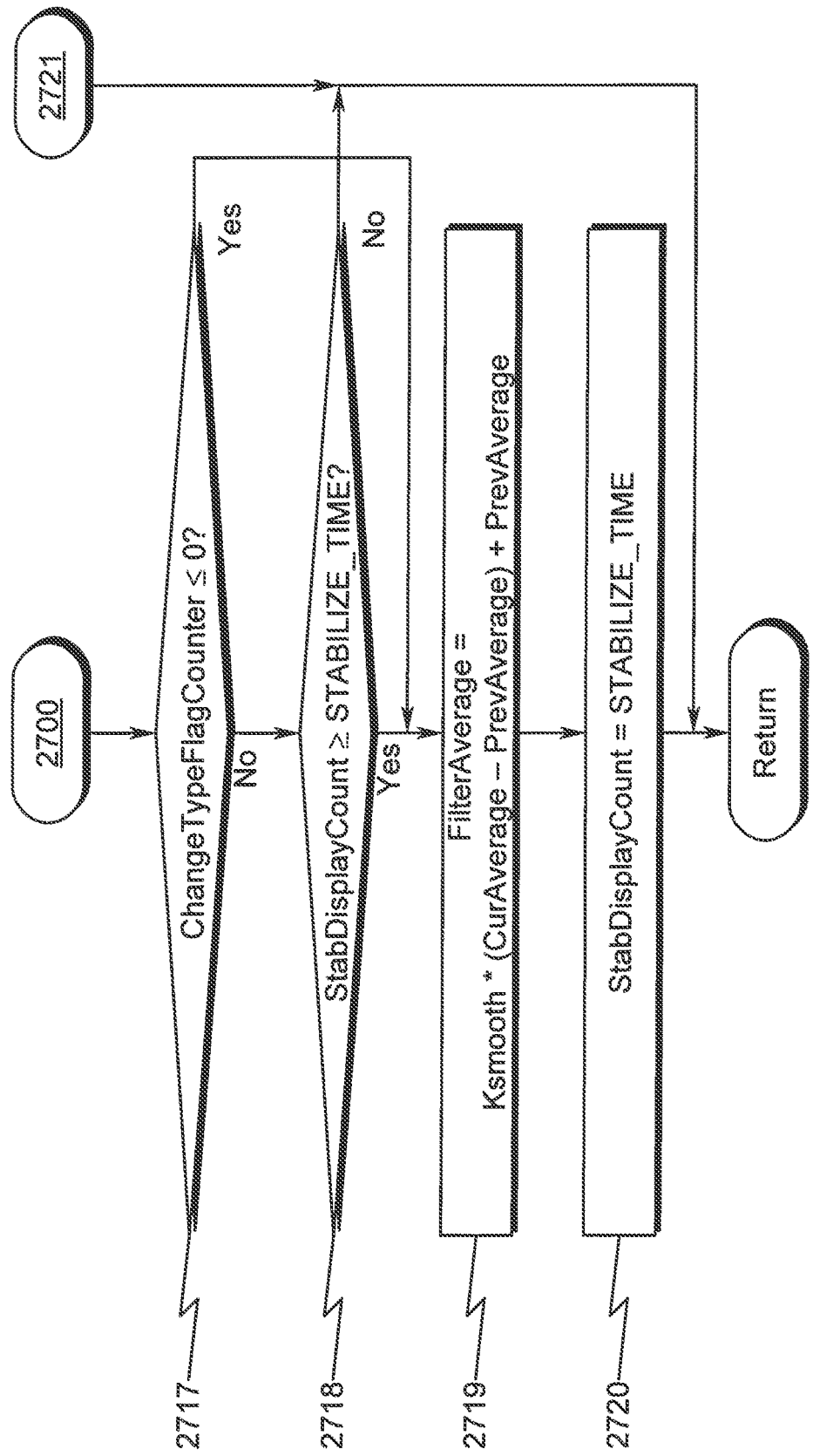
FIG. 27 illustrates a flowchart depicting a preferred measurement smoothing method useful in some invention embodiments (page 18/23)
Figure 28:
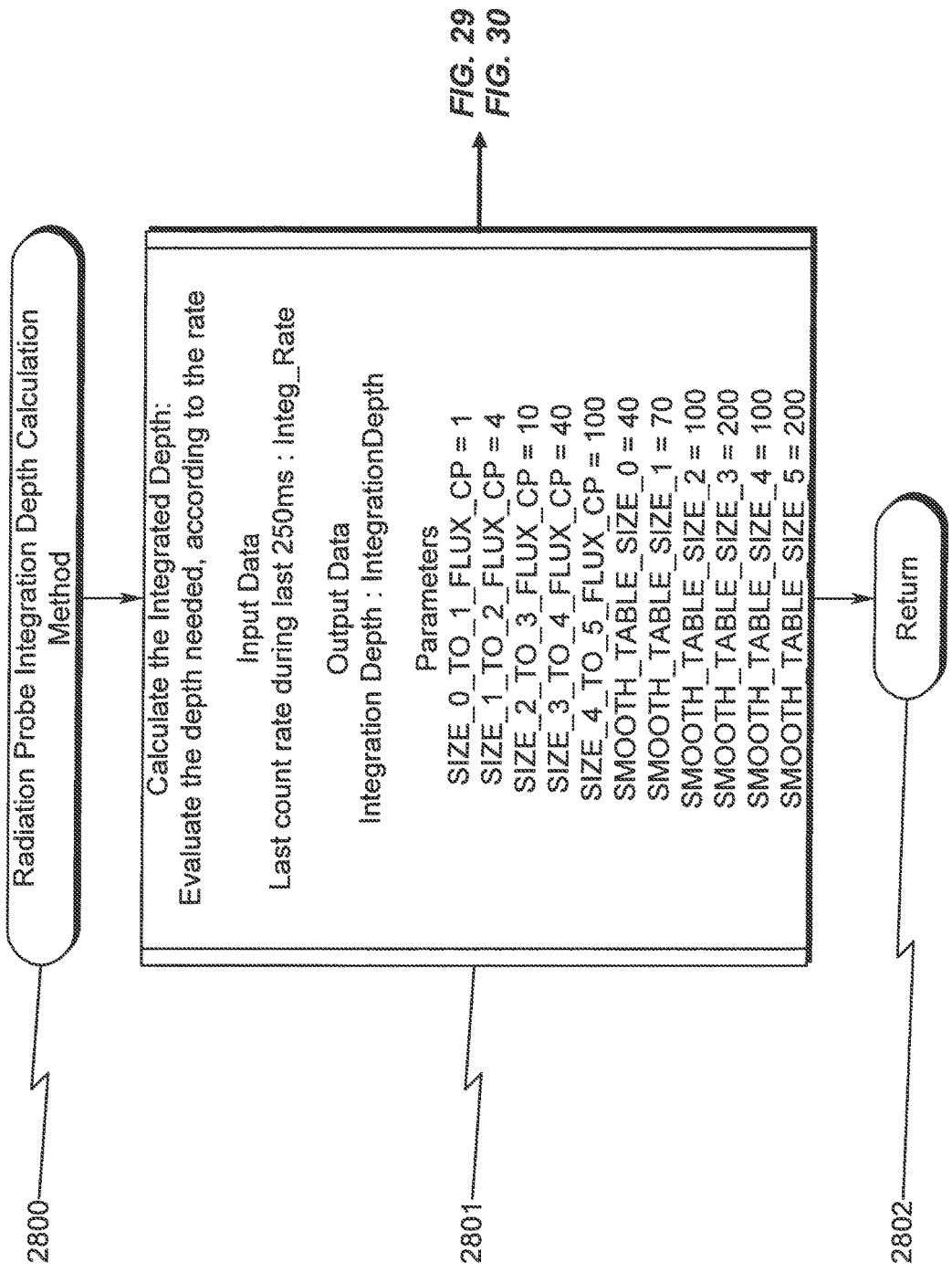
FIG. 28 illustrates a flowchart depicting a preferred measurement smoothing method useful in some invention embodiments (page 19/23)
Figure 29:
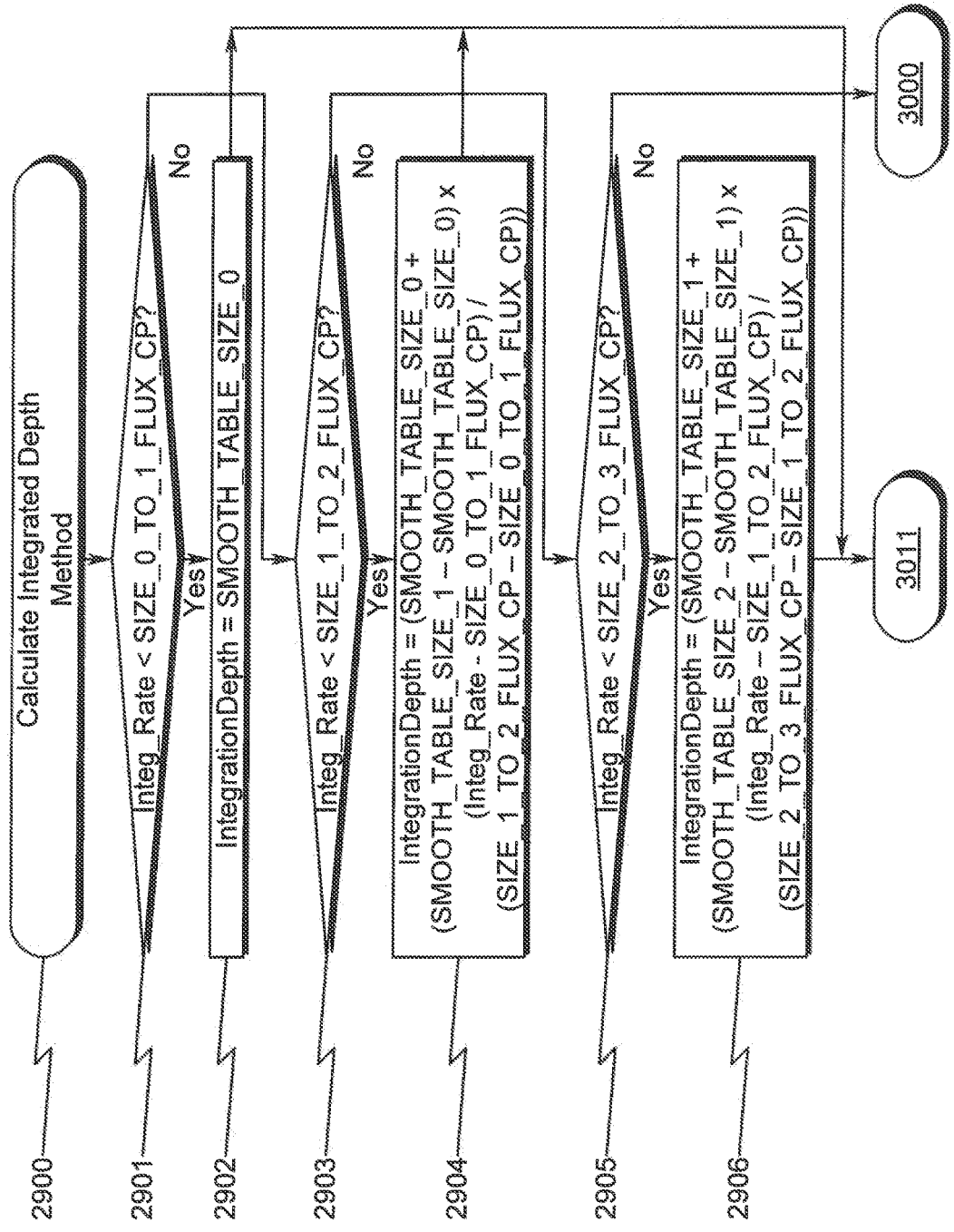
FIG. 29 illustrates a flowchart depicting a preferred measurement smoothing method useful in some invention embodiments (page 20/23)
Figure 30:
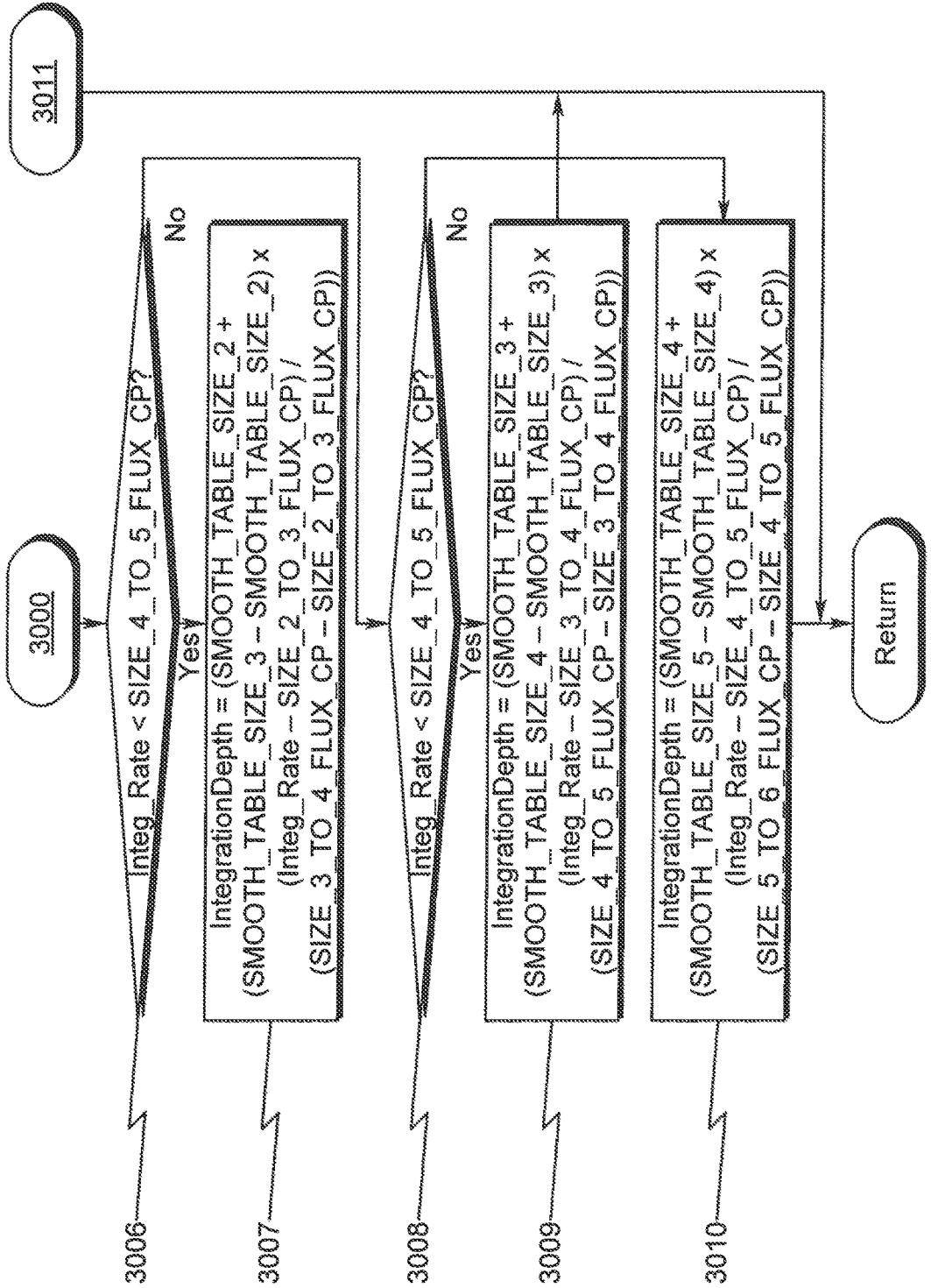
FIG. 30 illustrates a flowchart depicting a preferred measurement smoothing method useful in some invention embodiments (page 21/23)
Figure 31:
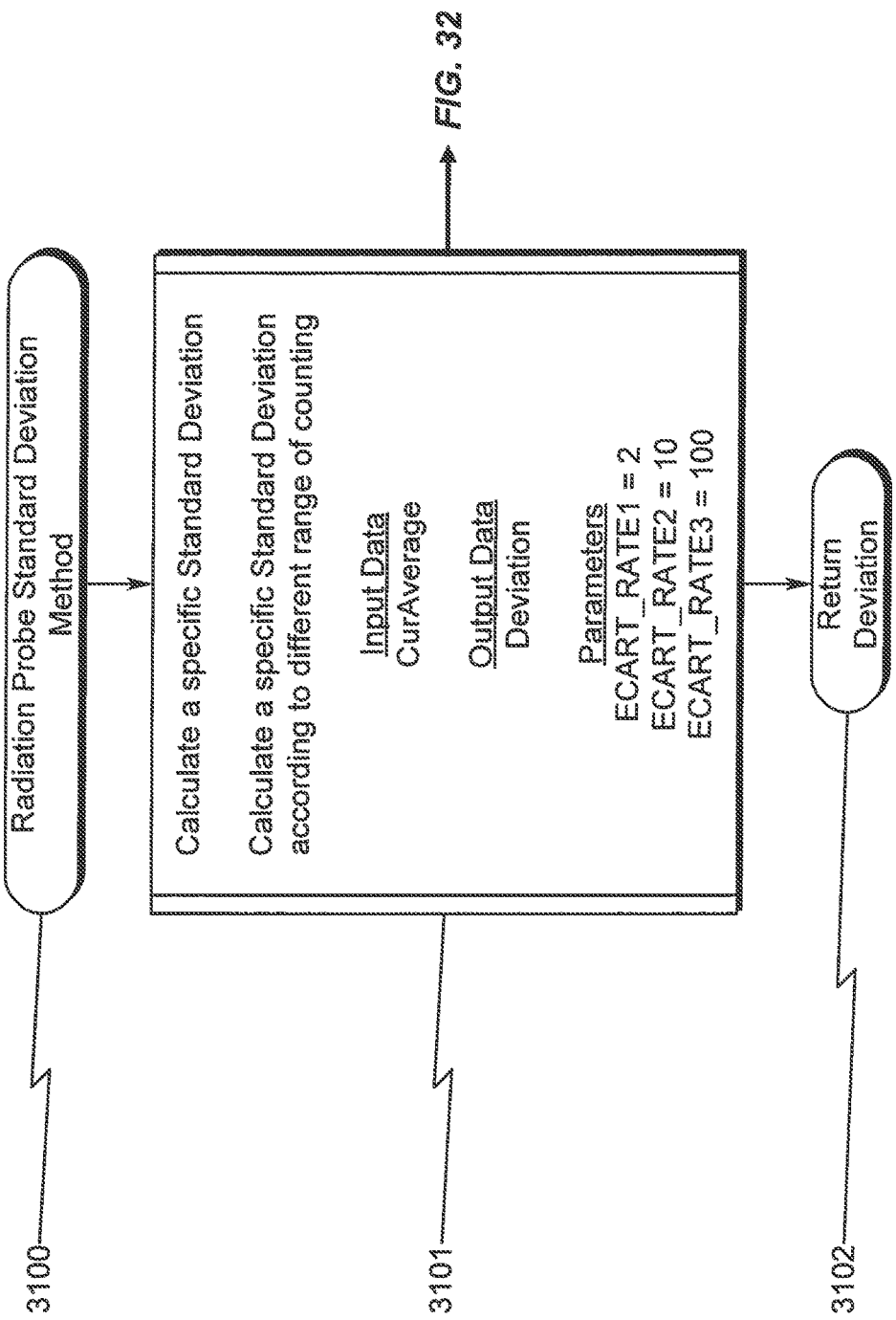
FIG. 31 illustrates a flowchart depicting a preferred measurement smoothing method useful in some invention embodiments (page 22/23)
Figure 32:
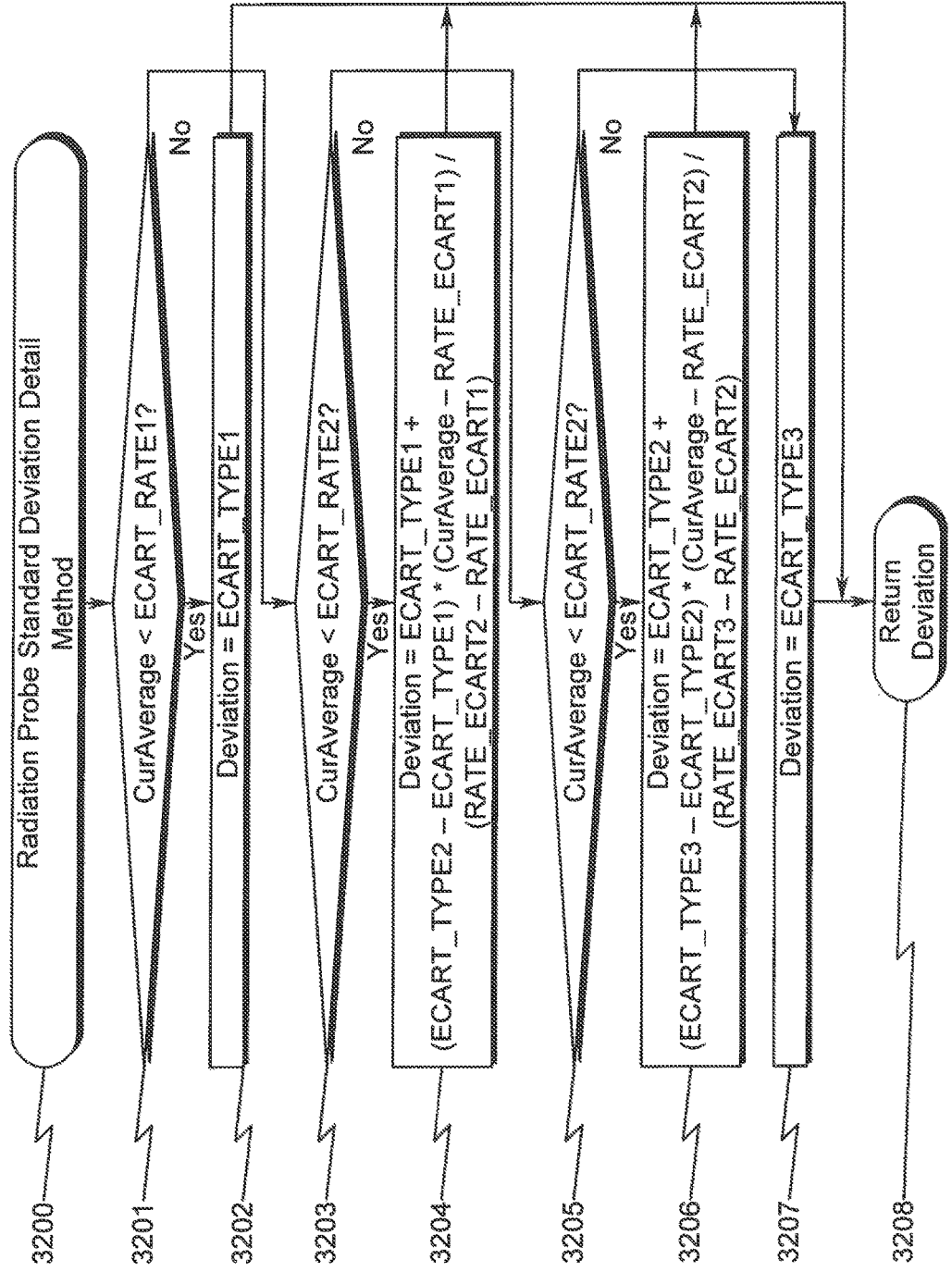
FIG. 32 illustrates a flowchart depicting a preferred measurement smoothing method useful in some invention embodiments (page 23/23)

An exemplary smoothing algorithm associated with radiation measurements is generally depicted in the flowcharts of FIG. 10 (1000)-FIG. 32 (3200). This smoothing algorithm is used to determine an average measurement value that is useful in determining whether measurements exceed predetermined alarm/indicator thresholds.

Exemplary Alarm Scenarios (3300)-(3600)

Several exemplary alarm scenarios are depicted in the graphs of FIG. 33 (3300)-FIG. 36 (3600). Activity in these graphs corresponds to the flowcharts depicted in FIG. (0600)-FIG. 9 (0900).

Exemplary Performance (3700)-(4000)

Figure 37:
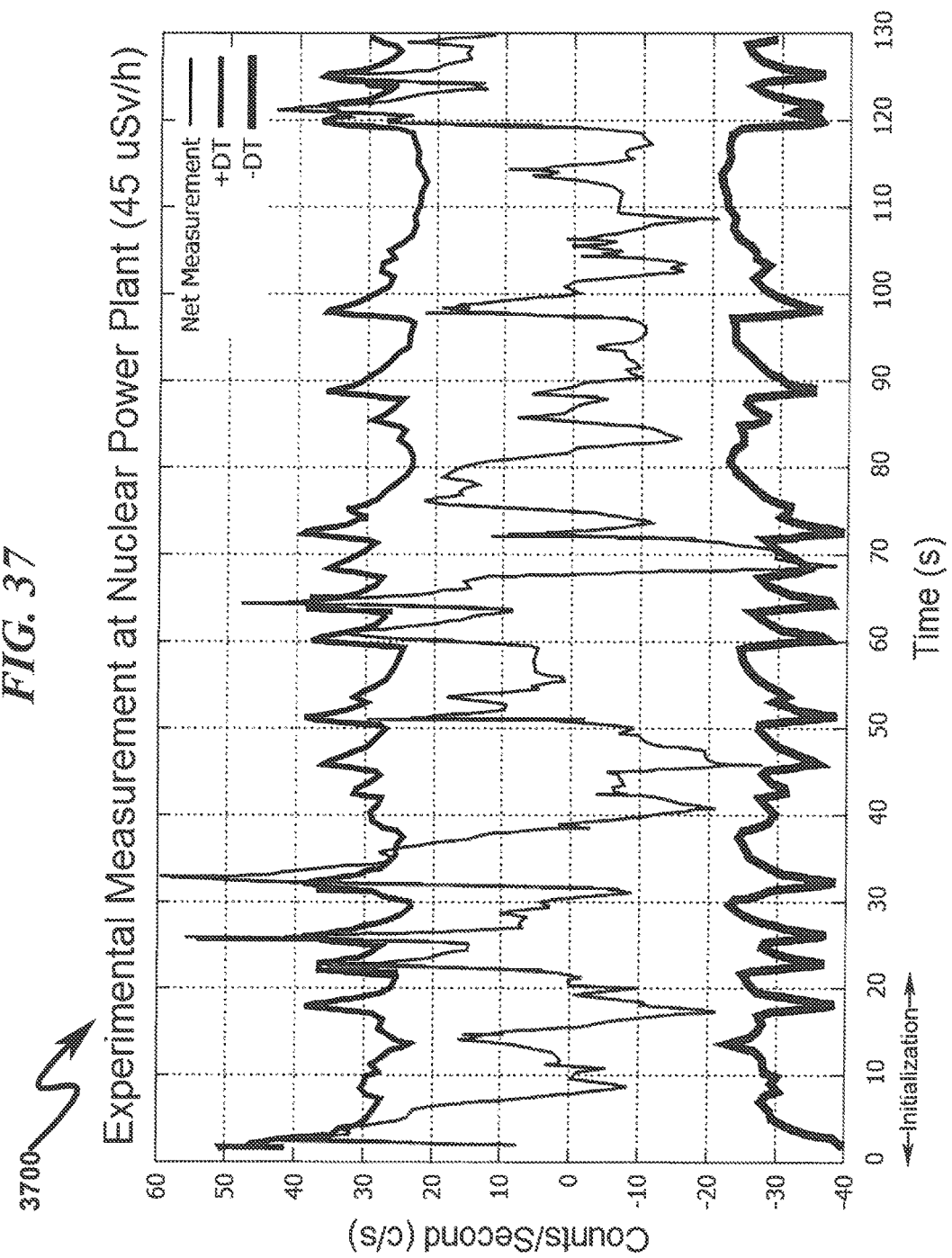
FIG. 37 illustrates an exemplary invention embodiment measurement data with dose rate 45 µSv/h.
Figure 40:
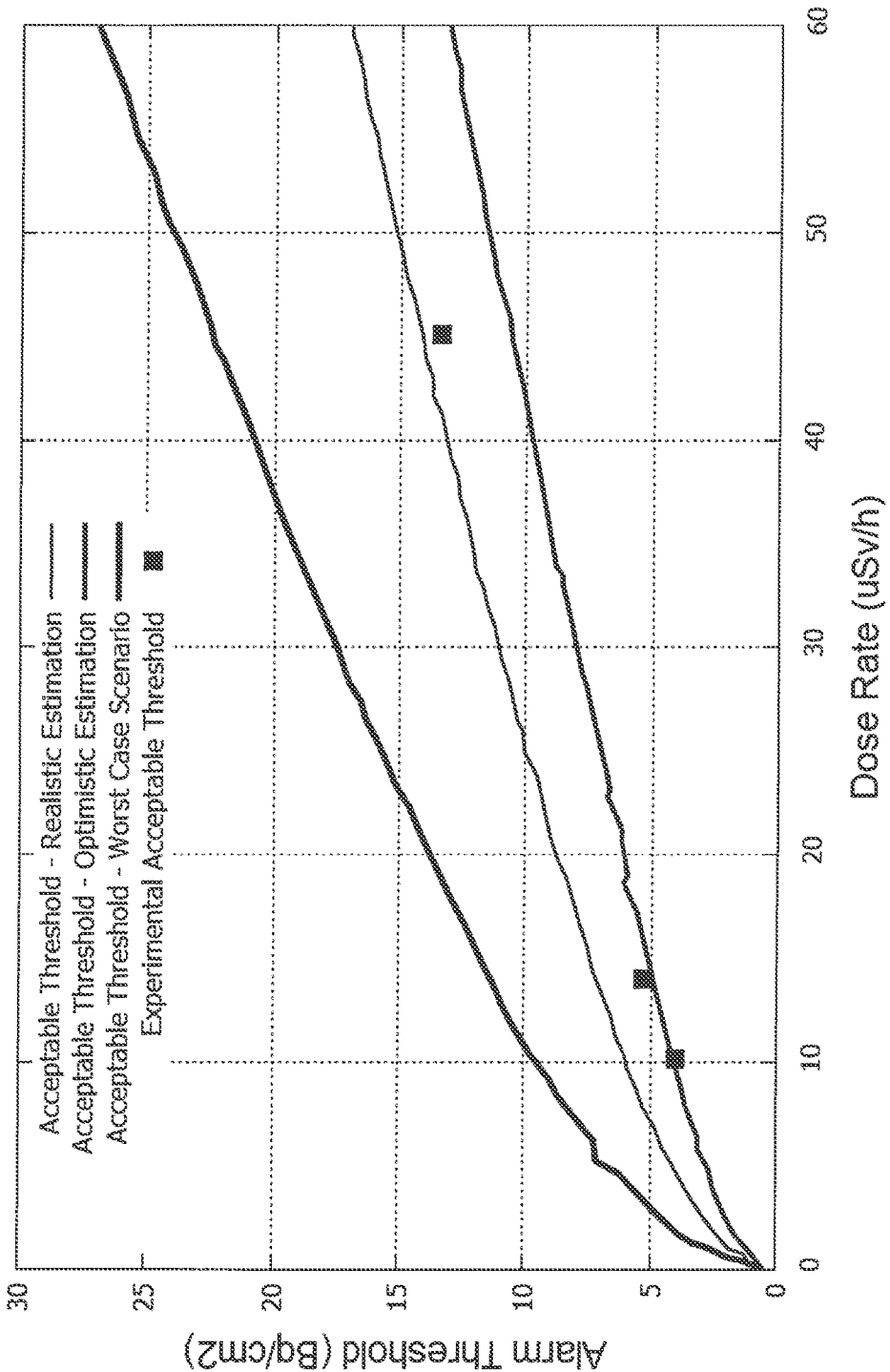
FIG. 40 illustrates an exemplary graph of forecasted minimum acceptable alarm threshold as a function of the external dose rate.

Several exemplary measurement scenarios are depicted in the graphs of FIG. 37 (3700)-FIG. 40 (4000). The detection threshold adjustments described above are depicted in these examples.

FIG. 37 (3700) depicts experimental measurements at a nuclear power plant with dose rate of 45 uSv/h.

Figure 38:
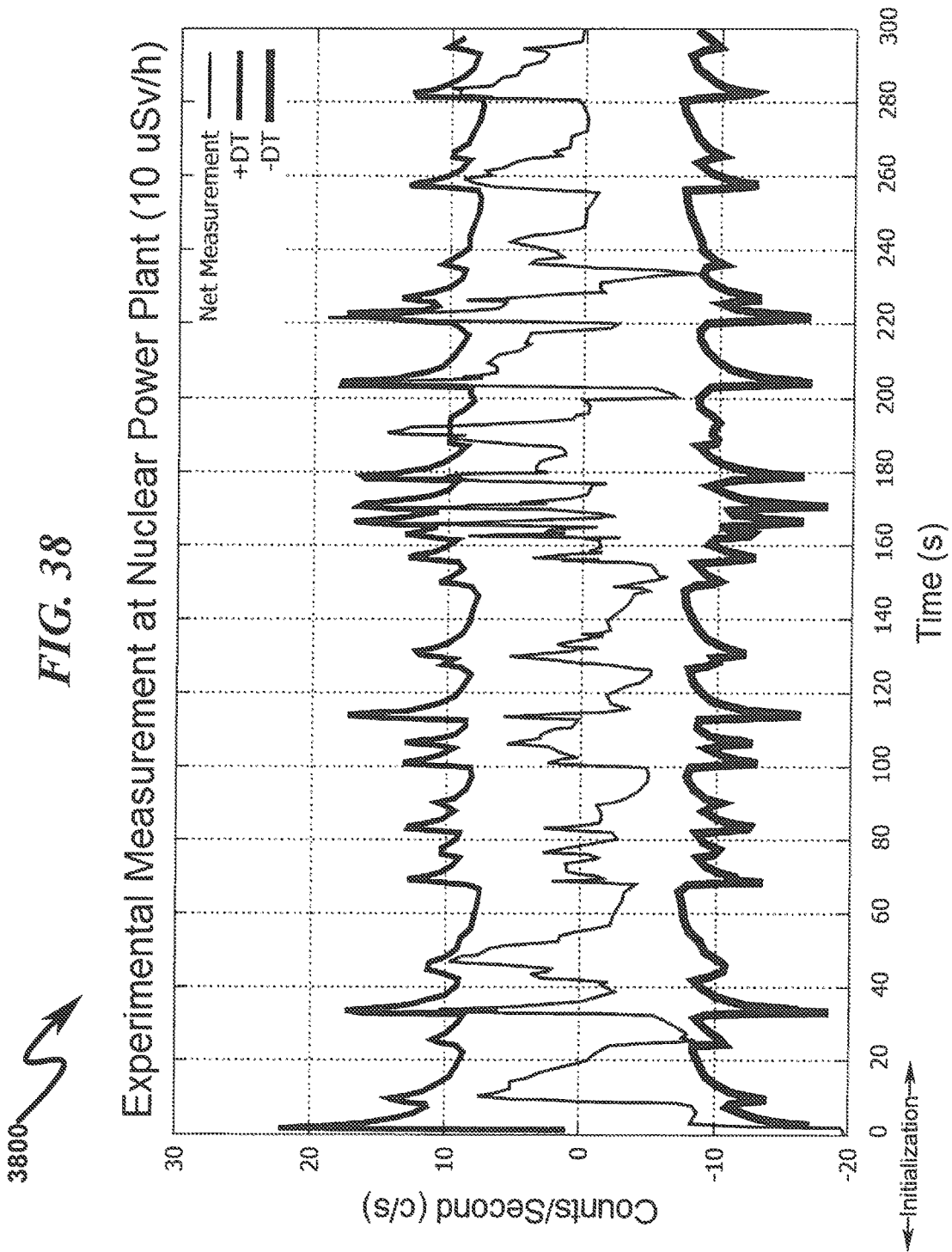
FIG. 38 illustrates an exemplary invention embodiment measurement data with dose rate 10 µSv/h.

FIG. 38 (3800) depicts detailed experimental measurements at a nuclear power plant with dose rate of 10 uSv/h.

Figure 39:
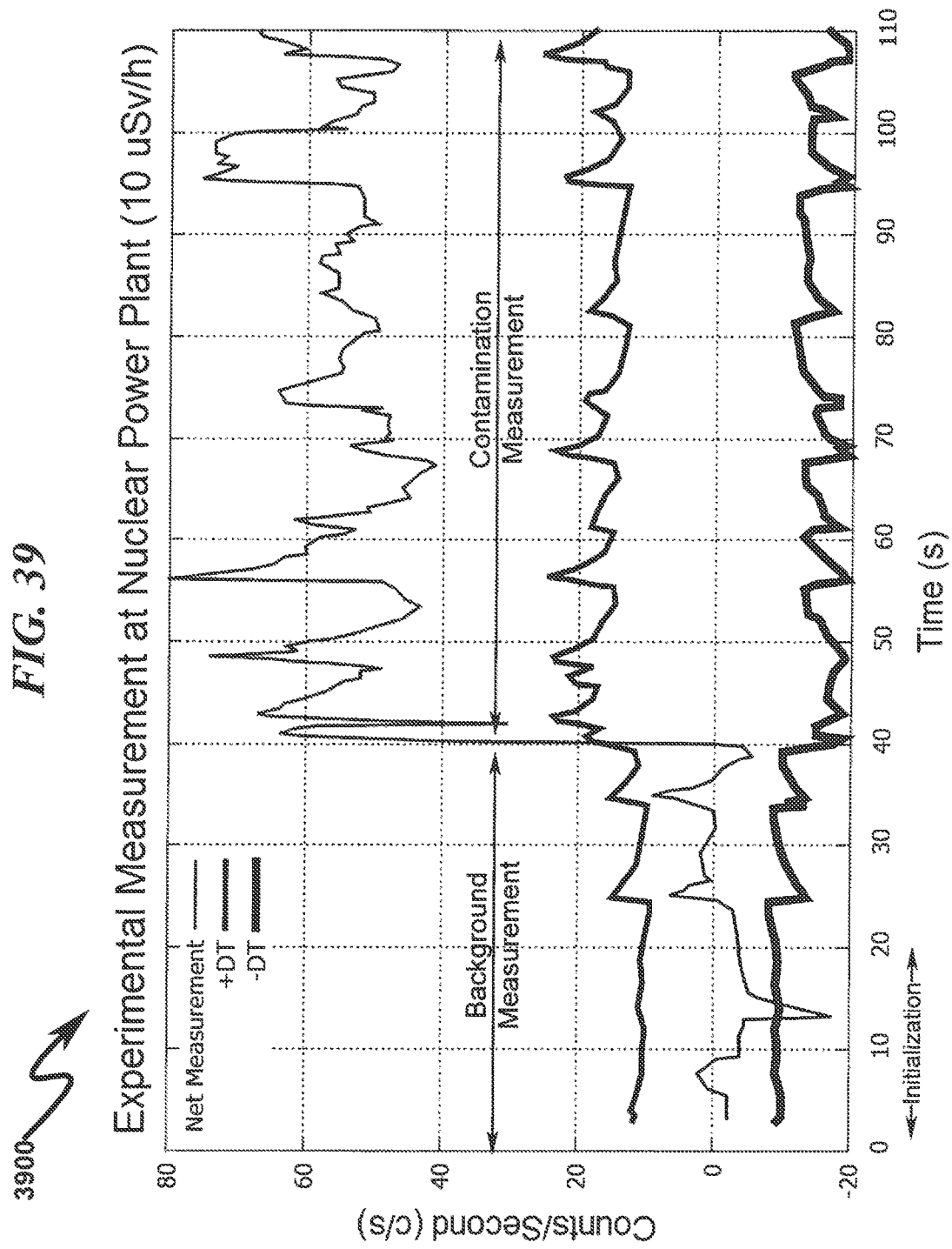
FIG. 39 illustrates an exemplary invention embodiment measurement data with dose rate 10 µSv/h.

FIG. 39 (3900) depicts detailed experimental measurements at a nuclear power plant with dose rate of 10 uSv/h.

FIG. 40 (4000) depicts forecasted minimum acceptable alarm threshold as a function of the external dose rate in conjunction with measured experimental data.

Detection Threshold (DT) and Detection Limit (LLD) Calculations

The Detection Threshold (DT) calculation described herein is based on the ISO 11929 specifications with several experimental adjustments that are unique to the present invention. This section provides additional details on the formulas that are used to implement several preferred invention embodiments.

According to Equation (2) below, the net measured radiation (NMR) value count rate M is calculated through the following equation:

$$M = \frac{N_M}{T_M} - K \cdot \frac{N_G}{T_G} = S_M - K \cdot S_G \quad (2)$$

According to ISO 11929:

$$\frac{DT^2}{k^2} = \left(\frac{\partial M}{\partial N_M}\right)^2 \cdot \sigma_{N_M}^2 + \left(\frac{\partial M}{\partial N_G}\right)^2 \cdot \sigma_G^2 + \left(\frac{\partial M}{\partial K}\right)^2 \cdot \sigma_K^2 \quad (3)$$

where
$\sigma_x$ is the uncertainty related to the magnitude X
k is the quantile $(1-\alpha)$ of the standard normal distribution.
The value $\alpha$ is chosen equal to 2.75% in some preferred embodiments, resulting in a value for k equal to 1.96.

The expression of M in Equation (2) leads to the following equation:

$$\frac{DT^2}{k^2} = \left(\frac{1}{T_M}\right)^2 \cdot N_M + \left(\frac{K}{T_G}\right)^2 \cdot N_G + \left(\frac{N_G}{T_G}\right)^2 \cdot \sigma_K^2 \quad (4)$$

$$DT^2 = k^2 \cdot \left(\frac{S_M}{T_M} + K^2 \cdot \frac{S_G}{T_G}\right) + k^2 \cdot \sigma_K^2 \cdot S_G^2 \quad (5)$$

The value of $\sigma_K$ is unknown and could be quite significant. It has been experimentally observed that the term in Equation (5) depending on $\sigma_K$ could lead to a non-representative increase of DT value. Therefore, in many preferred invention embodiments it has been decided to keep the dependence with $S_G^2$ in the equation, multiplying it with a constant value determined through experimentation. This factor is set to 0.01 in many preferred invention embodiments.

In addition, the DT is calculated assessing that the "true value" of M equals 0 c/s:

$$M=0 \Rightarrow S=K \cdot S_G \quad (6)$$

Equation (5) then becomes:

$$DT^2 = k^2 \cdot \left[K \cdot S_G \cdot \left(\frac{1}{T_M} + \frac{K}{T_G}\right)\right] + 0.01 \cdot S_G^2 \quad (7)$$

$$DT = \sqrt{k^2 \cdot \left[K \cdot S_G \cdot \left(\frac{1}{T_M} + \frac{K}{T_G}\right)\right] + 0.01 \cdot S_G^2} \quad (8)$$

The Lower Limit of Detection (LLD) used to determine a light emitting diode (LED) alarm color in many preferred invention embodiments, is calculated as follows:

$$LLD = 1.9 \cdot DT \quad (9)$$

Note that it has been verified that if $\sigma_K$ is neglected, the theoretical value of LLD is very close to 2*DT in any case. Thus, Equation (9) has been defined experimentally.

One skilled in the art will recognize that the equations and range limits for DT and LLD are illustrative of a preferred invention embodiment and are not limitive of the invention scope. Other experimental scaling factors may be used in the basic framework of the disclosed invention without departing from the spirit and scope of the claimed invention.

Exemplary External System Construction (4100)-(4800)

Figure 48:
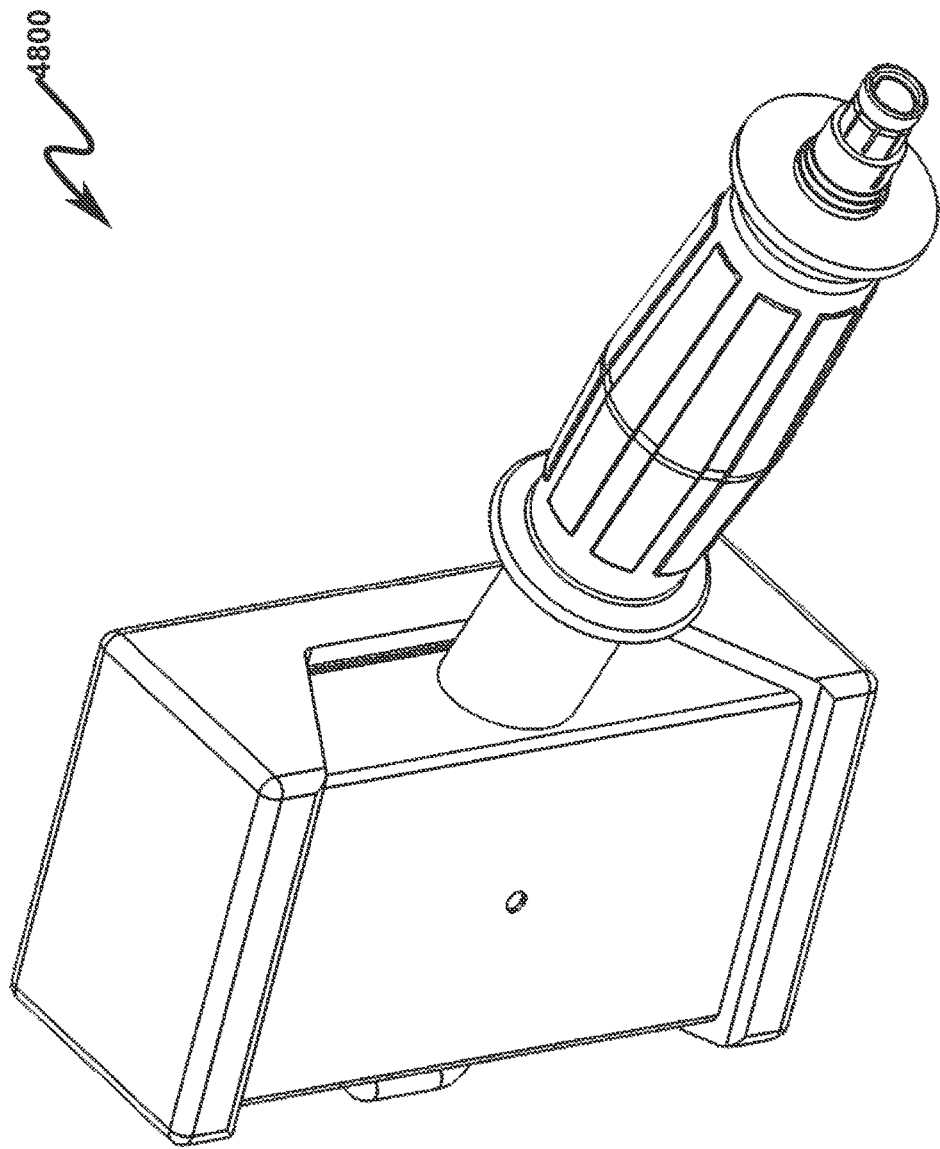
FIG. 48 illustrates a rear perspective view of a preferred exemplary invention system embodiment.

While a wide variety of construction techniques may be applied to the present invention, a preferred exemplary construction is depicted in FIG. 41 (4100)-FIG. 48 (4800). While the depicted dimensions of this preferred exemplary system embodiment are for general illustration purposes only, they do represent a significant improvement over the large, bulky, and often immobile radiation probes taught by the prior art. One skilled in the art will recognize that this exemplary external construction may be modified based on application context and does not limit the scope of the claimed invention.

Exemplary Internal System Construction (4900)-(5600)

Figure 49:
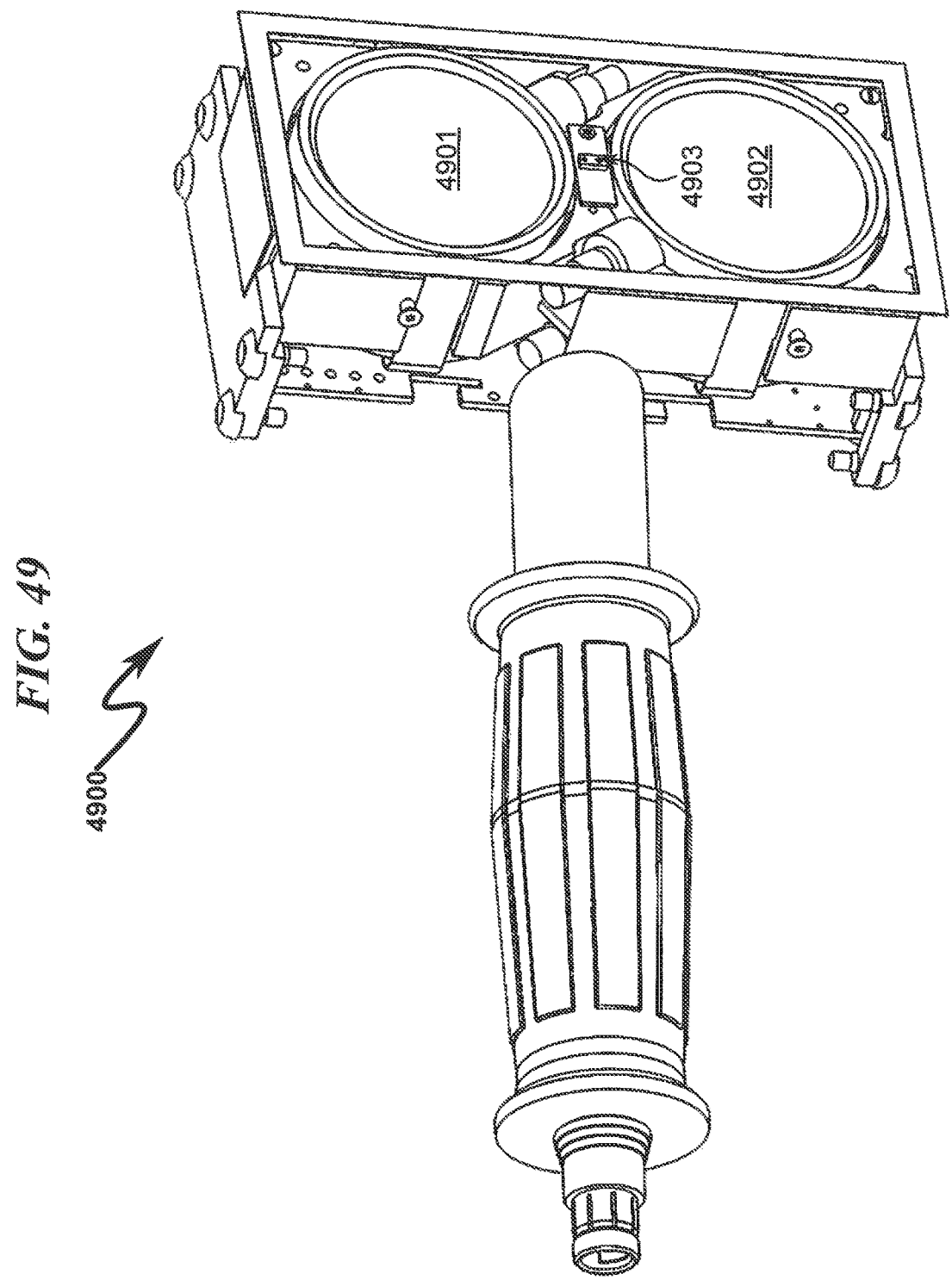
FIG. 49 illustrates a bottom front perspective view of a preferred exemplary invention system embodiment with outer enclosure removed.
Figure 50:
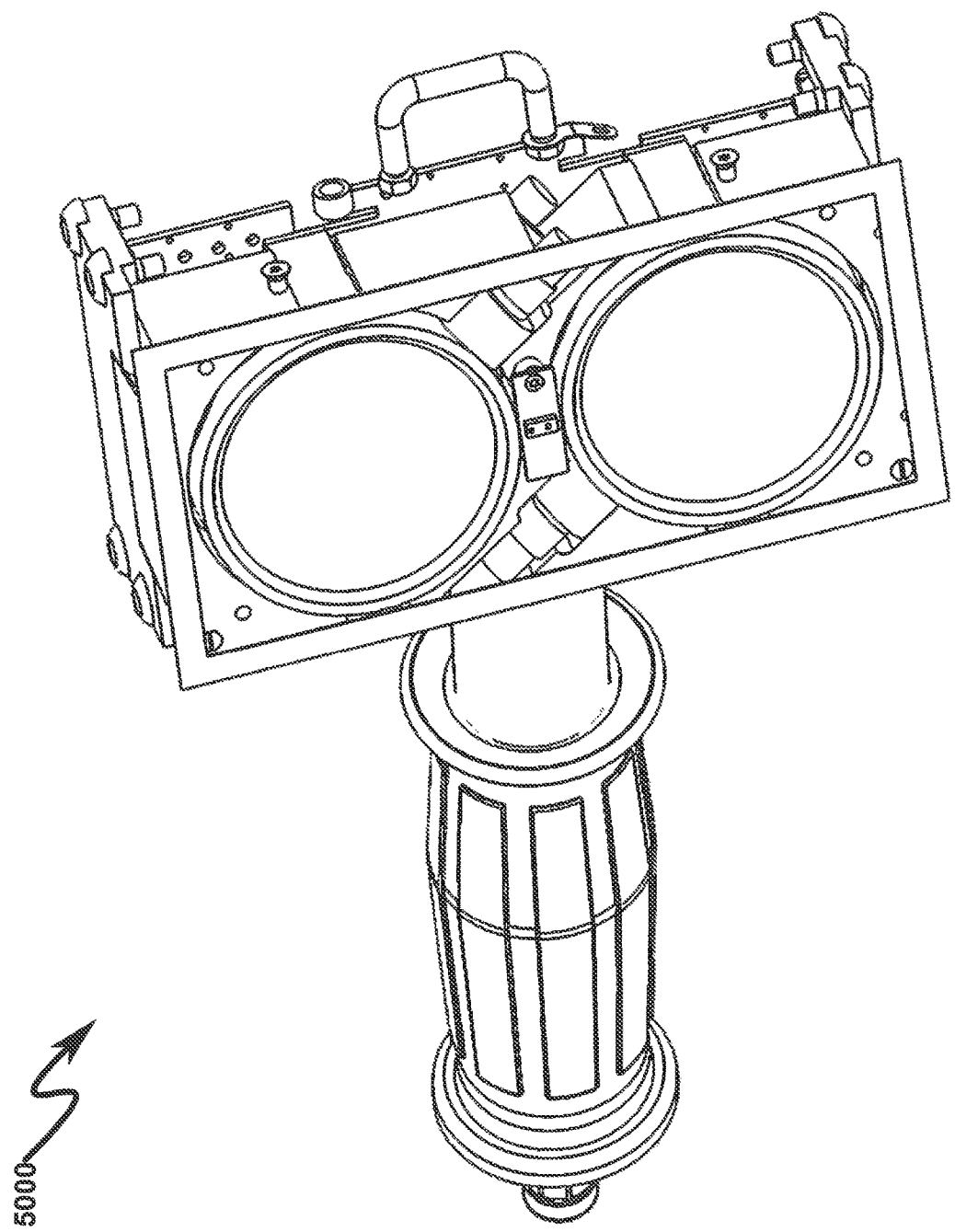
FIG. 50 illustrates a top front perspective view of a preferred exemplary invention system embodiment with outer enclosure removed.
Figure 51:
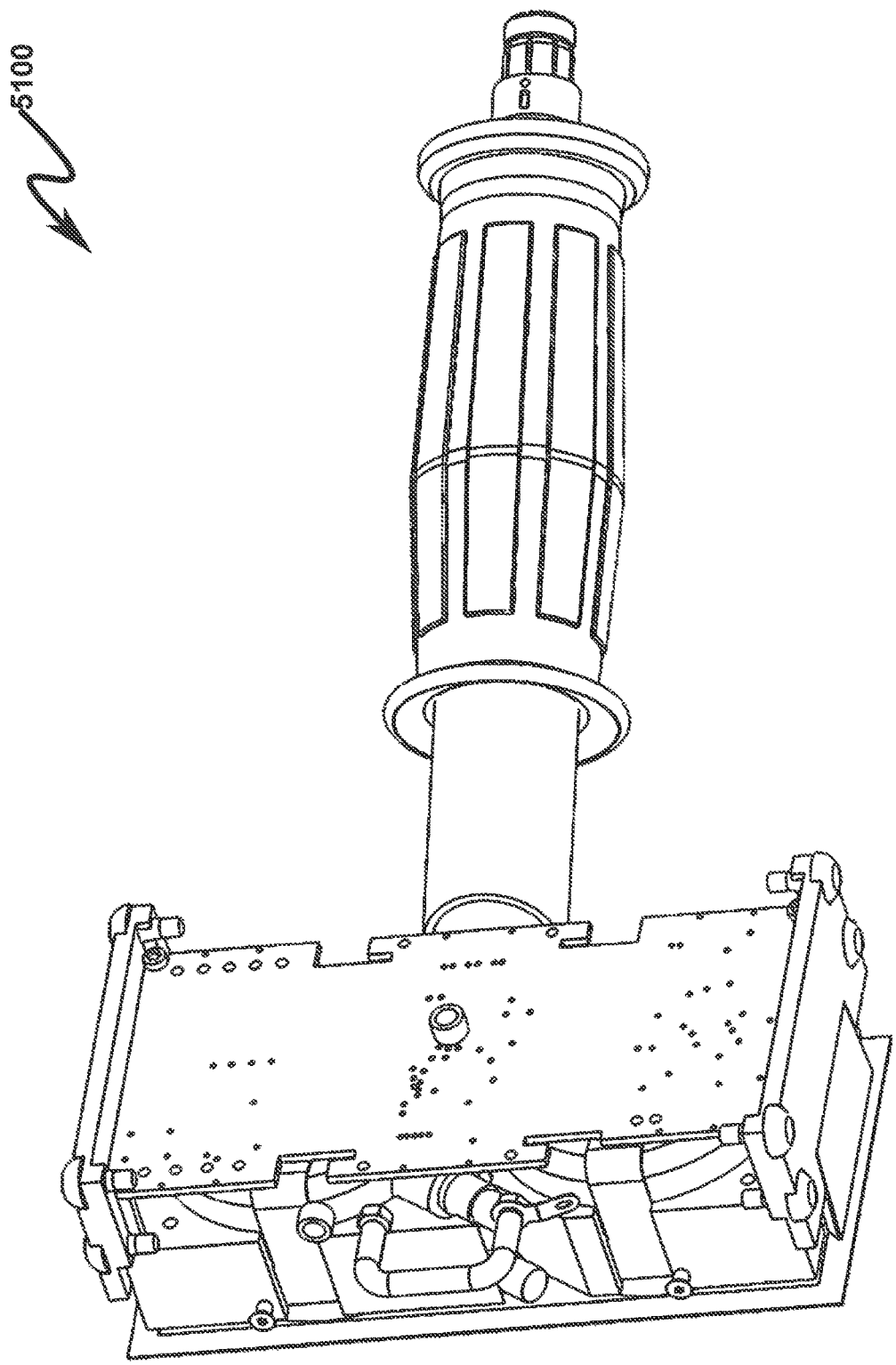
FIG. 51 illustrates a top rear perspective view of a preferred exemplary invention system embodiment with outer enclosure removed.
Figure 52:
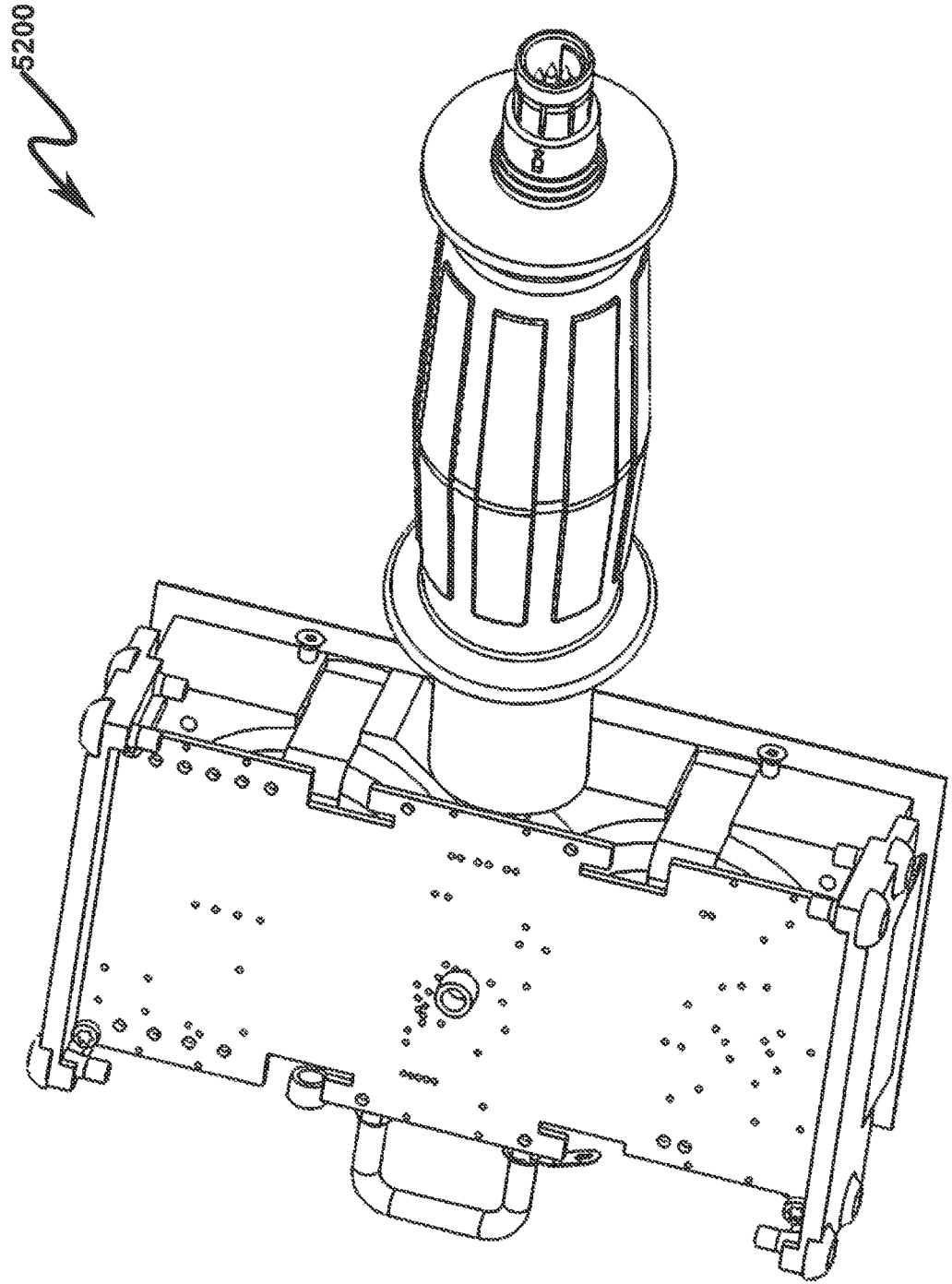
FIG. 52 illustrates a bottom rear perspective view of a preferred exemplary invention system embodiment with outer enclosure removed.
Figure 53:
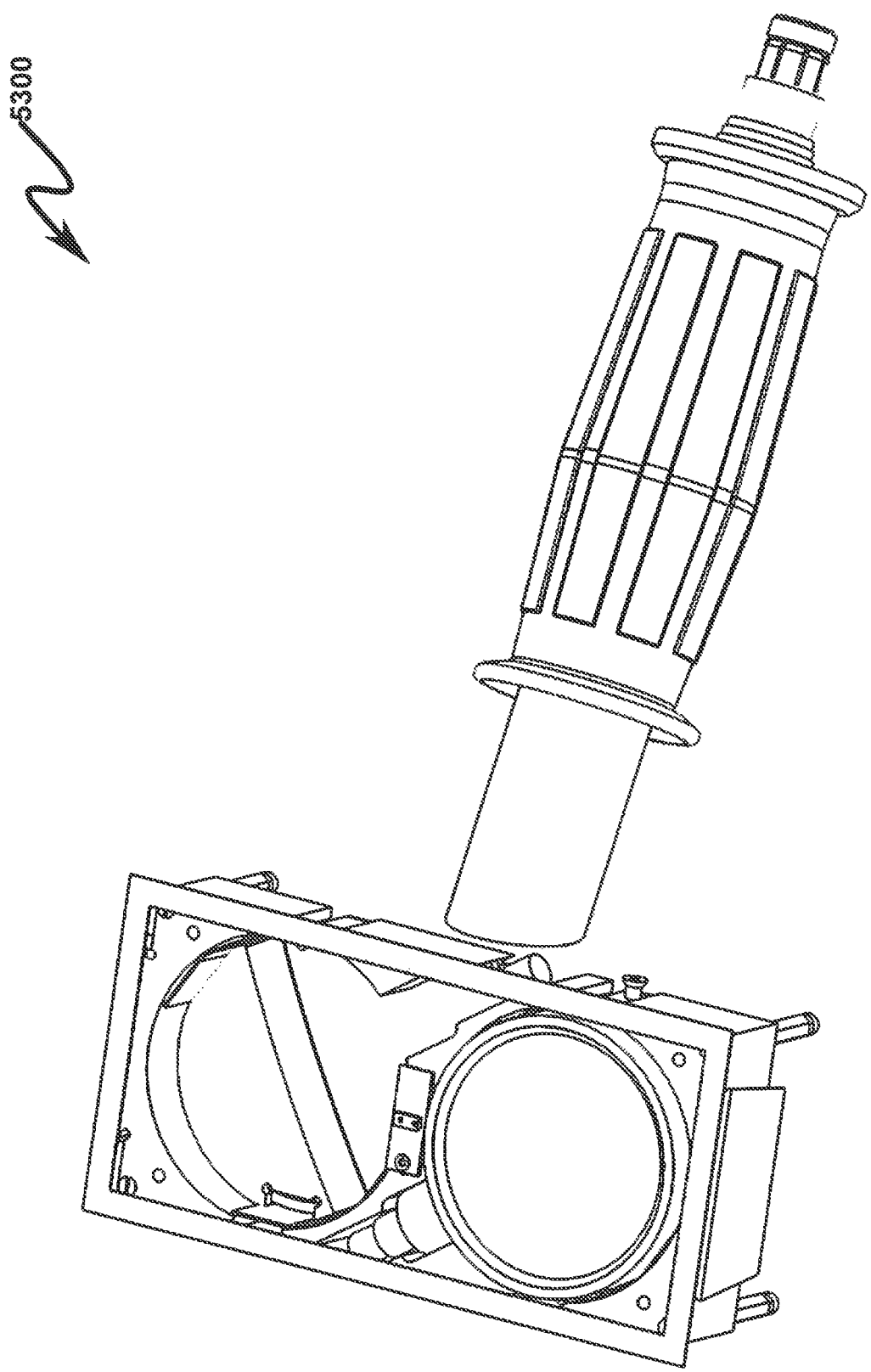
FIG. 53 illustrates a bottom front perspective view of a preferred exemplary invention system embodiment with outer enclosure and one radiation sensor/detector removed.
Figure 54:
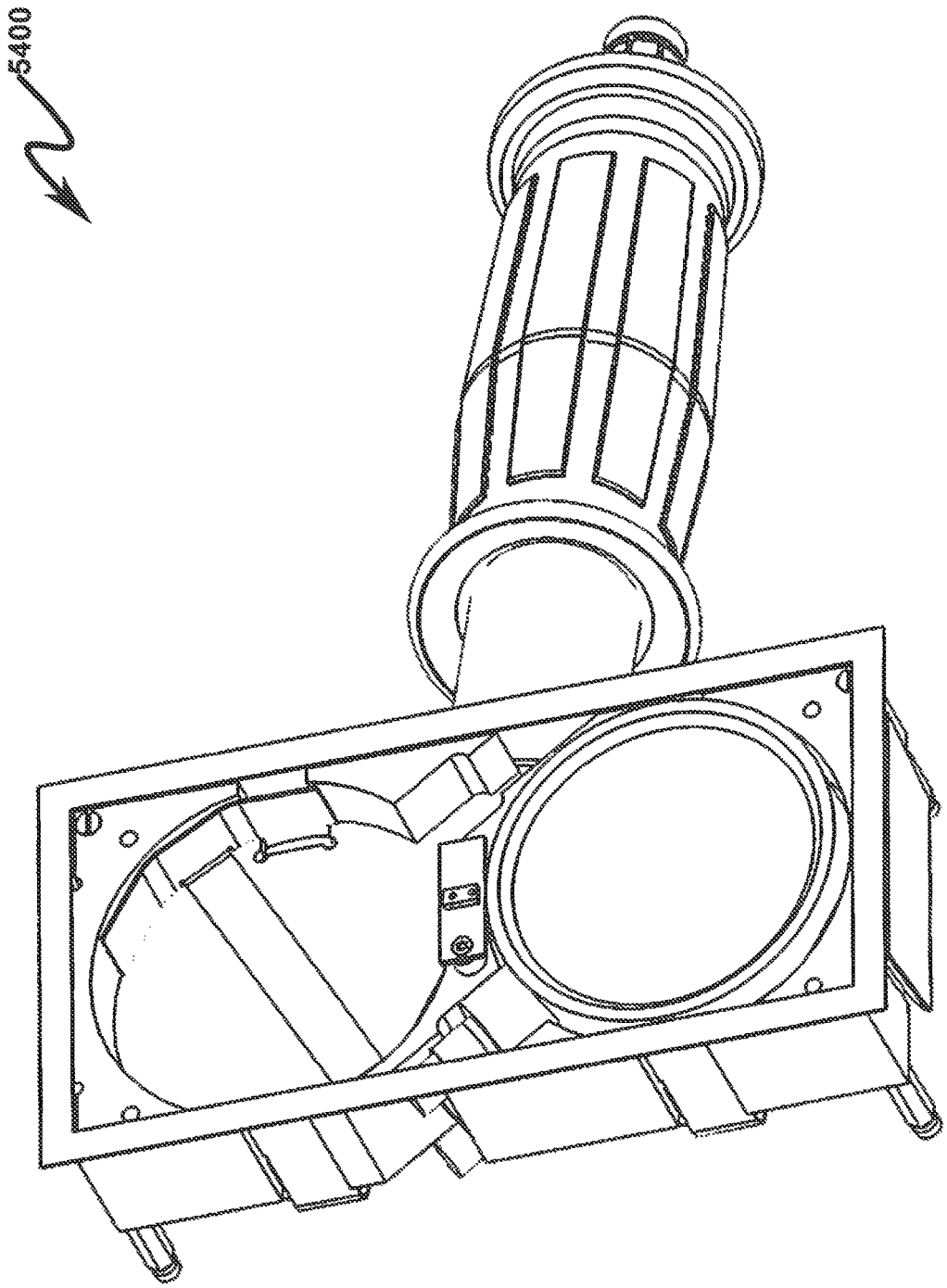
FIG. 54 illustrates a top front perspective view of a preferred exemplary invention system embodiment with outer enclosure and one radiation sensor/detector removed.
Figure 55:
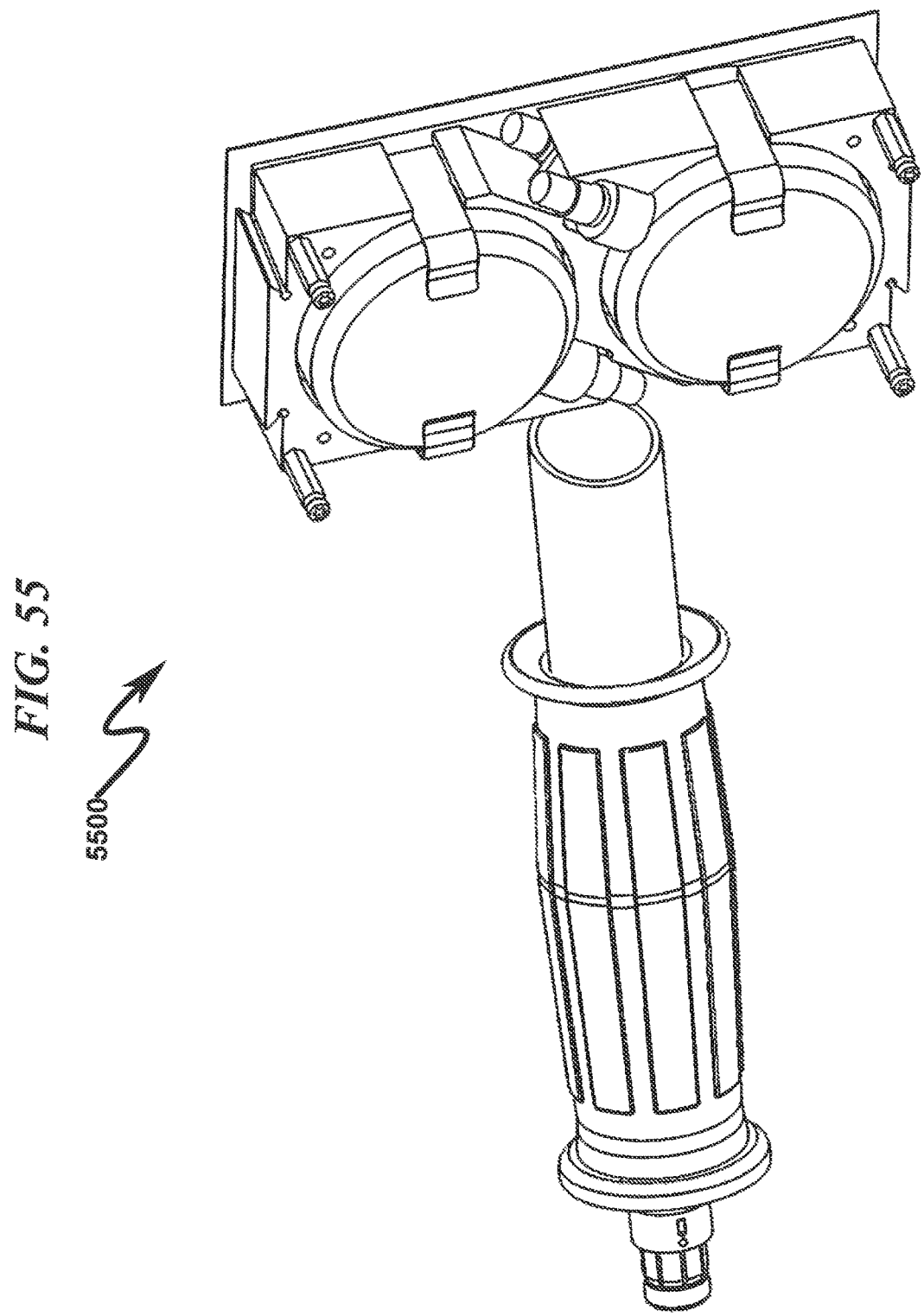
FIG. 55 illustrates a top rear perspective view of a preferred exemplary invention system embodiment with outer enclosure and one radiation sensor/detector removed.
Figure 56:
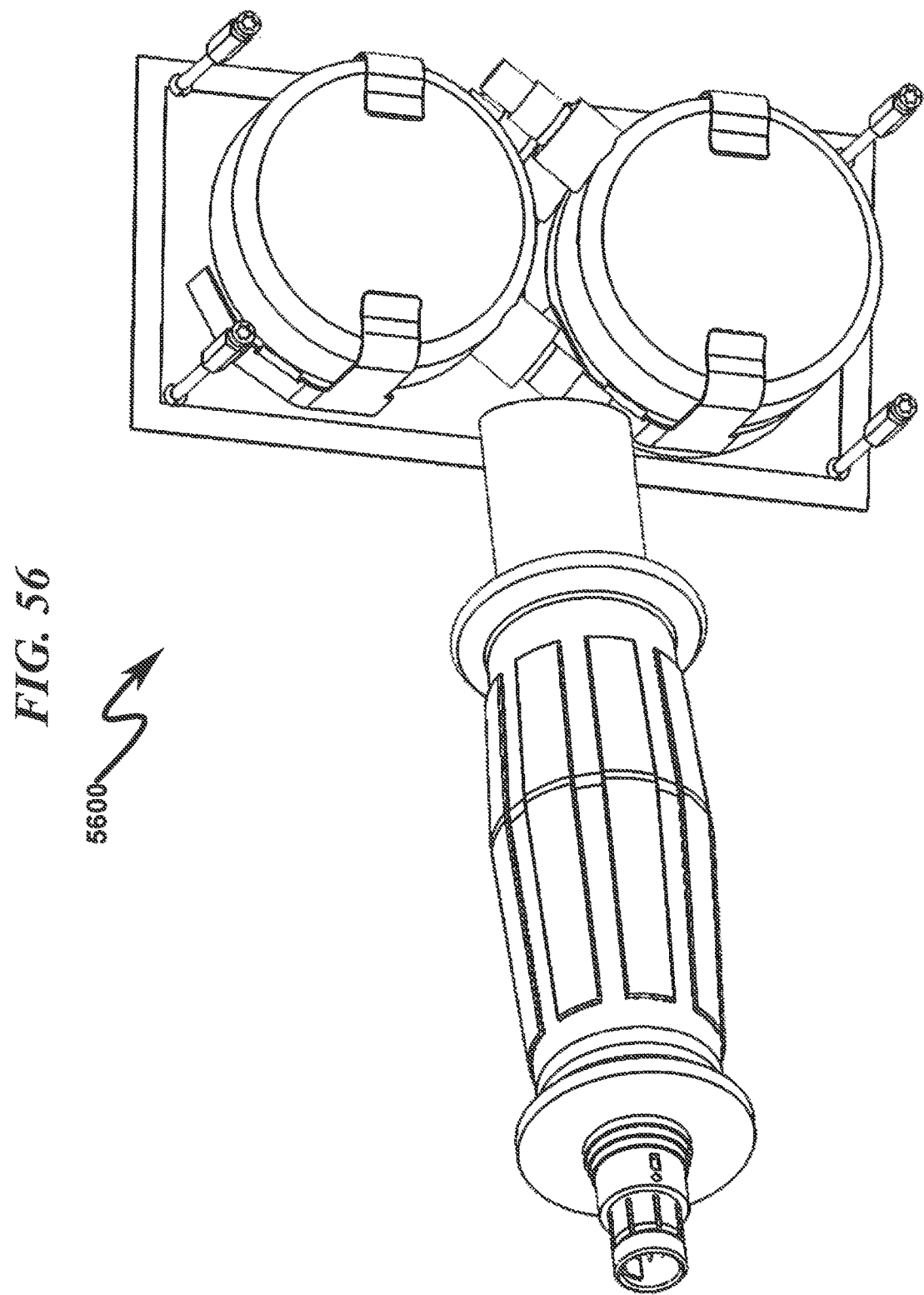
FIG. 56 illustrates a bottom rear perspective view of a preferred exemplary invention system embodiment with outer enclosure, one radiation sensor/detector, and radiation detector supports removed.

The preferred exemplary construction as depicted in FIG. 41 (4100)-FIG. 48 (4800) may be further understood in more detail by inspection of the disassembly drawings depicted in FIG. 49 (4900)-FIG. 56 (5600). These drawings depict the placement of the radiation sensor/detectors (4901, 4902) (comprising the background radiation detector (BRD) and contamination radiation detector (CRD)) and the proximity sensor (4903) in the enclosure and placement of the PCB used for the control and detection electronics. One skilled in the art will recognize that this exemplary internal construction may be modified based on application context and does not limit the scope of the claimed invention.

Exemplary Detector Detail Construction (5700)-(6400)

Figure 57:
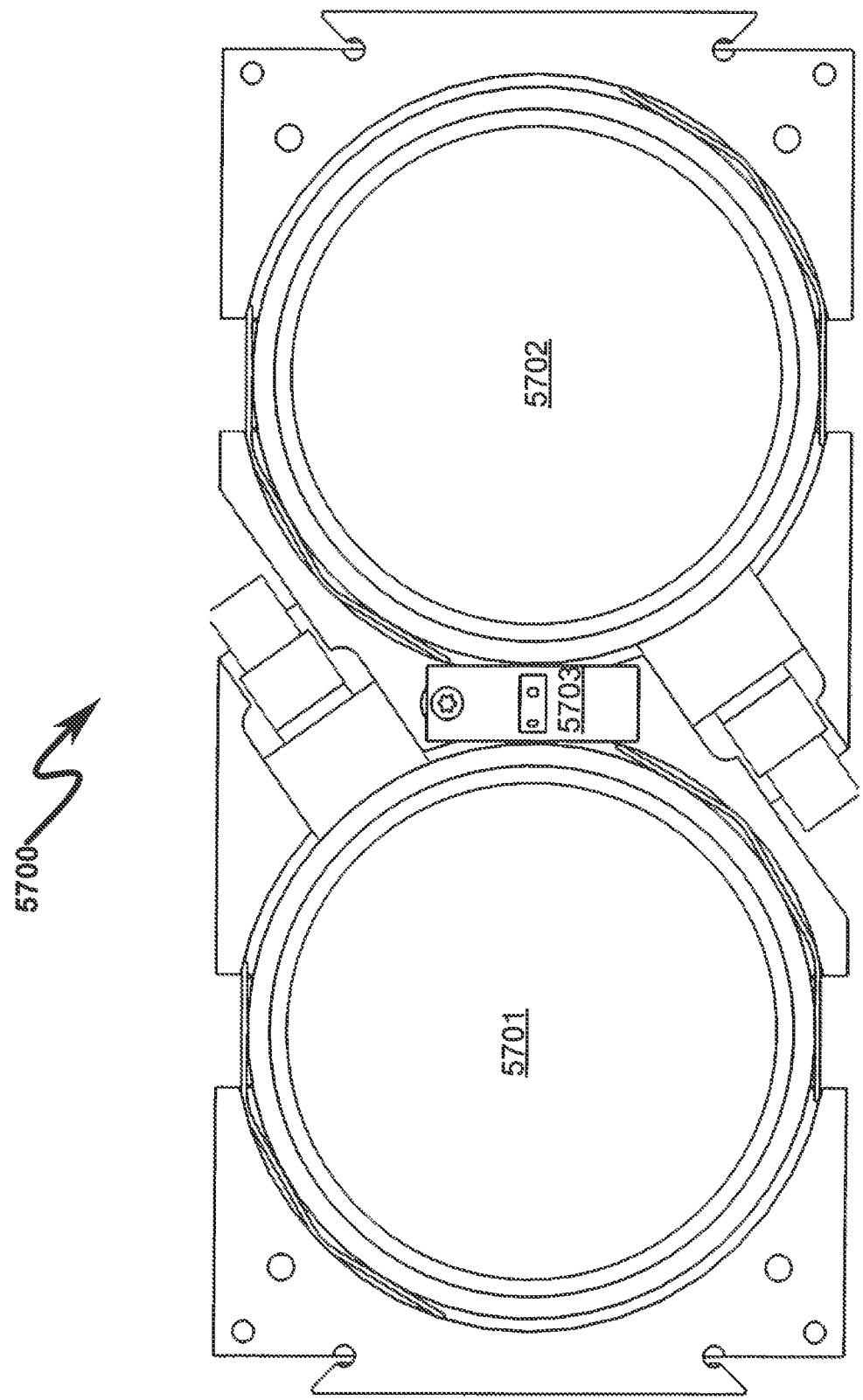
FIG. 57 illustrates a front detail view of a radiation detector assembly useful in some preferred invention embodiments.
Figure 58:
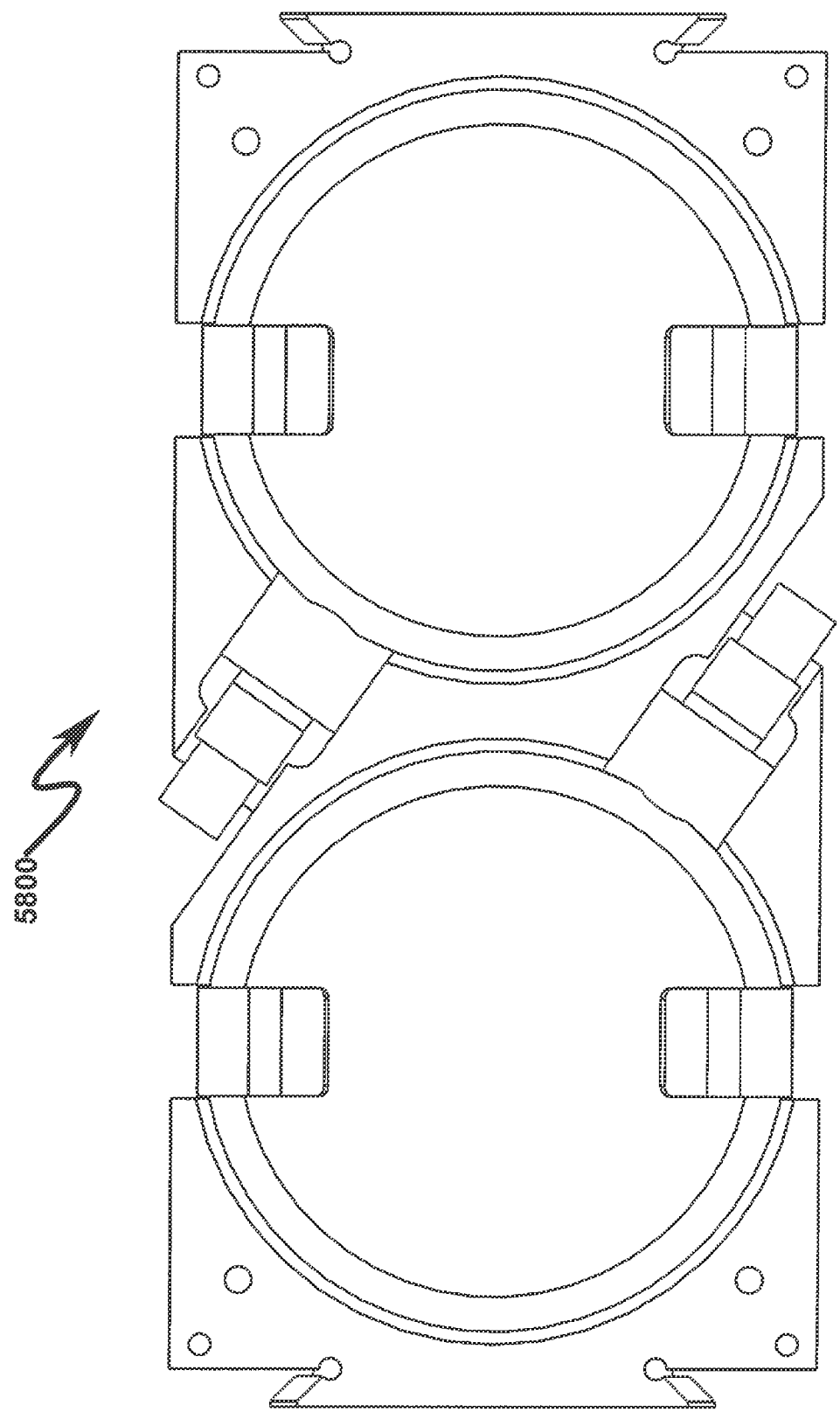
FIG. 58 illustrates a rear detail view of a radiation detector assembly useful in some preferred invention embodiments.
Figure 59:
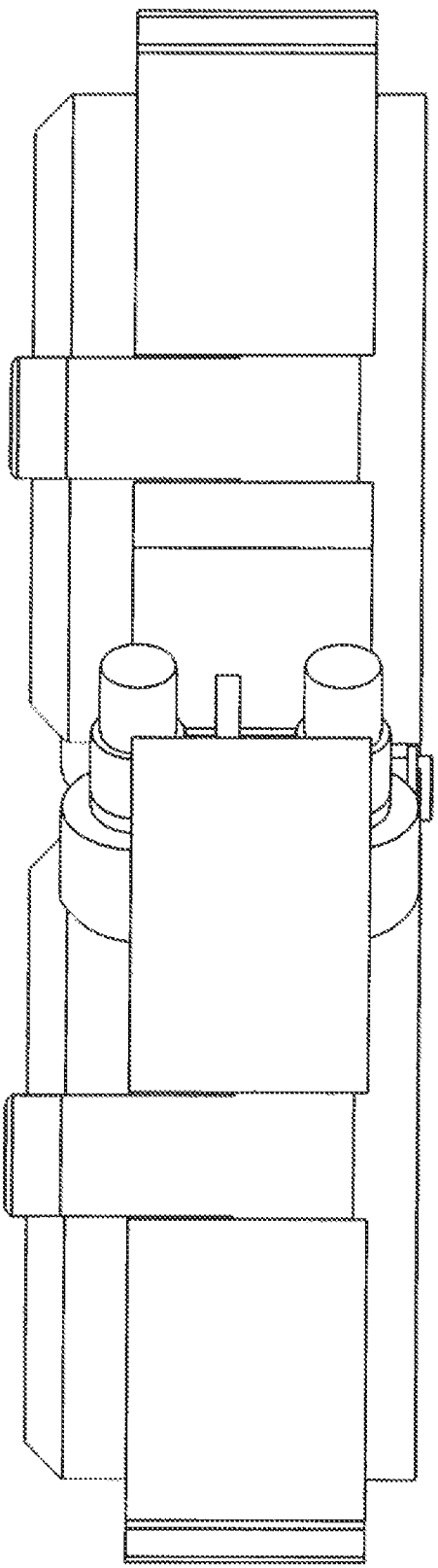
FIG. 59 illustrates a top detail view of a radiation detector assembly useful in some preferred invention embodiments.
Figure 60:
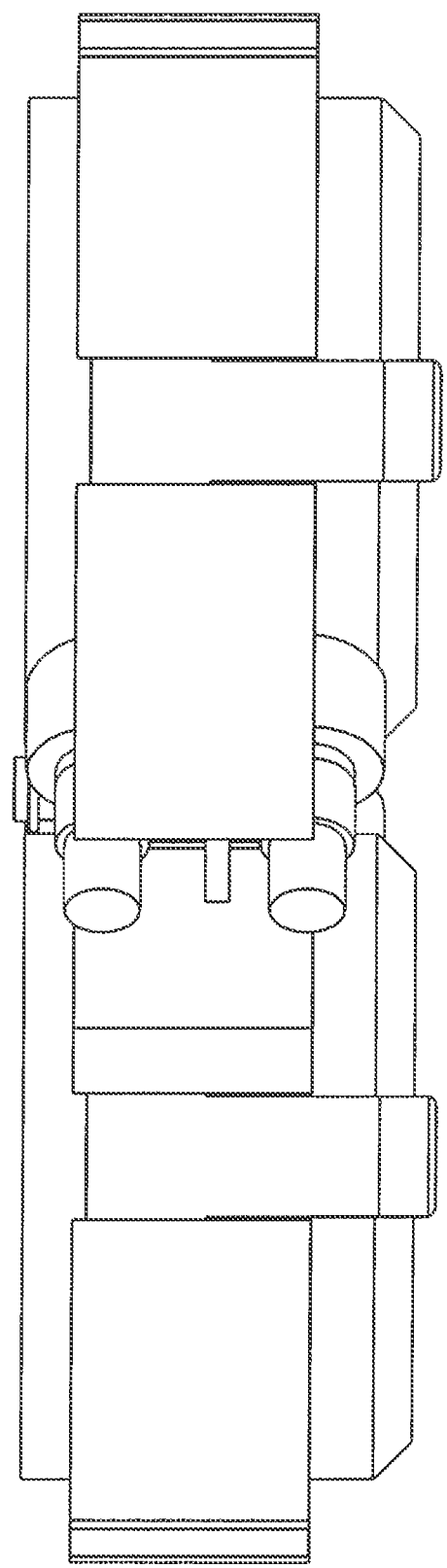
FIG. 60 illustrates a bottom detail view of a radiation detector assembly useful in some preferred invention embodiments.
Figure 61:
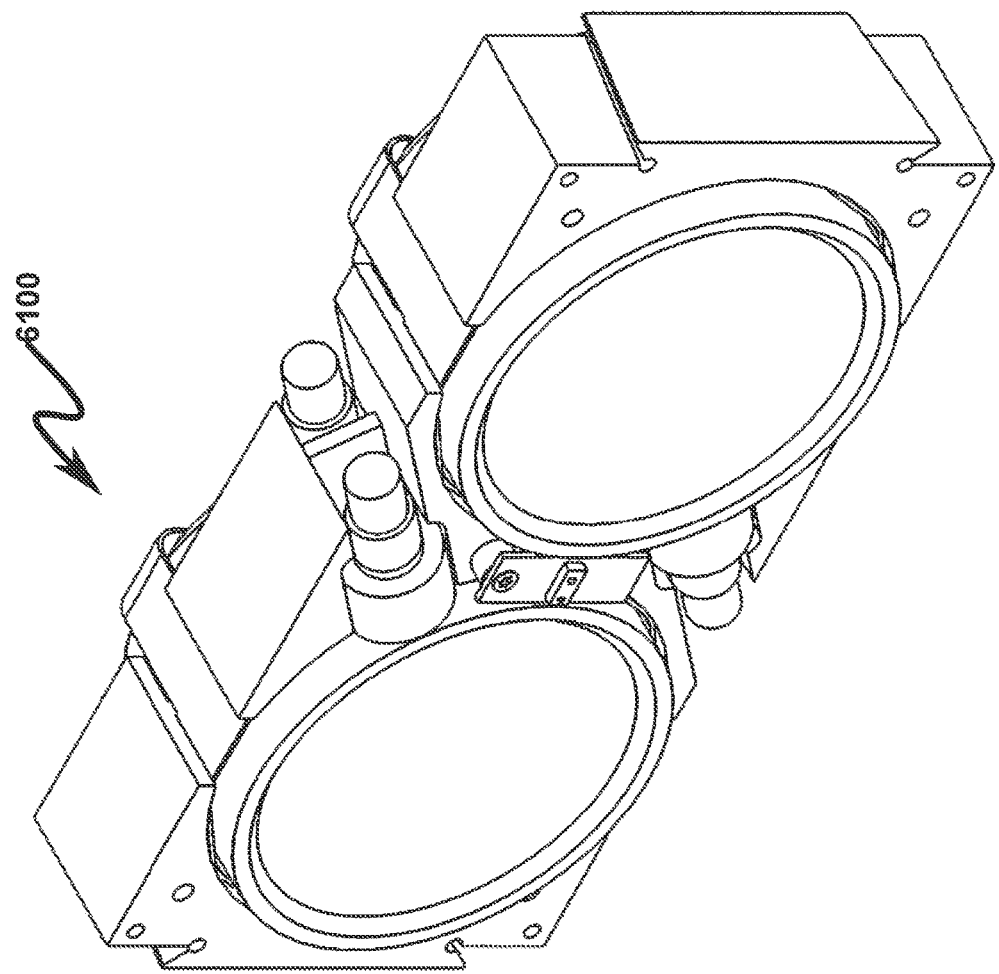
FIG. 61 illustrates a top right front perspective detail view of a radiation detector assembly useful in some preferred invention embodiments.
Figure 62:
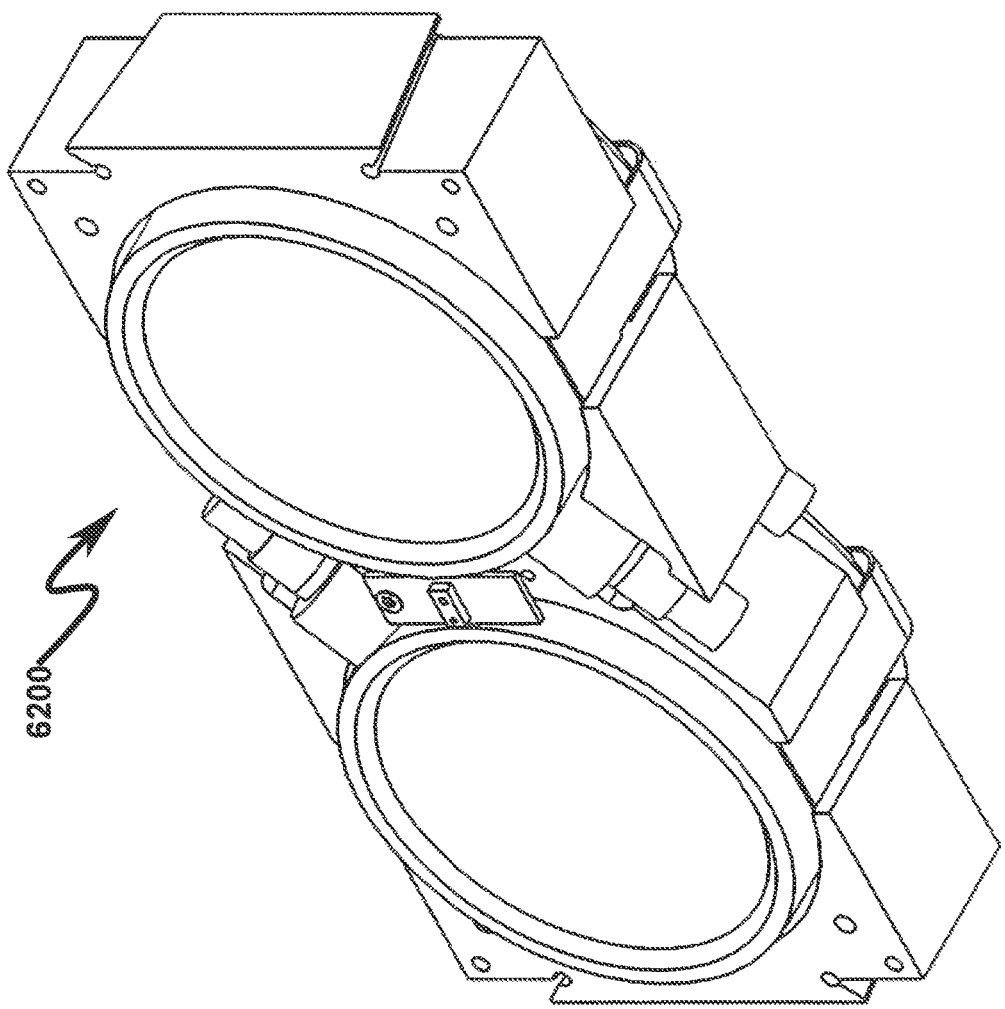
FIG. 62 illustrates a bottom right front perspective detail view of a radiation detector assembly useful in some preferred invention embodiments.
Figure 63:
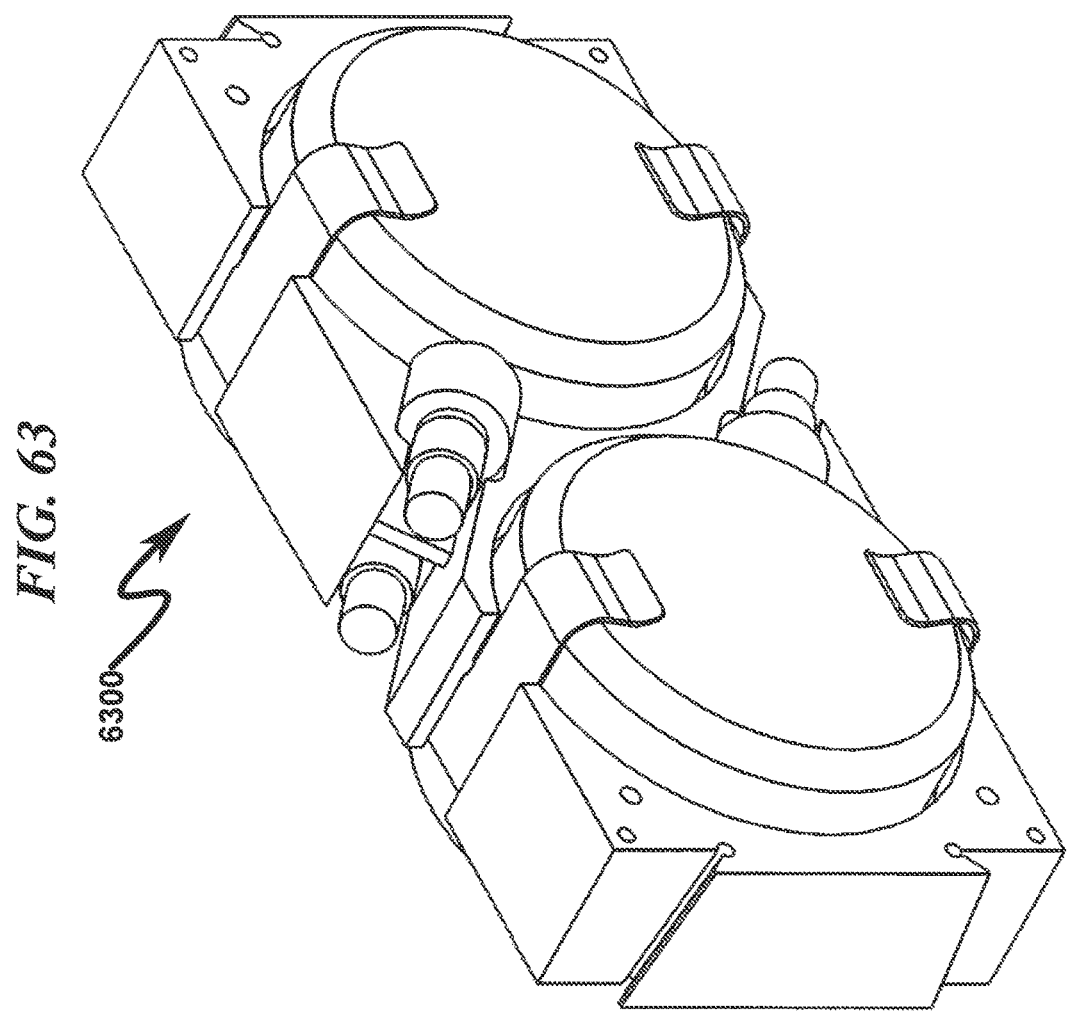
FIG. 63 illustrates a top right rear perspective detail view of a radiation detector assembly useful in some preferred invention embodiments.

The preferred exemplary construction as depicted in FIG. 41 (4100)-FIG. 56 (5600) may be further understood in more detail by inspection of the radiation detector disassembly drawings depicted in FIG. 57 (5700)-FIG. 64 (6400). These drawings depict the construction details of the radiation sensor/detectors (5701, 5702) (comprising the background radiation detector (BRD) and contamination radiation detector (CRD)) and the proximity sensor (5703). One skilled in the art will recognize that this exemplary internal construction may be modified based on application context and does not limit the scope of the claimed invention.

Preferred Embodiment System Summary

The present invention preferred exemplary system embodiment anticipates a wide variety of variations in the basic theme of construction, but can be generalized as a radiation probe system comprising:
  (a) background radiation detector (BRD);
  (b) contamination radiation detector (CRD);
  (c) proximity sensor (PRS);
  (d) operator audible alarm (OAA);
  (e) operator visual indicator (OVI);
  (f) computing control device (CCD); and
  (g) radiation probe enclosure (RPE);
  wherein
  the RPE is configured to mechanically couple the BRD, the CRD, the PRS, and the CCD in the RPE;
  the BRD is positioned behind the CRD such that gamma radiation external to the RPE first passes through the CRD before detection by the BRD;
  the PRS is configured to determine the proximity of a radiation source to the RPE;
  the BRD is configured to detect gamma radiation from the radiation source;
  the CRD is configured to detect alpha, beta, and gamma radiation from the radiation source;
  the CCD is configured to read background radiation counts (BRC) from the BRD;
  the CCD is configured to read contamination radiation counts (CRC) from the CRD;
  the CCD is configured to calculate a radiation background count (RBC) by processing the BRC to estimate static background gamma radiation;
  the CCD is configured to calculate a background subtraction factor (BSF) based on the RBC;
  the CCD is configured to calculate a net measured radiation (NMR) value by subtracting from the CRC the product of the RBC and the BSF;
  the CCD is configured to periodically perform a coherence test of the NMR to determine the statistical correctness of the BSF;
  the CCD is configured to calculate a radiation detection threshold (RDT) based on the RBC; and
  the CCD is configured to activate the OAA and the OVI based on the values of the NMR, the RDT, and a predetermined alarm threshold value (ATV).

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a radiation probe method, the method operating in conjunction with a radiation probe system comprising:
  (a) background radiation detector (BRD);
  (b) contamination radiation detector (CRD);
  (c) proximity sensor (PRS);
  (d) operator audible alarm (OAA);
  (e) operator visual indicator (OVI);
  (f) computing control device (CCD); and
  (g) radiation probe enclosure (RPE);
  wherein
  the RPE is configured to mechanically couple the BRD, the CRD, the PRS, and the CCD in the RPE; and
  the BRD is positioned behind the CRD such that gamma radiation external to the RPE first passes through the CRD before detection by the BRD;
  wherein the method comprises the steps of:
  (1) with the PRS, determining the proximity of a radiation source to the RPE;
  (2) with the BRD, detecting gamma radiation from the radiation source;
  (3) with the CRD, detecting alpha, beta, and gamma radiation from the radiation source;
  (4) with the CCD, reading background radiation counts (BRC) from the BRD;
  (5) with the CCD, reading contamination radiation counts (CRC) from the CRD;

(6) with the CCD, calculating a radiation background count (RBC) by processing the BRC to estimate static background gamma radiation;
(7) with the CCD, calculating a background subtraction factor (BSF) based on the RBC;
(8) with the CCD, calculating a net measured radiation (NMR) value by subtracting from the CRC the product of the RBC and the BSF;
(9) with the CCD, periodically performing a coherence test of the NMR to determine the statistical correctness of the BSF;
(10) with the CCD, calculating a radiation detection threshold (RDT) based on the RBC; and
(11) with the CCD, activating the OAA and the OVI based on the values of the NMR, the RDT, and a predetermined alarm threshold value (ATV).

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment System Summary

An alternate invention preferred exemplary system embodiment anticipates a wide variety of variations in the basic theme of construction, but can be generalized as a radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
the RPE is configured to mechanically couple the BRD, the CRD, the PRS, and the CCD in the RPE;
the BRD is positioned behind the CRD such that gamma radiation external to the RPE first passes through the CRD before detection by the BRD;
the PRS is configured to determine the proximity of a radiation source to the RPE;
the BRD is configured to detect gamma radiation from the radiation source;
the CRD is configured to detect alpha, beta, and gamma radiation from the radiation source;
the CCD is configured to read background radiation counts (BRC) from the BRD;
the CCD is configured to read contamination radiation counts (CRC) from the CRD;
the CCD is configured to calculate a radiation background count (RBC) by processing the BRC to estimate static background gamma radiation;
the CCD is configured to calculate a background subtraction factor (BSF) based on the RBC;
the CCD is configured to calculate a net measured radiation (NMR) value by subtracting from the CRC the product of the RBC and the BSF;
the CCD is configured to periodically perform a coherence test of the NMR to determine the statistical correctness of the BSF;
the CCD is configured to calculate a radiation detection threshold (RDT) based on the RBC; and
the CCD is configured to activate the OAA and the OVI based on the values of the NMR, the RDT, and a predetermined alarm threshold value (ATV).

This general system summary may be augmented by the various elements described herein to produce a wide variety of invention embodiments consistent with this overall design description.

Alternate Preferred Embodiment Method Summary

An alternate invention preferred exemplary method embodiment anticipates a wide variety of variations in the basic theme of implementation, but can be generalized as a radiation probe method, the method operating in conjunction with a radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
the RPE is configured to mechanically couple the BRD, the CRD, the PRS, and the CCD in the RPE; and
the BRD is positioned behind the CRD such that gamma radiation external to the RPE first passes through the CRD before detection by the BRD;
wherein the method comprises the steps of:
(1) with the PRS, determining the proximity of a radiation source to the RPE;
(2) with the BRD, detecting gamma radiation from the radiation source;
(3) with the CRD, detecting alpha, beta, and gamma radiation from the radiation source;
(4) with the CCD, reading background radiation counts (BRC) from the BRD;
(5) with the CCD, reading contamination radiation counts (CRC) from the CRD;
(6) with the CCD, calculating a radiation background count (RBC) by processing the BRC to estimate static background gamma radiation;
(7) with the CCD, calculating a background subtraction factor (BSF) based on the RBC;
(8) with the CCD, calculating a net measured radiation (NMR) value by subtracting from the CRC the product of the RBC and the BSF;
(9) with the CCD, periodically performing a coherence test of the NMR to determine the statistical correctness of the BSF;
(10) with the CCD, calculating a radiation detection threshold (RDT) based on the RBC; and
(11) with the CCD, activating the OAA and the OVI based on the values of the NMR, the RDT, and a predetermined alarm threshold value (ATV).

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment Method Summary

An alternate invention preferred exemplary method embodiment anticipates a wide variety of variations in the basic theme of implementation, but can be generalized as a radiation probe method, the method operating in conjunction with a radiation probe system comprising:
- (a) background radiation detector (BRD);
- (b) contamination radiation detector (CRD);
- (c) proximity sensor (PRS);
- (d) operator audible alarm (OAA);
- (e) operator visual indicator (OVI); and
- (f) computing control device (CCD);

wherein the BRD is positioned proximal to the CRD;

wherein the method comprises the steps of:
- (1) With the CCD, collecting counts from the BRD;
- (2) With the CCD, smoothing BRD data using a Radiation Probe Smoothing Algorithm Method with a previous count of the BRD used as input parameters to the smoothing algorithm;
- (3) With the CCD, smoothing CRD data using a Radiation Probe Smoothing Algorithm Method with a previous count of the CRD used as input parameters to the smoothing algorithm;
- (4) With the CCD, calculating net measured radiation (NMR) values using a background radiation subtraction factor (BSF) K;
- (5) With the CCD, performing a coherence test and according to the coherence test estimating a new value of the BSF K;
- (6) With the CCD, activating the OAA if the NMR is greater than an alarm threshold value (ATV);
- (7) With the CCD, activating the OVI to indicate consistency of radiation detection events; and
- (8) Proceeding to step (1) to repeat the BRD and CRD radiation measurements and subsequent determination of the NMR.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PRS is configured to have an object detection range of at least 8 cm.

An embodiment wherein the BSF is recalculated with a sample frequency in the range of 0.1 seconds to 2.0 seconds.

An embodiment wherein the BSF is recalculated with a sample frequency of 0.25 seconds.

An embodiment wherein the RDT is calculated by multiplying the BRC value by a constant.

An embodiment wherein a radiation detection threshold (RDT) is calculated based on the BRD data to determine activation of the OAA and the OVI.

An embodiment wherein the BSF is subject to a correction of ±0.1 if the NMR value is beyond the range of [−0.9:+0.9] multiplied by a detection threshold (DT) that is determined by the BSF.

An embodiment wherein the BSF is subject to a correction of ±0.01 if the NMR value is beyond the range of [−0.9:−0.6] or [+0.6:+0.9] multiplied by a detection threshold (DT) that is determined by the BSF.

An embodiment wherein the BSF is corrected only if the measurement time associated with the BRC or the CRC is equal to or greater than 5 seconds.

An embodiment wherein the CCD is configured to periodically test the BSF for correction, and if correction is determined to be necessary, adjusting the BSF by a step value within the range of 0.01 to 0.10.

An embodiment wherein the OAA is configured to operate with a DT hysteresis value (DHV) in the range of 5% to 25% of the ATV.

An embodiment wherein the OAA is configured to operate with a DT hysteresis value (DHV) of 0.8.

An embodiment wherein the system operates with a DT scaling factor (DSF) of greater than unity.

An embodiment wherein the system operates with a DT scaling factor (DSF) of 1.2.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A radiation probe system and method incorporating adaptive gamma radiation background subtraction for enhanced radiation detection capability has been disclosed. The system and method are generally applicable to radiation "frisking" applications in which the contamination area may have high gamma radiation background levels that normally would result in loss of contamination radiation detection accuracy. Readings from a background radiation detector (BRD) are subtracted from a contamination radiation detector (CRD) to determine a count rate solely associated with contamination. A background subtraction factor (BSF) is used to scale the BRD subtraction and is automatically adjusted based on environmental conditions. A smoothing algorithm is used to increase/decrease the BRD and/or CRD acquisition times to account for signal variations in BRD/CRD measurement readings. The system and method provide for lower limit of detection (LLD) radiation levels that are below that of conventional radiation detectors.

Claims Interpretation

The following rules apply when interpreting the CLAIMS of the present invention:
The CLAIM PREAMBLE should be considered as limiting the scope of the claimed invention.
"WHEREIN" clauses should be considered as limiting the scope of the claimed invention.
"WHEREBY" clauses should be considered as limiting the scope of the claimed invention.
"ADAPTED TO" clauses should be considered as limiting the scope of the claimed invention.
"ADAPTED FOR" clauses should be considered as limiting the scope of the claimed invention.
The term "MEANS" specifically invokes the means-plus-function claims limitation recited in 35 U.S.C. §112(f) and such claim shall be construed to cover the corresponding structure, material, or acts described in the specification and equivalents thereof.
The phrase "MEANS FOR" specifically invokes the means-plus-function claims limitation recited in 35 U.S.C. §112(f) and such claim shall be construed to cover the corresponding structure, material, or acts described in the specification and equivalents thereof.
The phrase "STEP FOR" specifically invokes the step-plus-function claims limitation recited in 35 U.S.C. §112(f) and such claim shall be construed to cover the corresponding structure, material, or acts described in the specification and equivalents thereof.
The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").
The claims presented herein are to be interpreted in light of the specification and drawings presented herein with sufficiently narrow scope such as to not preempt any abstract idea.
The claims presented herein are to be interpreted in light of the specification and drawings presented herein with sufficiently narrow scope such as to not preclude every application of any idea.
The claims presented herein are to be interpreted in light of the specification and drawings presented herein with sufficiently narrow scope such as to preclude any basic mental process that could be performed entirely in the human mind.
The claims presented herein are to be interpreted in light of the specification and drawings presented herein with sufficiently narrow scope such as to preclude any process that could be performed entirely by human manual effort.

What is claimed is:
1. A radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
said RPE is configured to mechanically couple said BRD, said CRD, said PRS, and said CCD in said RPE;
said BRD is positioned behind said CRD such that gamma radiation external to said RPE first passes through said CRD before detection by said BRD;
said PRS is configured to determine the proximity of a radiation source to said RPE;
said BRD is configured to detect gamma radiation from said radiation source;
said CRD is configured to detect alpha, beta, and gamma radiation from said radiation source;
said CCD is configured to read background radiation counts (BRC) from said BRD;
said CCD is configured to read contamination radiation counts (CRC) from said CRD;
said CCD is configured to calculate a radiation background count (RBC) by processing said BRC to estimate static background gamma radiation;
said CCD is configured to calculate a background subtraction factor (BSF) based on said RBC;
said CCD is configured to calculate a net measured radiation (NMR) value by subtracting from said CRC the product of said RBC and said BSF;
said CCD is configured to periodically perform a coherence test of said NMR to determine the statistical correctness of said BSF;
said CCD is configured to calculate a radiation detection threshold (RDT) based on said RBC; and
said CCD is configured to activate said OAA and said OVI based on the values of said NMR, said RDT, and a predetermined alarm threshold value (ATV).

2. The radiation probe system of claim 1 wherein said PRS is configured to have an object detection range of at least 8 cm.

3. The radiation probe system of claim 1 wherein said BSF is recalculated with a sample frequency in the range of 0.1 seconds to 2.0 seconds.

4. The radiation probe system of claim 1 wherein said BSF is recalculated with a sample frequency of 0.25 seconds.

5. The radiation probe system of claim 1 wherein said RDT is calculated by multiplying said BRC value by a constant.

6. The radiation probe system of claim 1 wherein said BSF is subject to a correction of ±0.1 if said NMR value is beyond the range of [−0.9:+0.9] multiplied by a detection threshold (DT) that is determined by said BSF.

7. The radiation probe system of claim 1 wherein said BSF is subject to a correction of ±0.01 if said NMR value is beyond the range of [−0.9:−0.6] or [+0.6:+0.9] multiplied by a detection threshold (DT) that is determined by said BSF.

8. The radiation probe system of claim 1 wherein said BSF is corrected only if the measurement time associated with said BRC or said CRC is equal to or greater than 5 seconds.

9. The radiation probe system of claim 1 wherein said CCD is configured to periodically test said BSF for correction, and if correction is determined to be necessary, adjusting said BSF by a step value within the range of 0.01 to 0.10.

10. The radiation probe system of claim 1 wherein said OAA is configured to operate with a DT hysteresis value (DHV) in the range of 5% to 25% of said ATV.

11. A radiation probe method, said method operating in conjunction with a radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
said RPE is configured to mechanically couple said BRD, said CRD, said PRS, and said CCD in said RPE; and
said BRD is positioned behind said CRD such that gamma radiation external to said RPE first passes through said CRD before detection by said BRD;
wherein said method comprises the steps of:
(1) with said PRS, determining the proximity of a radiation source to said RPE;
(2) with said BRD, detecting gamma radiation from said radiation source;
(3) with said CRD, detecting alpha, beta, and gamma radiation from said radiation source;
(4) with said CCD, reading background radiation counts (BRC) from said BRD;
(5) with said CCD, reading contamination radiation counts (CRC) from said CRD;
(6) with said CCD, calculating a radiation background count (RBC) by processing said BRC to estimate static background gamma radiation;
(7) with said CCD, calculating a background subtraction factor (BSF) based on said RBC;
(8) with said CCD, calculating a net measured radiation (NMR) value by subtracting from said CRC the product of said RBC and said BSF;
(9) with said CCD, periodically performing a coherence test of said NMR to determine the statistical correctness of said BSF;
(10) with said CCD, calculating a radiation detection threshold (RDT) based on said RBC; and
(11) with said CCD, activating said OAA and said OVI based on the values of said NMR, said RDT, and a predetermined alarm threshold value (ATV).

12. The radiation probe method of claim 11 wherein said PRS is configured to have an object detection range of at least 8 cm.

13. The radiation probe method of claim 11 wherein said BSF is recalculated with a sample frequency in the range of 0.1 seconds to 2.0 seconds.

14. The radiation probe method of claim 11 wherein said BSF is recalculated with a sample frequency of 0.25 seconds.

15. The radiation probe method of claim 11 wherein said RDT is calculated by multiplying said BRC value by a constant.

16. The radiation probe method of claim 11 wherein said BSF is subject to a correction of ±0.1 if said NMR value is beyond the range of [−0.9:+0.9] multiplied by a detection threshold (DT) that is determined by said BSF.

17. The radiation probe method of claim 11 wherein said BSF is subject to a correction of ±0.01 if said NMR value is beyond the range of [−0.9:−0.6] or [+0.6:+0.9] multiplied by a detection threshold (DT) that is determined by said BSF.

18. The radiation probe method of claim 11 wherein said BSF is corrected only if the measurement time associated with said BRC or said CRC is equal to or greater than 5 seconds.

19. The radiation probe method of claim 11 wherein said CCD is configured to periodically test said BSF for correction, and if correction is determined to be necessary, adjusting said BSF by a step value within the range of 0.01 to 0.10.

20. The radiation probe method of claim 11 wherein said OAA is configured to operate with a DT hysteresis value (DHV) in the range of 5% to 25% of said ATV.

21. A tangible non-transitory computer usable medium having computer-readable program code means embodied thereon comprising a radiation probe method, said method operating in conjunction with a radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
said RPE is configured to mechanically couple said BRD, said CRD, said PRS, and said CCD in said RPE; and
said BRD is positioned behind said CRD such that gamma radiation external to said RPE first passes through said CRD before detection by said BRD;
wherein said method comprises the steps of:
(1) with said PRS, determining the proximity of a radiation source to said RPE;
(2) with said BRD, detecting gamma radiation from said radiation source;
(3) with said CRD, detecting alpha, beta, and gamma radiation from said radiation source;
(4) with said CCD, reading background radiation counts (BRC) from said BRD;
(5) with said CCD, reading contamination radiation counts (CRC) from said CRD;
(6) with said CCD, calculating a radiation background count (RBC) by processing said BRC to estimate static background gamma radiation;
(7) with said CCD, calculating a background subtraction factor (BSF) based on said RBC;
(8) with said CCD, calculating a net measured radiation (NMR) value by subtracting from said CRC the product of said RBC and said BSF;
(9) with said CCD, periodically performing a coherence test of said NMR to determine the statistical correctness of said BSF;
(10) with said CCD, calculating a radiation detection threshold (RDT) based on said RBC; and
(11) with said CCD, activating said OAA and said OVI based on the values of said NMR, said RDT, and a predetermined alarm threshold value (ATV).

22. The computer usable medium of claim 21 wherein said PRS is configured to have an object detection range of at least 8 cm.

23. The computer usable medium of claim 21 wherein said BSF is recalculated with a sample frequency in the range of 0.1 seconds to 2.0 seconds.

24. The computer usable medium of claim 21 wherein said BSF is recalculated with a sample frequency of 0.25 seconds.

25. The computer usable medium of claim 21 wherein said RDT is calculated by multiplying said BRC value by a constant.

26. The computer usable medium of claim 21 wherein said BSF is subject to a correction of ±0.1 if said NMR value is beyond the range of [−0.9:+0.9] multiplied by a detection threshold (DT) that is determined by said BSF.

27. The computer usable medium of claim 21 wherein said BSF is subject to a correction of ±0.01 if said NMR value is beyond the range of [−0.9:−0.6] or [+0.6:+0.9] multiplied by a detection threshold (DT) that is determined by said BSF.

28. The computer usable medium of claim 21 wherein said BSF is corrected only if the measurement time associated with said BRC or said CRC is equal to or greater than 5 seconds.

29. The computer usable medium of claim 21 wherein said CCD is configured to periodically test said BSF for correction, and if correction is determined to be necessary, adjusting said BSF by a step value within the range of 0.01 to 0.10.

30. The computer usable medium of claim 21 wherein said OAA is configured to operate with a DT hysteresis value (DHV) in the range of 5% to 25% of said ATV.

31. A radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
said RPE is configured to mechanically couple said BRD, said CRD, said PRS, and said CCD in said RPE;
said BRD is positioned proximal to said CRD;
said PRS is configured to determine the proximity of a radiation source to said RPE;
said BRD is configured to detect gamma radiation from said radiation source;
said CRD is configured to detect alpha, beta, and gamma radiation from said radiation source;
said CCD is configured to read background radiation counts (BRC) from said BRD;
said CCD is configured to read contamination radiation counts (CRC) from said CRD;
said CCD is configured to calculate a radiation background count (RBC) by processing said BRC to estimate static background gamma radiation;
said CCD is configured to calculate a background subtraction factor (BSF) based on said RBC;
said CCD is configured to calculate a net measured radiation (NMR) value by subtracting from said CRC the product of said RBC and said BSF;
said CCD is configured to periodically perform a coherence test of said NMR to determine the statistical correctness of said BSF;
said CCD is configured to calculate a radiation detection threshold (RDT) based on said RBC; and
said CCD is configured to activate said OAA and said OVI based on the values of said NMR, said RDT, and a predetermined alarm threshold value (ATV).

32. The radiation probe system of claim 31 wherein said PRS is configured to have an object detection range of at least 8 cm.

33. The radiation probe system of claim 31 wherein said BSF is recalculated with a sample frequency in the range of 0.1 seconds to 2.0 seconds.

34. The radiation probe system of claim 31 wherein said BSF is recalculated with a sample frequency of 0.25 seconds.

35. The radiation probe system of claim 31 wherein said RDT is calculated by multiplying said BRC value by a constant.

36. The radiation probe system of claim 31 wherein said BSF is subject to a correction of ±0.1 if said NMR value is beyond the range of [−0.9:+0.9] multiplied by a detection threshold (DT) that is determined by said BSF.

37. The radiation probe system of claim 31 wherein said BSF is subject to a correction of ±0.01 if said NMR value is beyond the range of [−0.9:−0.6] or [+0.6:+0.9] multiplied by a detection threshold (DT) that is determined by said BSF.

38. The radiation probe system of claim 31 wherein said BSF is corrected only if the measurement time associated with said BRC or said CRC is equal to or greater than 5 seconds.

39. The radiation probe system of claim 31 wherein said CCD is configured to periodically test said BSF for correction, and if correction is determined to be necessary, adjusting said BSF by a step value within the range of 0.01 to 0.10.

40. The radiation probe system of claim 31 wherein said OAA is configured to operate with a DT hysteresis value (DHV) in the range of 5% to 25% of said ATV.

41. A radiation probe method, said method operating in conjunction with a radiation probe system comprising:
(a) background radiation detector (BRD);
(b) contamination radiation detector (CRD);
(c) proximity sensor (PRS);
(d) operator audible alarm (OAA);
(e) operator visual indicator (OVI);
(f) computing control device (CCD); and
(g) radiation probe enclosure (RPE);
wherein
said RPE is configured to mechanically couple said BRD, said CRD, said PRS, and said CCD in said RPE; and
said BRD is positioned proximal to said CRD;
wherein said method comprises the steps of:
(1) with said PRS, determining the proximity of a radiation source to said RPE;
(2) with said BRD, detecting gamma radiation from said radiation source;
(3) with said CRD, detecting alpha, beta, and gamma radiation from said radiation source;
(4) with said CCD, reading background radiation counts (BRC) from said BRD;
(5) with said CCD, reading contamination radiation counts (CRC) from said CRD;
(6) with said CCD, calculating a radiation background count (RBC) by processing said BRC to estimate static background gamma radiation;
(7) with said CCD, calculating a background subtraction factor (BSF) based on said RBC;
(8) with said CCD, calculating a net measured radiation (NMR) value by subtracting from said CRC the product of said RBC and said BSF;

(9) with said CCD, periodically performing a coherence test of said NMR to determine the statistical correctness of said BSF;
(10) with said CCD, calculating a radiation detection threshold (RDT) based on said RBC; and
(11) with said CCD, activating said OAA and said OVI based on the values of said NMR, said RDT, and a predetermined alarm threshold value (ATV).

42. The radiation probe method of claim 41 wherein said PRS is configured to have an object detection range of at least 8 cm.

43. The radiation probe method of claim 41 wherein said BSF is recalculated with a sample frequency in the range of 0.1 seconds to 2.0 seconds.

44. The radiation probe method of claim 41 wherein said BSF is recalculated with a sample frequency of 0.25 seconds.

45. The radiation probe method of claim 41 wherein said RDT is calculated by multiplying said BRC value by a constant.

46. The radiation probe method of claim 41 wherein said BSF is subject to a correction of ±0.1 if said NMR value is beyond the range of [−0.9:+0.9] multiplied by a detection threshold (DT) that is determined by said BSF.

47. The radiation probe method of claim 41 wherein said BSF is subject to a correction of ±0.01 if said NMR value is beyond the range of [−0.9:−0.6] or [+0.6:+0.9] multiplied by a detection threshold (DT) that is determined by said BSF.

48. The radiation probe method of claim 41 wherein said BSF is corrected only if the measurement time associated with said BRC or said CRC is equal to or greater than 5 seconds.

49. The radiation probe method of claim 41 wherein said CCD is configured to periodically test said BSF for correction, and if correction is determined to be necessary, adjusting said BSF by a step value within the range of 0.01 to 0.10.

50. The radiation probe method of claim 41 wherein said OAA is configured to operate with a DT hysteresis value (DHV) in the range of 5% to 25% of said ATV.

51. A tangible non-transitory computer usable medium having computer-readable program code means embodied thereon comprising a radiation probe method, said method operating in conjunction with a radiation probe system comprising:
  (a) background radiation detector (BRD);
  (b) contamination radiation detector (CRD);
  (c) proximity sensor (PRS);
  (d) operator audible alarm (OAA);
  (e) operator visual indicator (OVI);
  (f) computing control device (CCD); and
  (g) radiation probe enclosure (RPE);
  wherein
  said RPE is configured to mechanically couple said BRD, said CRD, said PRS, and said CCD in said RPE; and
  said BRD is positioned proximal to said CRD;
  wherein said method comprises the steps of:
  (1) with said PRS, determining the proximity of a radiation source to said RPE;
  (2) with said BRD, detecting gamma radiation from said radiation source;
  (3) with said CRD, detecting alpha, beta, and gamma radiation from said radiation source;
  (4) with said CCD, reading background radiation counts (BRC) from said BRD;
  (5) with said CCD, reading contamination radiation counts (CRC) from said CRD;
  (6) with said CCD, calculating a radiation background count (RBC) by processing said BRC to estimate static background gamma radiation;
  (7) with said CCD, calculating a background subtraction factor (BSF) based on said RBC;
  (8) with said CCD, calculating a net measured radiation (NMR) value by subtracting from said CRC the product of said RBC and said BSF;
  (9) with said CCD, periodically performing a coherence test of said NMR to determine the statistical correctness of said BSF;
  (10) with said CCD, calculating a radiation detection threshold (RDT) based on said RBC; and
  (11) with said CCD, activating said OAA and said OVI based on the values of said NMR, said RDT, and a predetermined alarm threshold value (ATV).

52. The computer usable medium of claim 51 wherein said PRS is configured to have an object detection range of at least 8 cm.

53. The computer usable medium of claim 51 wherein said BSF is recalculated with a sample frequency in the range of 0.1 seconds to 2.0 seconds.

54. The computer usable medium of claim 51 wherein said BSF is recalculated with a sample frequency of 0.25 seconds.

55. The computer usable medium of claim 51 wherein said RDT is calculated by multiplying said BRC value by a constant.

56. The computer usable medium of claim 51 wherein said BSF is subject to a correction of ±0.1 if said NMR value is beyond the range of [−0.9:+0.9] multiplied by a detection threshold (DT) that is determined by said BSF.

57. The computer usable medium of claim 51 wherein said BSF is subject to a correction of ±0.01 if said NMR value is beyond the range of [−0.9:−0.6] or [+0.6:+0.9] multiplied by a detection threshold (DT) that is determined by said BSF.

58. The computer usable medium of claim 51 wherein said BSF is corrected only if the measurement time associated with said BRC or said CRC is equal to or greater than 5 seconds.

59. The computer usable medium of claim 51 wherein said CCD is configured to periodically test said BSF for correction, and if correction is determined to be necessary, adjusting said BSF by a step value within the range of 0.01 to 0.10.

60. The computer usable medium of claim 51 wherein said OAA is configured to operate with a DT hysteresis value (DHV) in the range of 5% to 25% of said ATV.

61. A radiation probe method, said method operating in conjunction with a radiation probe system comprising:
  (a) background radiation detector (BRD);
  (b) contamination radiation detector (CRD);
  (c) proximity sensor (PRS);
  (d) operator audible alarm (OAA);
  (e) operator visual indicator (OVI); and
  (f) computing control device (CCD);
  wherein
  said BRD is positioned proximal to said CRD;
  wherein said method comprises the steps of:
  (1) With the CCD, collecting counts from said BRD;
  (2) With said CCD, smoothing BRD data using a Radiation Probe Smoothing Algorithm Method with a previous count of said BRD used as input parameters to said smoothing algorithm;

(3) With said CCD, smoothing CRD data using a Radiation Probe Smoothing Algorithm Method with a previous count of said CRD used as input parameters to said smoothing algorithm;

(4) With said CCD, calculating net measured radiation (NMR) values using a background radiation subtraction factor (BSF) K;

(5) With said CCD, performing a coherence test and according to said coherence test estimating a new value of said BSF K;

(6) With said CCD, activating said OAA if said NMR is greater than an alarm threshold value (ATV);

(7) With said CCD, activating said OVI to indicate consistency of radiation detection events; and (8) Proceeding to step (1) to repeat said BRD and CRD radiation measurements and subsequent determination of said NMR.

62. The radiation probe method of claim 61 wherein said PRS is configured to have an object detection range of at least 8 cm.

63. The radiation probe method of claim 61 wherein said BSF is recalculated with a sample frequency in the range of 0.1 seconds to 2.0 seconds.

64. The radiation probe method of claim 61 wherein said BSF is recalculated with a sample frequency of 0.25 seconds.

65. The radiation probe method of claim 61 wherein a radiation detection threshold (RDT) is calculated based on said BRD data to determine activation of said OAA and said OVI.

66. The radiation probe method of claim 61 wherein said BSF is subject to a correction of ±0.1 if said NMR value is beyond the range of [−0.9:+0.9] multiplied by a detection threshold (DT) that is determined by said BSF.

67. The radiation probe method of claim 61 wherein said BSF is subject to a correction of ±0.01 if said NMR value is beyond the range of [−0.9:−0.6] or [+0.6:+0.9] multiplied by a detection threshold (DT) that is determined by said BSF.

68. The radiation probe method of claim 61 wherein said BSF is corrected only if the measurement time associated with said BRC or said CRC is equal to or greater than 5 seconds.

69. The radiation probe method of claim 61 wherein said CCD is configured to periodically test said BSF for correction, and if correction is determined to be necessary, adjusting said BSF by a step value within the range of 0.01 to 0.10.

70. The radiation probe method of claim 61 wherein said OAA is configured to operate with a DT hysteresis value (DHV) in the range of 5% to 25% of said ATV.

71. A tangible non-transitory computer usable medium having computer-readable program code means embodied thereon comprising a radiation probe method, said method operating in conjunction with a radiation probe system comprising:

(a) background radiation detector (BRD);
(b) contamination radiation detector (CRD);
(c) proximity sensor (PRS);
(d) operator audible alarm (OAA);
(e) operator visual indicator (OVI); and
(f) computing control device (CCD);

wherein
said BRD is positioned proximal to said CRD;
wherein said method comprises the steps of:

(1) With the CCD, collecting counts from said BRD;

(2) With said CCD, smoothing BRD data using a Radiation Probe Smoothing Algorithm Method with a previous count of said BRD used as input parameters to said smoothing algorithm;

(3) With said CCD, smoothing CRD data using a Radiation Probe Smoothing Algorithm Method with a previous count of said CRD used as input parameters to said smoothing algorithm;

(4) With said CCD, calculating net measured radiation (NMR) values using a background radiation subtraction factor (BSF) K;

(5) With said CCD, performing a coherence test and according to said coherence test estimating a new value of said BSF K;

(6) With said CCD, activating said OAA if said NMR is greater than an alarm threshold value (ATV);

(7) With said CCD, activating said OVI to indicate consistency of radiation detection events; and (8) Proceeding to step (1) to repeat said BRD and CRD radiation measurements and subsequent determination of said NMR.

72. The computer usable medium of claim 71 wherein said PRS is configured to have an object detection range of at least 8 cm.

73. The computer usable medium of claim 71 wherein said BSF is recalculated with a sample frequency in the range of 0.1 seconds to 2.0 seconds.

74. The computer usable medium of claim 71 wherein said BSF is recalculated with a sample frequency of 0.25 seconds.

75. The computer usable medium of claim 71 wherein a radiation detection threshold (RDT) is calculated based on said BRD data to determine activation of said OAA and said OVI.

76. The computer usable medium of claim 71 wherein said BSF is subject to a correction of ±0.1 if said NMR value is beyond the range of [−0.9:+0.9] multiplied by a detection threshold (DT) that is determined by said BSF.

77. The computer usable medium of claim 71 wherein said BSF is subject to a correction of ±0.01 if said NMR value is beyond the range of [−0.9:−0.6] or [+0.6:+0.9] multiplied by a detection threshold (DT) that is determined by said BSF.

78. The computer usable medium of claim 71 wherein said BSF is corrected only if the measurement time associated with said BRC or said CRC is equal to or greater than 5 seconds.

79. The computer usable medium of claim 71 wherein said CCD is configured to periodically test said BSF for correction, and if correction is determined to be necessary, adjusting said BSF by a step value within the range of 0.01 to 0.10.

80. The computer usable medium of claim 71 wherein said OAA is configured to operate with a DT hysteresis value (DHV) in the range of 5% to 25% of said ATV.

* * * * *